United States Patent
Harris et al.

(10) Patent No.: US 12,169,398 B2
(45) Date of Patent: Dec. 17, 2024

(54) GENERATIVE DESIGN SHAPE OPTIMIZATION BASED ON A TARGET PART RELIABILITY FOR COMPUTER AIDED DESIGN AND MANUFACTURING

(71) Applicant: Autodesk, Inc., San Francisco, CA (US)

(72) Inventors: Andrew John Harris, London (GB); Adrian Adam Thomas Butscher, Toronto (CA); Allin Irving Groom, London (GB); Konara Mudiyanselage Kosala Bandara, Beckenham (GB)

(73) Assignee: Autodesk, Inc., San Francisco, CA (US)

( * ) Notice: Subject to any disclaimer, the term of this patent is extended or adjusted under 35 U.S.C. 154(b) by 485 days.

(21) Appl. No.: 17/459,710

(22) Filed: Aug. 27, 2021

(65) Prior Publication Data
US 2023/0088537 A1   Mar. 23, 2023

(51) Int. Cl.
G05B 19/4099   (2006.01)
G05B 19/4093   (2006.01)
G06F 30/17   (2020.01)

(52) U.S. Cl.
CPC ... *G05B 19/4099* (2013.01); *G05B 19/40932* (2013.01); *G05B 19/40938* (2013.01); *G06F 30/17* (2020.01)

(58) Field of Classification Search
CPC .......... G05B 19/4099; G05B 19/40932; G05B 19/40938; G06F 30/17
See application file for complete search history.

(56) References Cited

U.S. PATENT DOCUMENTS 10,192,023 B2   1/2019   Byers et al.
10,635,088 B1*  4/2020   Bandara ............... B29C 64/393
(Continued)

FOREIGN PATENT DOCUMENTS

EP          2778992 A1        9/2014
WO    WO-2020033124 A1 *    2/2020   ............. B22F 10/38
WO    PCTUS2021036976        6/2021

OTHER PUBLICATIONS

Allaire, et al., "Minimum stress optimal design with the level set method", Engineering Analysis with Boundary Elements, vol. 32, Issue 11, 2008, pp. 909-918.

(Continued)

*Primary Examiner* — Thomas C Lee
*Assistant Examiner* — Anzuman Sharmin
(74) *Attorney, Agent, or Firm* — Fish & Richardson P.C.

(57) ABSTRACT

Methods, systems, and apparatus, including medium-encoded computer program products, for computer aided design of physical structures using generative design processes. A method includes: obtaining a design space and design criteria for a modeled object including a design constraint on an acceptable likelihood of failure, wherein a statistical model that relates a structural performance metric to specific likelihoods of failure for material(s) is used to translate between the acceptable likelihood of failure and a value for the structural performance metric; iteratively modifying a generatively designed shape of the modeled object in the design space in accordance with the design criteria including the design constraint to stay under the acceptable likelihood of failure for the physical structure, wherein the numerical simulation includes computing the structural performance metric, which is evaluated against the design constraint; and providing the generatively (Continued)

designed shape of the modeled object for use in manufacturing a physical structure.

39 Claims, 20 Drawing Sheets

(56) References Cited

U.S. PATENT DOCUMENTS

| | | | |
|---|---|---|---|
| 10,915,680 | B2 | 2/2021 | Pedersen et al. |
| 11,200,355 | B2 | 12/2021 | Razzell et al. |
| 2007/0013724 | A1 | 1/2007 | Swift |
| 2015/0165690 | A1 | 6/2015 | Tow |
| 2016/0091388 | A1 | 3/2016 | De Baere |
| 2016/0374431 | A1 | 12/2016 | Tow |
| 2017/0024491 | A1* | 1/2017 | Dodwell ............... G06F 30/23 |
| 2017/0024493 | A1 | 1/2017 | Cheong et al. |
| 2017/0024511 | A1 | 1/2017 | Cheong et al. |
| 2018/0099333 | A1* | 4/2018 | DehghanNiri ........ B22F 10/37 |
| 2018/0330029 | A1 | 11/2018 | Pedersen et al. |
| 2018/0345647 | A1 | 12/2018 | Morris et al. |
| 2018/0349531 | A1 | 12/2018 | Morris et al. |
| 2019/0011903 | A1 | 1/2019 | Jacobs, II |
| 2019/0325098 | A1 | 10/2019 | Vernon |
| 2020/0098195 | A1 | 3/2020 | Jaiswal et al. |
| 2020/0122403 | A1 | 4/2020 | Dhokia et al. |
| 2020/0150623 | A1 | 5/2020 | Bandara et al. |
| 2020/0151286 | A1 | 5/2020 | Willis et al. |
| 2020/0156323 | A1 | 5/2020 | Woytowitz et al. |
| 2020/0265122 | A1* | 8/2020 | Razzell ................. B22F 10/66 |
| 2021/0312311 | A1* | 10/2021 | Bowden, Jr. ........ G06F 16/9024 |
| 2022/0156434 | A1 | 5/2022 | Razzell et al. |

OTHER PUBLICATIONS

Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.

Brackett et al., "Topology Optimization for Additive Manufacturing," in Proceedings of the Solid Freeform Fabrication Symposium (2011) 15 pages.

Dapogny et al., "Geometric Constraints for Shape and Topology Optimization in Architectural Design," Computational Mechanics, Springer-Verlag, 2017, 59(6):933-965. 10.1007/s00466-017-1383-6. hal-01354004v3.

Gibou et al., "A Review of Level-set Methods and Some Recent Applications," Journal of Computational Physics (2018) 353:82-109.

Guest and Zhu, "Casting and Milling Restrictions in Topology Optimization via Projection-based Algorithms," in ASME 2012 International Design Engineering Technical Conferences and Computers and Information in Engineering Conference (2012) 8 pages.

Ikeya and Shimoda, "Multi-objective Free-form Optimization for Shape and Thickness of Shell Structures with Composite Materials," in 11th World Congress on Structural and Multidisciplinary Optimisation (2015) 6 pages.

Joshi et al., "CAD-integrated Topology Optimization (BGCE Honours Project)," Department of Informatics, Technical University of Munich (2016) 77 pages.

Langelaar, "Topology Optimization for Multi-axis Machining," Comput. Methods Appl. Mech. Engrg. (2019) 351:226-252.

Liu and Ma, "A Survey of Manufacturing Oriented Topology Optimization Methods," Advances in Engineering Software (2016) 100:161-175.

Liu et al., "Current and Future Trends in Topology Optimization for Additive Manufacturing," Structural and Multidisciplinary Optimization (2018) 57:2457-2483.

Lu et al., "Build-to-Last: Strength to Weight 3D Printed Objects," ACM Trans. Graph. (2014) 33(4):97:1-97:10.

Nakayama and Shimoda, "Shape-topology Optimization for Designing Shell Structures," in VII European Congress on Computational Methods in Applied Sciences and Engineering (2016) 10 pages.

Sigmund and Maute, "Topology Optimization Approaches—a Comparative Review," Struct. Multidisc. Optim. (2013) 48:1031-1055.

Unknown author, "Topology Optimization R18.0 Feature and Usage Highlights," © 2016 ANSYS, Inc., Mar. 12, 2017, 29 pages.

Van Dijk et al., "Level-set Methods for Structural Topology Optimization: a Review," Struct. Multidisc. Optim. (2013) 48:437-472.

Vatanabe et al., "Topology Optimization with Manufacturing Constraints: a Unified Projection-based Approach," Advances in Engineering Software (2016) 100:97-112.

Weibull.com [online], "The Risks of Using Failure Rate to Calculate Reliability Metrics," published in Jun. 2017, retrieved on May 20, 2021, retrieved from URL<https://weibull.com/hotwire/issue196/hottopics196.html>, 5 pages.

Xia et al., "A Level Set Based Method for the Optimization of Cast Part," Struct. Multidisc. Optim. (2010) 41:735-747.

Albert, "Generative Design Generates New Interest in a Range of Manufacturing Options," (Feb. 1, 2019) [online] (retrieved from https://www.mmsonline.com/articles/generative-design-generates-new-interest-in-a-range-of-manufacturing-options), 9 pages.

* cited by examiner

GENERATIVE DESIGN SHAPE OPTIMIZATION BASED ON A TARGET PART RELIABILITY FOR COMPUTER AIDED DESIGN AND MANUFACTURING

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries that separate the parts from surrounding space. In a B-Rep model (often referred to as a B-Rep), geometry is stored in the computer using smooth and precise mathematical surfaces, in contrast to the discrete and approximate surfaces of a mesh model, which may limit the accuracy of CAD modeling. Moreover, various CAD programs implement different processes for numerical simulation, analysis and reporting of the physical properties of a B-Rep model.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry using topology optimization in the generative design of a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, examples of design constraints include maximum mass, maximum deflection under load, maximum stress, etc.

Some CAD software has included tools that facilitate 3D geometry enhancements using lattices and skins of various sizes, thicknesses and densities, where lattices are composed of beams or struts that are connected to each other or directly to solid parts at junctions, and skins are shell structures that overlay or encapsulate the lattices. Such tools allow redesign of a 3D part to be lighter in weight, while still maintaining desired performance characteristics (e.g., stiffness and flexibility). Such software tools have used lattice topologies of various types that can be used to generate lattice structures that can be manufactured.

Moreover, the inputs to a generative design process can include a set of solids (B-Rep input) and the user can define boundary conditions (mechanical load(s), physical constraint(s), or both) for one or more input solids of the set. Further, many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver. The set of input solids can include "preserve bodies", which should always be present in the design and which represent interfaces to other parts of the systems or locations on which boundary conditions should be applied (for example mechanical loads and constraints). Other regions in which geometry should or should not be generated can also be provided in a similar manner, such as input solids that define "obstacle bodies", which represent regions where new geometry should not be generated.

SUMMARY

This specification describes technologies relating to computer aided design of physical structures using generative design processes, where the three dimensional (3D) models of the physical structures can be produced based on a target part reliability by using a reliability constraint in the generative design process, which can include shape and/or topology optimization. The physical structures that are manufactured from such 3D models using additive manufacturing, subtractive manufacturing and/or other manufacturing systems and techniques, can thereby satisfy predefined (e.g., by the user of the CAD program) acceptable component probabilities of failure without requiring simulation of component behavior after the component is generatively designed by the CAD program, and post-generative-design manual editing of the 3D geometry of the component need not be done.

In general, one or more aspects of the subject matter described in this specification can be embodied in one or more methods, including: obtaining a design space for a modeled object, for which a corresponding physical structure is to be manufactured using one or more materials, and design criteria for the modeled object including one or more loading cases for numerical simulation of the physical structure and at least one design constraint on an acceptable likelihood of failure for the physical structure, wherein a statistical model that relates a structural performance metric to specific likelihoods of failure for the one or more materials is used to translate between the acceptable likelihood of failure and a value for the structural performance metric; iteratively modifying a generatively designed three dimensional shape of the modeled object in the design space in accordance with the design criteria including the one or more loading cases for the numerical simulation of the physical structure and the at least one design constraint to stay under the acceptable likelihood of failure for the physical structure, wherein the numerical simulation includes computing the structural performance metric, which is evaluated against the at least one design constraint; and providing the generatively designed three dimensional shape of the modeled object for use in manufacturing the physical structure.

The statistical model can be a Weibull (or other) statistical model of a probability of failure distribution function. The statistical model can include a survivor function that relates values of the performance metric to specific likelihoods of failure for the one or more materials across different thicknesses of the one or more materials. Moreover, in some cases the one or more materials can include different versions of a same base material, and the different versions can correspond to different build orientations for the same base material, and in some cases the one or more materials include different base materials, different versions of a same base material, or both. In general, the different version of a same base material can correspond to different mechanical anisotropy dependent on the fabrication process.

The at least one design constraint can specify a target value for the structural performance metric, and obtaining the at least one design constraint can include: receiving input from a user indicating the acceptable likelihood of failure for the physical structure; and setting the target value for the structural performance metric in accordance with the statistical model and the acceptable likelihood of failure received from the user. Further, providing the generatively designed three dimensional shape of the modeled object can include: translating a maximum structural performance metric value output from the iteratively modifying into a predicted likelihood of failure for the physical structure using the statistical model; and displaying the predicted likelihood of failure for the physical structure.

The at least one design constraint can specify a maximum likelihood of failure, obtaining the at least one design constraint can include setting the maximum likelihood of failure based on the acceptable likelihood of failure for the physical structure, and the iteratively modifying can include evaluating the maximum likelihood of failure at each of multiple different locations on or in the modeled object by calculating a likelihood of failure at the location using the statistical model and a value for the structural performance metric indicated for the location by the numerical simulation in accordance with one or more specific geometric parameters of the modeled object at the location. The one or more specific geometric parameters of the modeled object at the location can include thickness and build orientation.

The iteratively modifying can include: computing shape change velocities for an implicit surface in a level-set representation of the generatively designed three dimensional shape in accordance with the at least one design constraint; and updating the level-set representation using the shape change velocities to produce an updated version of the generatively designed three dimensional shape of the modeled object. Computing the shape change velocities can include computing at least one shape change velocity using a gradient determined from a shape derivative evaluated for the at least one design constraint at each of the different locations. Computing the shape change velocities can include computing at least one shape change velocity using an amount determined from a shape derivative formula that approximates a shape derivative evaluated for the at least one design constraint, at each of the different locations, using adaptive control. Moreover, the shape derivative formula can include a volume fraction based inequality constraint that is modified using a Proportional-Integral-Derivative controlled stabilization factor and an importance factor, which is adjusted based on whether or not one or more other constraints were violated in a prior iteration of the iteratively modifying.

The iteratively modifying can include iteratively modifying both a geometry and a topology of the generatively designed three dimensional shape. The one or more loading cases can include at least a first loading case that specifies a load to be supported by the physical structure during manufacturing of the physical structure, and at least a second loading case that specifies a load to be supported by the physical structure during use of the physical structure. Moreover, the providing can include: generating, from the generatively designed three dimensional shape of the modeled object, toolpath specifications for one or more computer-controlled manufacturing systems; and manufacturing the physical structure corresponding to the modeled object with the one or more computer-controlled manufacturing systems using the toolpath specifications.

These and other methods described herein can be implemented using a non-transitory computer-readable medium encoding a computer aided design program operable to cause one or more data processing apparatus to perform the method(s). In some implementations, a system includes: a non-transitory storage medium having instructions of a computer aided design program stored thereon; and one or more data processing apparatus configured to run the instructions of the computer aided design program to perform the method(s). Moreover, the system can include one or more computer-controlled manufacturing systems, wherein the one or more data processing apparatus are configured to run the instructions of the computer aided design program to generate toolpath specifications for the one or more computer-controlled manufacturing systems from the generatively designed three dimensional shape of the modeled object, and manufacture the physical structure corresponding to the modeled object with the one or more computer-controlled manufacturing systems using the toolpath specifications.

Particular embodiments of the subject matter described in this specification can be implemented to realize one or more of the following advantages. A computer program used in the technical field of computer-aided design can provide a function not previously possible, namely, shape (and optionally topology) optimization of the design of a physical structure can be performed to satisfy a defined part reliability. This can substantially reduce the amount of time needed to finalize the design of a new part by improving the output of a generative design process. Further, the risk of over engineering of parts can be reduced since there will be less need to undo light-weighting produced by the shape (and optionally topology) optimization during any post-optimization changes made by the user of the system to ensure adequate part reliability is achieved.

One or more part reliability constraints can be integrated into the part's design optimization process in accordance with a user defined acceptable component probability of failure. Thus, the computer's capabilities/functionalities are improved by assisting the user in performing the technical task of designing new parts to be manufactured and used effectively in the world, i.e., without undue failures of the physical structure of the manufactured part. Moreover, by providing feedback to the user during and/or after the shape (and optionally topology) optimization regarding the part's predicted reliability, the systems and techniques described in this application provide a continued and guided human-machine interaction that was not possible before, enabling better control over management of risks in part design. In addition, the time and computing resources necessary to complete the design process can be reduced by reducing the necessary iterations of the design process—that is, design, build, test, fail, revise, build, and so on.

Further, the selection and use of appropriate build supports in additive manufacture can be simplified by identifying and avoiding sizes and shapes that produce residual stresses exceeding a failure probability threshold for the build support geometry. Similarly, the design and use of components with imperfect or non-ideal surface finishes can be evaluated against risk levels that are quantifiable using the techniques described in this specification, enabling manufacturers to determine earlier in the product design cycle a cost/risk ratio of post-processing based on an extrapolated probability of failure of a component. In addition, with additive manufacturing, the selection of an appropriate build orientation can be informed by likelihood of failure occurring based on build orientation or thickness of the part's features.

Also, in cases where multiple material suppliers are being considered, each capable of supplying a different candidate material, using the techniques described in this specification to determine the failure distribution of the alternatives can provide data that influences the determination of a preferable material choice for the manufacture of a product. For example, when the failure distributions of a material from two suppliers is known (e.g., through testing and/or data provided), data plots, such as those derived from a Weibull model, can be compared for a determined, relevant load level. In some cases, one material might be stronger and therefore appear to be a preferred option, but a second material might have a lower probability of failure up to a given load level. In cases where a component is optimized for lower load operation, the first, stronger material might not be the most appropriate.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
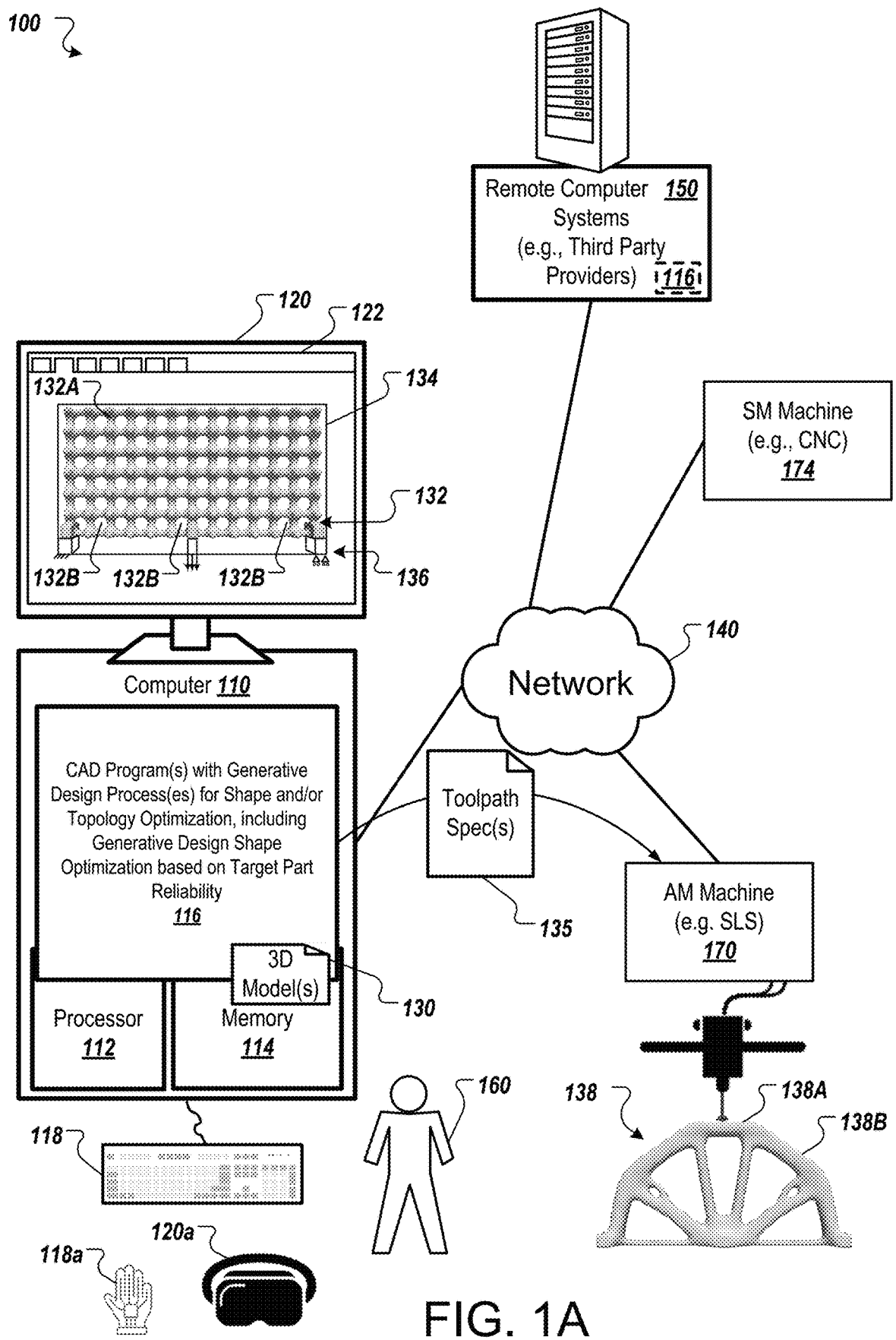
FIG. 1A shows an example of a system usable to design and manufacture physical structures.

FIG. 1A shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes one or more generative design processes for shape and/or topology optimization using numerical simulation, and including material or microstructure shape optimization techniques, geometrical or macrostructure shape optimization techniques, or both (e.g., using one or more level-set based topology optimization processes).

The numerical simulation performed by the CAD program(s) 116 can simulate one or more physical properties and can use one or more types of simulation to produce a numerical assessment of physical response (e.g., structural response) of the modelled object. For example, finite element analysis (FEA), including linear static FEA, finite difference method(s), and material point method(s) can be used. Further, the simulation of physical properties performed by the CAD program(s) 116 can include Computational Fluid Dynamics (CFD), Acoustics/Noise Control, thermal conduction, computational injection molding, electric or electro-magnetic flux, and/or material solidification (which is useful for phase changes in molding processes) simulations. Moreover, the CAD program(s) 116 can potentially implement hole and/or fixture generation techniques to support clamping during manufacturing and/or manufacturing control functions.

As used herein, CAD refers to any suitable program used to design physical structures that meet design requirements, regardless of whether or not the CAD program is capable of interfacing with and/or controlling manufacturing equipment. Thus, CAD program(s) 116 can include Computer Aided Engineering (CAE) program(s), Computer Aided Manufacturing (CAM) program(s), etc. The CAD program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or numerical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

In the example shown, an initial 3D model 132 is a seed model for input to a generative design process. In this example, the user 160 has defined a mechanical problem, for a generative design process to operate on, to produce a new 3D model from a starting 3D model 132. In this case, the defined problem is the Michell type arch problem, where the user 160 has specified a domain 134 and loading cases 136. However, this is but one of many possible examples. Many different physical structures can be designed using the systems and techniques described in this document. In addition, the loading cases 136 can include at least a first loading case that specifies a load to be supported by the physical structure during manufacturing of the physical structure, and at least a second loading case that specifies a load to be supported by the physical structure during use of the physical structure.

The user 160 (or other person or program) can specify a design space for a modeled object, for which a corresponding physical structure is to be manufactured, and design criteria for the modeled object. The design criteria can include one or more loading cases for numerical simulation of the physical structure, such as a numerical simulation setup (e.g., load(s) and material(s)) for numerical simulation (e.g., FEA, CFD, Acoustics/Noise Control, thermal conduction, computational injection molding simulations, electric or electro-magnetic flux, material solidification, etc.) of the modeled object. The design criteria can also include at least one design objective (e.g., minimize material usage) for the modeled object, and at least one design constraint (e.g., a volume constraint) for the modeled object.

In some implementations, the inputs for use in numerical simulation and generative design processes can include one or more regions of a current 3D model in which to generate new 3D geometry, loading case(s) defining one or more loads in one or more different directions to be borne by a physical structure being designed, one or more materials (e.g., one or more isotropic solid materials identified as a baseline material model for the design space), one or more seed model types to use as input to a generative design process, one or more generative design processes to use, and/or one or more lattice topologies to use in one or more regions of the design space. Inputs to the generative design and numerical simulation processes can include non-design spaces, different types of components (e.g., rods, bearings, shells), one or more target manufacturing processes and associated parameters, obstacle geometries that should be avoided, preserve geometries that should be included in the final design, and parameters related to various aspects, such as resolution of the design, type of synthesis, etc.

In general, a set of requirements can be provided in terms of boundary conditions (e.g., structural loads and constraints), material(s), one or more starting shapes, manufacturing constraints and other parameters, and the CAD program(s) 116 create various shapes that satisfy the requirements using one or more generative design processes as described in this document. Further, the design criteria for the modeled object include at least one design constraint on an acceptable likelihood of failure for the physical structure, as described in further detail below, and the CAD program(s) 116 provide user interface elements in the UI 122 to enable the user 160 to specify the various types of inputs noted above, and all (or various subsets) of these inputs can be used in the generative design and numerical simulation processes described in this document. Further, the user 160 can be enabled by the UI 122 of the CAD program(s) 116 to design a part using traditional 3D modelling functions (to build precise geometric descriptions of the 3D design model) and then use generative design and simulation processes in a design space specified within one or more portions of the 3D design model. Thus, as will be appreciated, many possible types of physical structures can be designed using the systems and techniques described in this document, the UI 122 can be used to create a full mechanical problem definition for a part to be manufactured, and the generative design and numerical simulation processes can accelerate new product development by enabling increased performance without time consuming physical testing.

As described herein, the CAD program(s) 116 implement at least one generative design process, which enables the CAD program(s) 116 to generate one or more portions of the 3D model(s) automatically (or the entirety of a 3D model) based on design objective(s) and constraint(s), where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time (e.g., as specified by a predefined number of shape modification iterations) given the available processing resources. The design criteria can be defined by the user 160, or by another party and imported into the CAD program(s) 116. The design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use).

Various generative design processes can be used, which can optimize the shape and/or topology of at least a portion of the 3D model. The iterative optimization of the geometric design of the 3D model(s) by the CAD program(s) 116 can involve topology optimization, which is a method of lightweighting where the optimum distribution of material is determined by minimizing an objective function subject to design constraints (e.g., structural compliance with volume as a constraint). Topology optimization can be addressed using a variety of numerical methods, which can be broadly classified into two groups: (1) material or microstructure techniques, and (2) geometrical or macrostructure techniques. Microstructure techniques are based on determining the optimum distribution of material density and include the Solid Isotropic Material with Penalization (SIMP) method and the homogenization method. In the SIMP method, intermediate material densities are penalized to favor either having $\rho=0$ or $\rho=1$, denoting a void or a solid, respectively. Intermediate material densities are treated as composites in the homogenization method.

In contrast, macrostructure techniques treat the material as being homogeneous, and the three dimensional topology of the modeled object being produced is represented as one or more boundaries between one or more solid regions (having the homogenous material therein) and one or more void regions (having no material therein) within the design space (also referred to as the domain or a sub-space of the domain for topology optimization). The shape(s) of the one or more boundaries are optimized during the generative design process, while the topology is changed in the domain as a result of the shape optimization in combination with adding/removing and shrinking/growing/merging the void region(s). Thus, the types of final optimized topologies that can result from a generative design process using a macrostructure technique can depend significantly on the number and sizes of voids within the seed geometry along with the addition and removal of voids during the optimization process.

Note that, while only one seed model 132 is shown in FIG. 1A (where this model 132 includes a complex solid region 132A surrounding many holes 132B of the void region) it should be appreciated that the generative design processes described in this document can employ two or more seed geometries/models for any given generative design process iteration, so as to improve the final result of shape and topology optimization. Further, during the shape and/or topology optimization process, one or more voids can be introduced into the solid domain and/or one or more solids can be introduced into the void domain, so as to improve the final result of the shape and topology optimization. Thus, the CAD program(s) 116 can include various types of available seed geometries and mid-process geometry introductions, along with a user interface element allowing the user 160 to design their own seed geometries and mid-process geometry introductions.

In the various implementations described, the CAD program(s) 116 provide at least a generative design shape optimization process in which the geometry of the modeled part is iteratively modified based on a target part reliability. In some implementations, the generative design shape optimization process is a topology optimization process in which both the geometry and the topology of the generatively designed three dimensional shape are modified in the iterative loop based on the target part reliability. Moreover, in some implementations, controlled convergence and/or singularities and disconnection prevention techniques are used, as described further below.

Once the user 160 is satisfied with a generatively designed 3D model, the 3D model can be stored as a 3D model document 130 and/or used to generate another representation of the model (e.g., an .STL file for additive manufacturing). This can be done upon request by the user 160, or in light of the user's request for another action, such as sending the 3D model 132 to an additive manufacturing (AM) machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 135 (having toolpath specifications of an appropriate format) to the AM machine 170 to produce a complete structure 138, which includes the optimized shape and potentially optimized topology (in this example, an arch design generated for the Michell type arch problem). The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In addition, the user 160 can save or transmit the 3D model for later use. For example, the CAD program(s) 116 can store the document 130 that includes the generated 3D model.

In some implementations, subtractive manufacturing (SM) machine(s) 174 (e.g., a Computer Numerical Control (CNC) milling machine, such as a multi-axis, multi-tool milling machine) can be used in the manufacturing process. Such SM machine(s) 174 can be used to prepare initial work-pieces on which AM machine(s) 170 will operate. In some implementations, a partially complete structure 138 is generated by the AM machine(s) 170 and/or using casting methods (e.g., investment casting (IC) using ceramic shell or sand casting (SC) using sand cores), and this partially complete structure 138 then has one or more portions removed (e.g., finishing) by the CNC machine 174 in order to form the completed structure. In some implementations, the CAD program(s) 116 can provide a corresponding document 135 (having toolpath specifications of an appropriate format, e.g., a CNC numerical control (NC) program) to the SM machine 174 for use in manufacturing the part using various cutting tools, etc. Moreover, in some implementations, the complete structure 138 is produced in its entirely using SM machine(s) 174.

But regardless of whether AM, SM, or both AM and SM systems and techniques are used to manufacture the physical structure, more than one material can be used to build that physical structure. In light of this, as noted above, the generative design process can employ material models of two or more materials 138A, 138B that will form the completed physical structure 138. The materials 138A, 138B can include different versions of a same base material, where the different versions correspond to different build orientations (within the additive manufacturing) for the same base material (i.e., microstructural anisotropy). Further, the materials 138A, 138B can include different base materials, different versions of a same base material, or both. Note that while this is shown in FIG. 1A in the context of AM, the use of two or more materials is also applicable to SM; for example, the same base material can undergo different post-processing operations, like thermal treatment or surface polishing, and thus have distinct physical properties. In any case, the distinct physical properties of the two or more materials to be used to form the completed structure can be modeled in the CAD program(s) 116 for use during generative design.

In various implementations, the CAD program(s) 116 of the system 100 can implement one or more generative design processes as described in this document. Generative design processes seek an optimal geometric shape, topology, or both. For example, generative design processes seek an optimal geometric shape among alternative designs by minimizing a performance-related objective function subject to constraints:

$$\text{minimize } J(s, u(s)) \; S \in \mathbb{R}^{n_s} \quad (1)$$

$$\text{such that } g_i(s, u(s)) = 0 \; i=1, \ldots, n_g \quad (2)$$

where s is a vector of design variables related to a geometric shape of the domain, and u is a vector of state variables (e.g., displacement) that depend on s. Additional constraints (e.g., equilibrium) are denoted by a set $g_i$. For simplicity, equality constraints are assumed here. Mathematical programming methods used to minimize (1) can be gradient-based or non-gradient-based. Gradient-based methods (versus non-gradient-based methods) generally use more information associated with design sensitivity, for example:

$$\frac{dJ}{ds}(s, u(s)) = \frac{\partial J}{\partial s} + \frac{\partial J}{\partial u}\frac{du}{ds} \quad (3)$$

which is a derivative of the performance-related objective function with respect to the design variables. In lattice-based methods, s represents a lattice thickness. In level-set based topology optimization methods, s represents a boundary of a solid region.

Figure 1B:
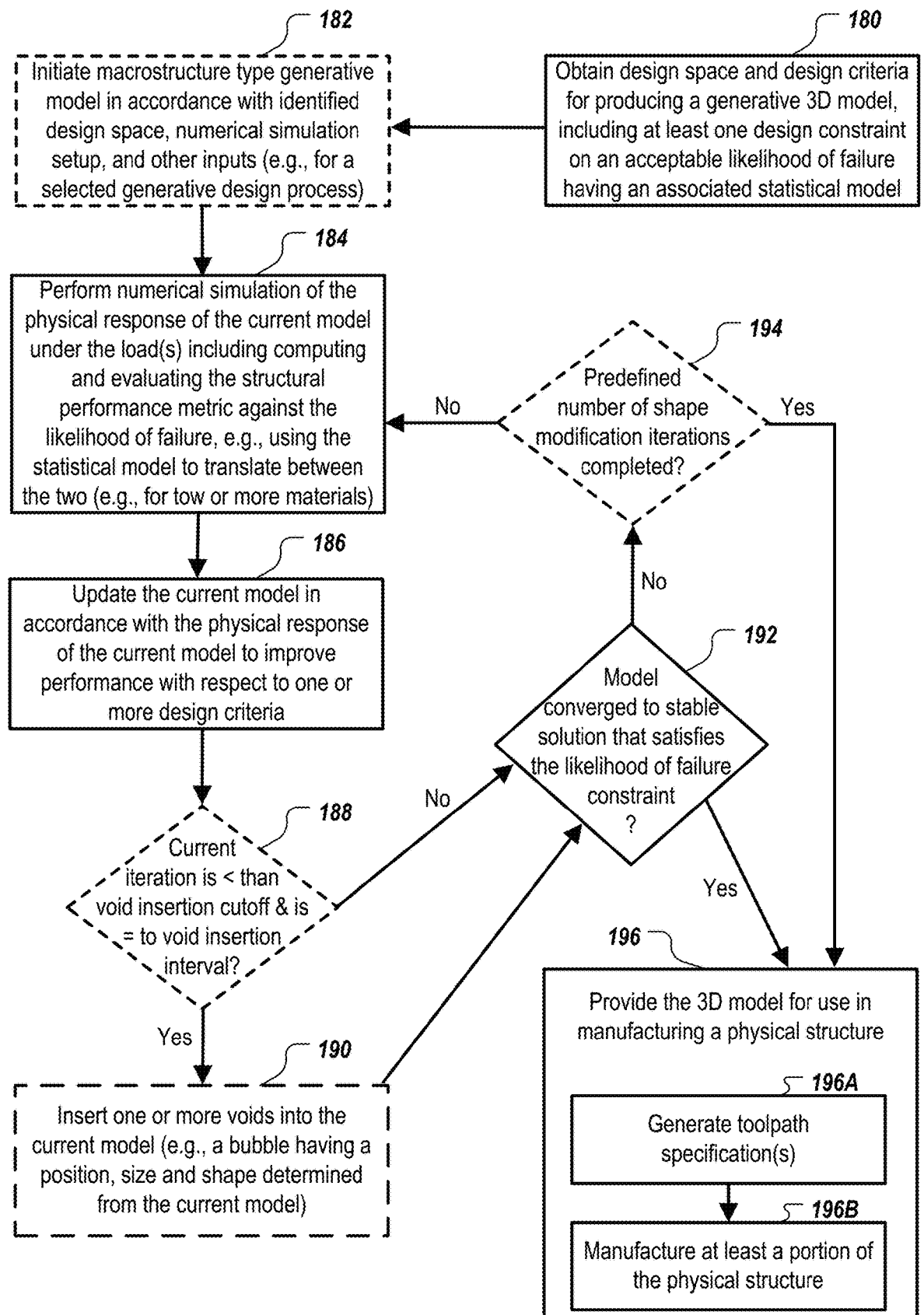
FIG. 1B shows an example of a process that generates one or more portions of a 3D model of a physical structure using one or more generative design processes that use a target part reliability, and manufacturing the physical structure.

FIG. 1B shows an example of a process that generates one or more portions of a 3D model of a physical structure using one or more generative design processes that use a target part reliability, and manufacturing the generatively designed physical structure that uses a target part reliability design constraint during the generative design process. A design space for the modeled object and design criteria for the modeled object are obtained 180, e.g., by CAD program(s) 116, for use in producing a generative 3D model. The design space for the generative design process can be an initial 3D model or one or more portions of an initial 3D model to be used as a starting geometry, or the design space can be determined as a bounding volume or a convex hull of the input model or specified portions thereof.

The design space for generative design geometry production can be a boundary representation (B-Rep) 3D model designed or loaded into CAD program(s) 116 that serves as a sub-space of an optimization domain of a generative design process, and/or a set of input solids used to specify boundary conditions for generative design geometry production, e.g., B-Reps selected using UI 122 to specify sub-space(s) that are preserved for use as connection point(s) with other component(s) in a larger 3D model or separate 3D model(s). In general, the design space is the volume of space inside which the part is to be generatively designed during shape modification. But note that in some cases, the design space can be unbounded.

The obtained 180 design criteria can be input by the user 160 and/or imported from another source. One or more of the design criteria can be defined over entire regions in the design space or over individual regions in the design space. Various design criteria can be obtained 180, including a setup for numerical simulation, e.g., densities of elements in an FEA model or a homogenized lattice material representation for a selected lattice topology to be used with a topology optimized 3D shape of the part being generatively designed, plus various design objectives and constraints, such as described in this document. Furthermore, functions can be provided, e.g., by CAD program(s) 116, that assist the user in specifying design criteria.

Also, as noted above, the design criteria include at least one design constraint on an acceptable likelihood of failure for the physical structure. In addition, the CAD program(s) 116 already have and/or obtain 180 a statistical model that relates a structural performance metric to specific likelihoods of failure for the one or more materials to be used to build the physical structure. The structural performance metric can include one or more design performance metrics, such as stress, strain, displacement, rotation, fatigue safety factor, yield strength safety factor, Young's modulus, or other material properties.

Moreover, the statistical model that relates the structural performance metric to the specific likelihoods of failure is used by the CAD program(s) 116 to translate (before, during, and/or after an iterative loop 184, 186, 192) between the acceptable likelihood of failure and a value for the structural performance metric. Data used to create the statistical model can be obtained by physical testing of a specific material. The statistical model that relates the structural performance metric to the specific likelihoods of failure can be a Weibull model, an exponential model, a log-logistic model, a gamma model, an exponential-logarithmic model, a generalized gamma model, or other suitable statistical models that effectively describe a given failure distribution. While many examples of details for using a Weibull statistical model are included in this disclosure, other suitable statistical models can be used instead of a Weibull model to relate the structural performance metric to the specific likelihoods of failure, such as statistical models that produce an exponential distribution, a log-logistic distribution, a gamma distribution, an exponential-logarithmic distribution, and/or a generalized gamma distribution. Along these same lines, in some implementations, the CAD program(s) 116 provide two or more of such statistical models and allow the user to select one of the available statistical models to use with the reliability optimization process.

In addition, in some implementations, a Weibull statistical model can be used. A Weibull model is a general-purpose reliability distribution used to model material strength and time-to-failure of electronic and mechanical components, equipment and systems.

Figure 2A:
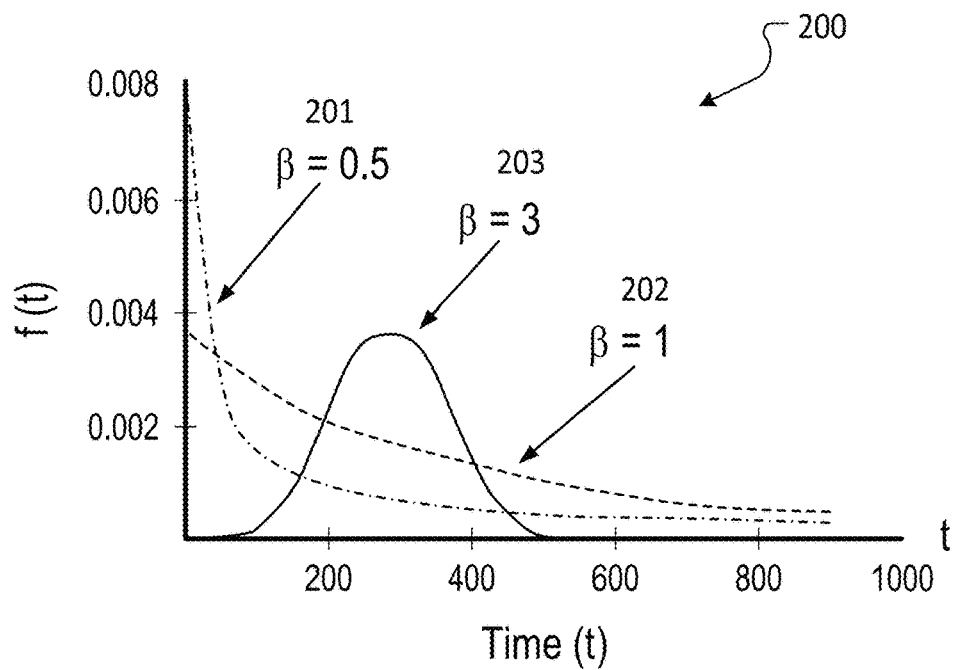
FIG. 2A shows a 3-parameter Weibull distribution.

A Weibull model can take two forms: a three-parameter Weibull Probability Density Function (PDF) and a two-parameter Weibull PDF. The three-parameter Weibull Probability Density Function (PDF) is defined as:

$$f(t) = \frac{\beta}{\eta}\left(\frac{t-\gamma}{\eta}\right)^{\beta-1} e^{-\left(\frac{t}{\eta}\right)^{\beta}}$$

where $\beta$ is a shape parameter, $\gamma$ is a location parameter and $\eta$ is a scale parameter. FIG. 2A shows a 3-parameter Weibull distribution 200 for three values of $\beta$, 0.5 201, 1 202 and 3 203.

If the location parameter $\gamma$ is set to zero, a two-parameter Weibull distribution results and has the form:

$$f(t) = \frac{\beta}{\eta}\left(\frac{t}{\eta}\right)^{\beta-1} e^{-\left(\frac{t}{\eta}\right)^{\beta}}$$

Note that the $\gamma$ parameter can equal zero in circumstances when there is a measurable probability that failure can occur immediately at the onset of loading. For example, a zero value can be appropriate when manufacturing very small features, and specifically when the dimensions converge with defect size. In such cases, probability of failure at zero load can be measurable.

Figure 2B:
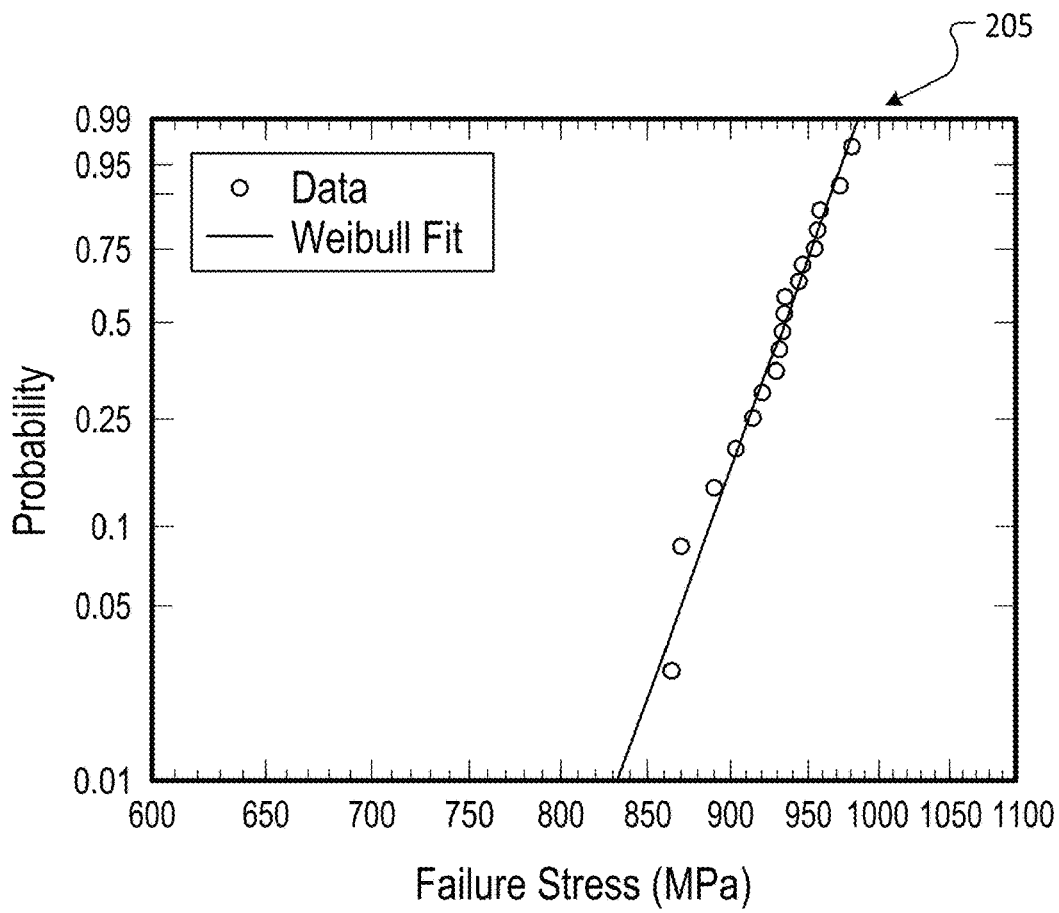
FIG. 2B shows an example of a Weibull statistical model of a probability of failure distribution function.
Figure 2C:
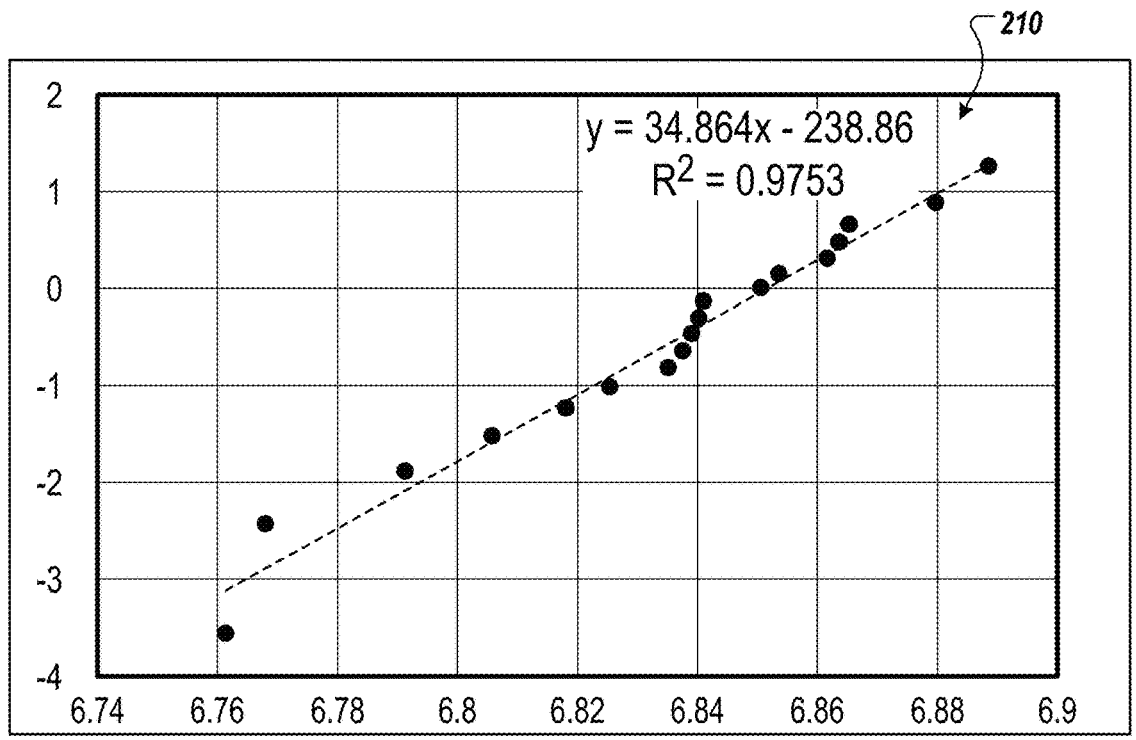
FIG. 2C shows a plot of computed failure values.
Figure 2D:
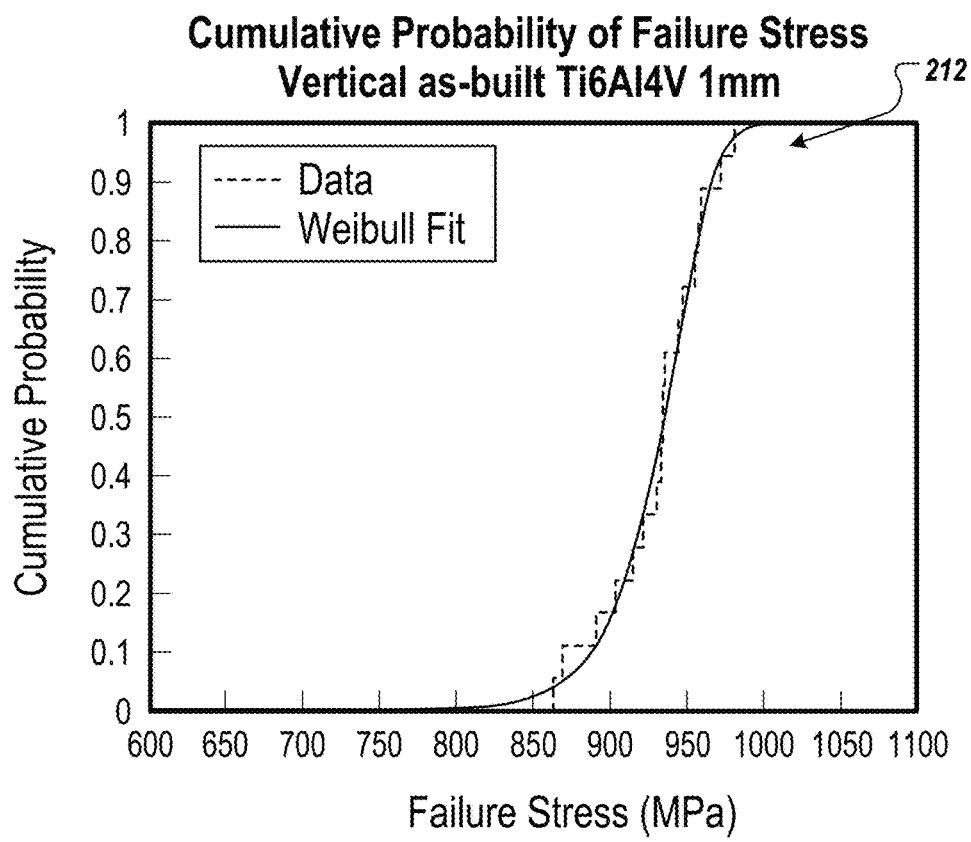
FIG. 2D shows a cumulative probability of failure as a function of failure stress.
Figure 2E:
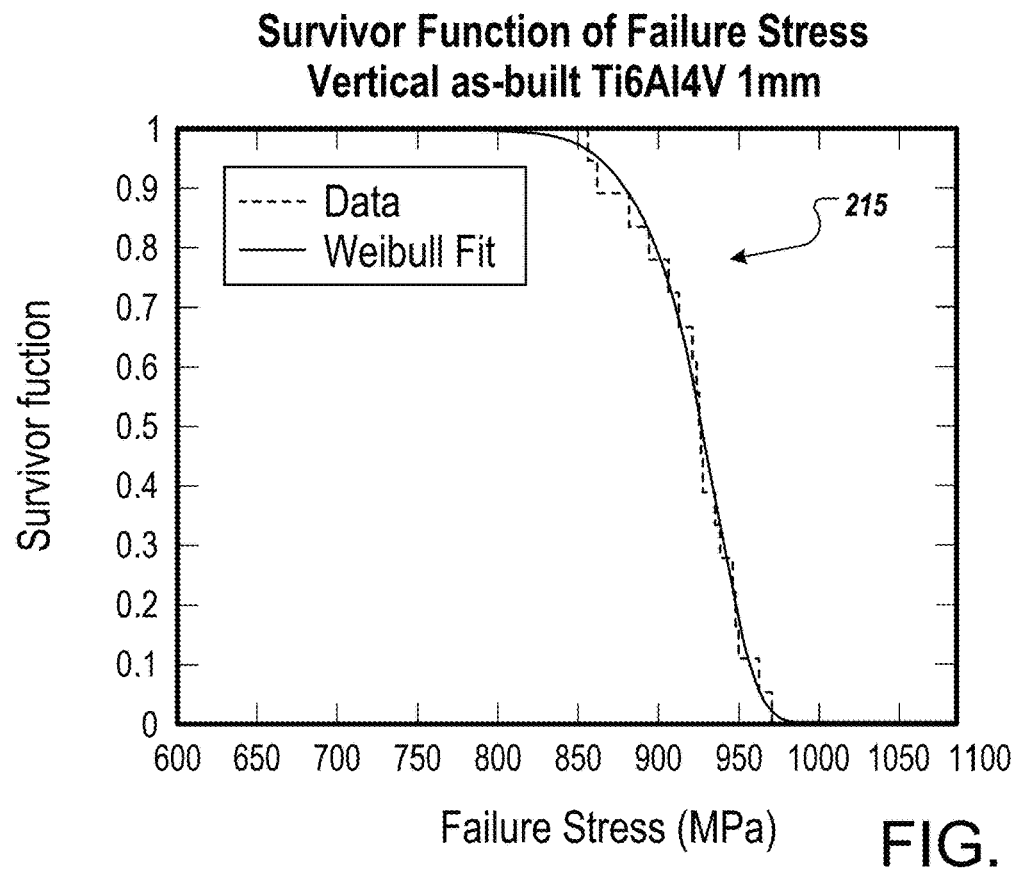
FIG. 2E shows a survivor function with probability of survival shown as a function of failure stress.
Figure 2F:
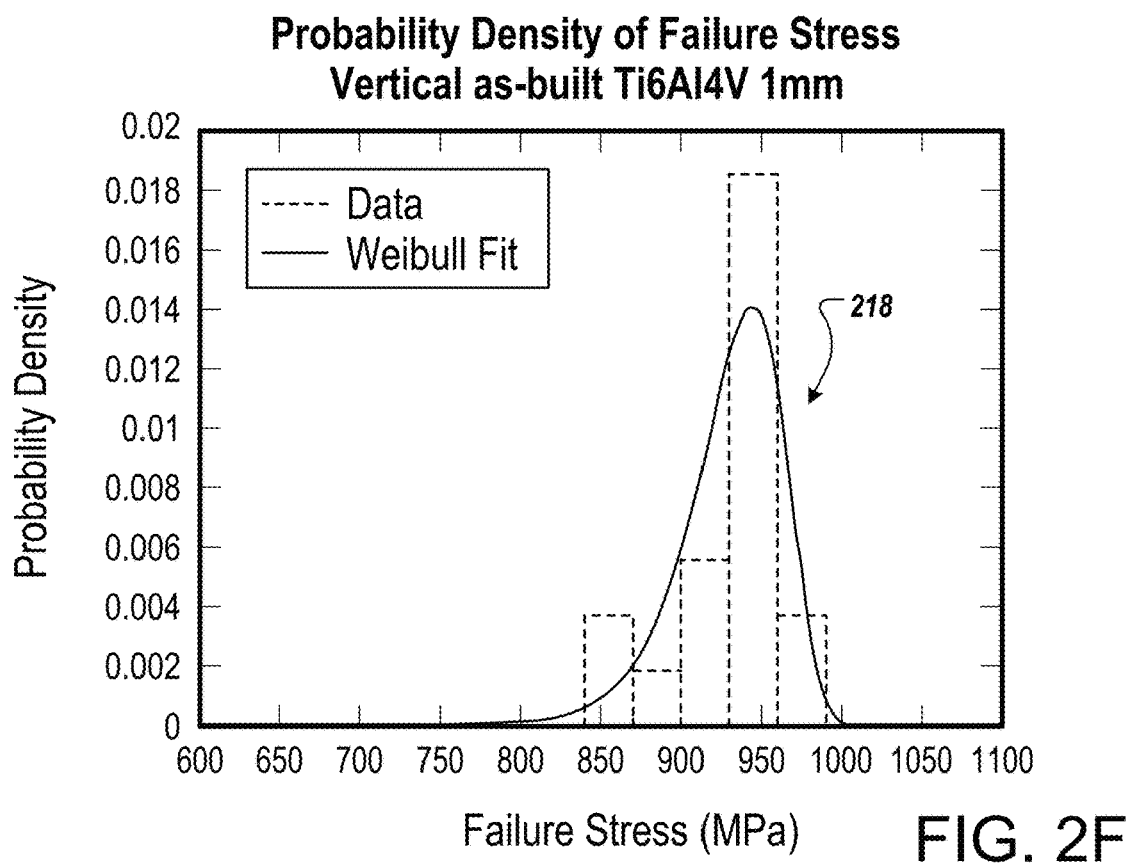
FIG. 2F shows a probability density of failure stress with the probability density measured as a function of failure stress.
Figure 2G:
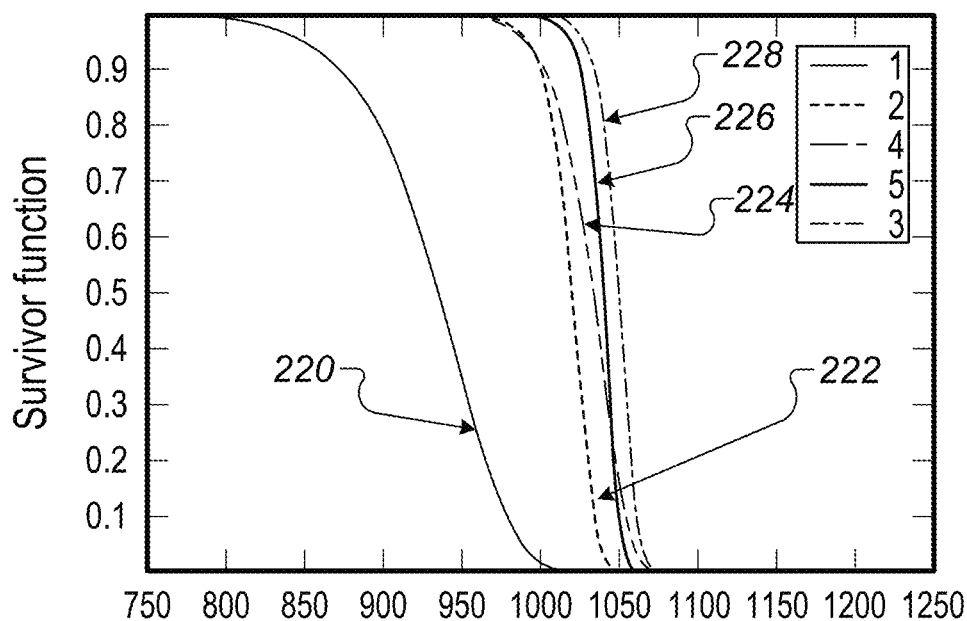
FIG. 2G show a statistical model (in the form of survivor functions) that relates values of a structural performance metric (such as failure stress measured in MPa) to specific likelihoods of failure for a material across five different thicknesses of the material.

However, since the $\gamma$ parameter is a vector value that describes the shift along the x-axis of a particular Weibull distribution, the parameter is significant when comparing populations that come from different manufacturing batches, or more relevant in this specification, thickness and/or build orientation using the same material, for example, as illustrated in FIG. 2G. In such cases, the $\gamma$ parameter will be a non-zero value. Further, since it is undesirable to have a measurable probability that failure can occur immediately at the onset of loading, for most cases, $\gamma$ will be non-zero.

The shape parameter $\beta$ indicates the prevalent failure mode. A $\beta$ less than one can indicate poor production quality or insufficient burn-in; a $\beta$ equaling one can indicate random failures which are independent of time, human error, natural events, and so on; a $\beta$ that is greater than one and less than or equal to four can indicate early wear, erosion, corrosion, early fatigue, porosity, intrinsic defects, and so on; and a $\beta$ in excess of four can indicate old age and rapid wear, bearing failures, corrosion, erosion, fatigue, and so on.

FIG. 2B shows an example 205 of a Weibull statistical model of a probability of failure distribution function, which relates a structural performance metric of failure stress measured in Megapascals (MPa) to a probability of failure (with values from 0 to 1). The Weibull statistical model 205 can be fit to a data set obtained by physical testing of a specific material using the following steps.

Step 1: rank the failure stress (also known as "ultimate tensile strength" or UTS) given in MPa of each specimen from lowest to highest, for example, as shown in TABLE 1 below:

TABLE 1

| Rank | UTS (MPa) |
|---|---|
| 1 | 864.02557 |
| 2 | 869.84118 |
| 3 | 890.33437 |
| 4 | 903.3313 |
| 5 | 914.67725 |
| 6 | 921.42042 |
| 7 | 930.14095 |
| 8 | 932.61543 |
| 9 | 933.93813 |
| 10 | 935.28255 |
| 11 | 935.93689 |
| 12 | 944.88533 |
| 13 | 947.53727 |
| 14 | 955.338 |
| 15 | 957.14649 |
| 16 | 958.82401 |
| 17 | 972.35553 |
| 18 | 980.9455 |

In step 2, a failure probability F can be computed using the formula:

$$F = \frac{(\text{Rank} - 0.5)}{\text{Total}}$$

Note that, in this example, 0.5 is subtracted from the rank value due to a small sample size. Had more specimens from the batch been tested, a specimen could have failed outside of the existing stress range. For a sufficiently large sample size, the likelihood of such a failure occurring is sufficiently small that it can be disregarded without impacting the resulting accuracy.

The choice of sample size can depend on the industry, use case and/or other requirement set by the engineering context. For example, if the consequences of failure are high, such as a risk to human safety, reducing the likelihood that a specimen fails outside of the existing stress range can be deemed important. In such cases, to produce a higher confidence of the associated probabilities of failure, a larger sample size can be used. Such cases allow for improved resolution of the failure distribution and thus enables the user to better define an acceptable risk margin with tighter confidence.

However in practice, compromises can be necessary due to time and cost of testing. In cases where such compromises are necessary, a minimum of 30 samples may be used, and sample sizes in excess of 100 provide improved confidence. A sufficiently small likelihood of a failure occurring outside of the existing stress range can be defined as "sigma6," which indicates one failure in a million (0.000001). In smaller scale manufacturing, failure rates of one in a thousand (0.001) can be acceptable, although such a larger value increases the risk associated with the manufacturing process and decreases the confidence in the probability values.

The computed failure rates for this example are shown in TABLE 2 below.

TABLE 2

| Failure Rate (F) |
| --- |
| 0.027777778 |
| 0.083333333 |
| 0.138888889 |
| 0.194444444 |
| 0.25 |
| 0.305555556 |
| 0.361111111 |
| 0.416666667 |
| 0.472222222 |
| 0.527777778 |
| 0.583333333 |
| 0.638888889 |
| 0.694444444 |
| 0.75 |
| 0.805555556 |
| 0.861111111 |
| 0.916666667 |
| 0.972222222 |

In step 3, a linear plot is produced. Linear functions can be expressed as:

$$y = mx + c$$

For the Weibull plot:

$$y = \ln(-\ln(1 - F(x)))$$

$$mx = k \ln(UTS)$$

$$c = -k \ln(\lambda)$$

Therefore, in step 4, the values to be plotted can be computed as $$x = \ln(UTS)$$

$$y = \ln\left(\ln\left(\frac{1}{1-F}\right)\right)$$

Note that, in this case, the constant "k" is the Weibull modulus "m", and the notation has been changed to show a definition change between y=mx+c and m=Weibull modulus. The value c describes the characteristic strength, $\sigma_0$. The value can be derived from the use of the Weibull modulus m after plotting the x and y values. This computation produces the (X,Y) values shown in TABLE 3 below:

TABLE 3

| ln(UTS) | ln(ln(1/(1 − F))) |
| --- | --- |
| 6.761602 | −3.569466566 |
| 6.768311 | −2.441716399 |
| 6.791597 | −1.900246641 |
| 6.806089 | −1.531444495 |
| 6.818571 | −1.245899324 |
| 6.825916 | −1.008836175 |
| 6.835336 | −0.802906864 |
| 6.837993 | −0.6180462 |
| 6.83941 | −0.447725701 |
| 6.840849 | −0.287274696 |
| 6.841548 | −0.132995836 |
| 6.851064 | 0.018399271 |
| 6.853866 | 0.170268936 |
| 6.862065 | 0.32663426 |
| 6.863956 | 0.493237123 |
| 6.865708 | 0.680102987 |
| 6.879722 | 0.910235093 |
| 6.888517 | 1.276345261 |

FIG. 2C shows the results 210 of plotting the computed failure values. A trend line and linear regression can be applied to evaluate the "goodness of fit" for this data set. In this example, the following values can be extracted:

Weibull Modulus m=34.864

Characteristic Strength $\sigma_0$=945 MPa

In step 5, the computed information can be used to calculate the reliability of the specimens not failing at a given strength, as shown in TABLE 4 below:

TABLE 4

| Fail | F | Y | X | Stress Constraint |
| --- | --- | --- | --- | --- |
| 1/100 | 0.01 | −4.60015 | 6.719248 | 828 |
| 1/1000 | 0.001 | −6.90726 | 6.653073 | 775 |
| 1/1000000 | 0.000001 | −13.8155 | 6.454925 | 636 |

Based on this example of physical testing results, the following can be expected with 90% confidence: (i) any feature subjected to a stress ≥828 MPa, that is vertically manufactured with a thickness of 1 mm, can be expected to see a 1/100 failure rate; and (ii) any feature subject to a stress ≥636 MPa, can be expected to see a 1/1,000,000 failure rate.

These data can be visualized. For example, as described above, FIG. 2B shows a Weibull model with probability as a function of failure stress. FIG. 2D shows the cumulative probability of failure 212 as a function of failure stress. FIG. 2E shows the survivor function 215 with probability of survival shown as a function of failure stress. FIG. 2F shows the probability density 218 of failure stress with the probability density measured as a function of failure stress. (In these examples, probability is measured in the range 0 to 1, and failure stress is measured in MPa.)

In addition to including a model that relates the structural performance metric to the specific likelihoods of failure, the statistical model can include a survivor function that relates values of the performance metric to specific likelihoods of failure for a material (or for two or more materials) of a given thicknesses, e.g., a reliability function that represents the probability that a manufactured component of a given thickness will survive longer than a specified time. A survivor function can be computed using a data set obtained by physical testing of a specific material, for example, by fitting a curve to data obtained by testing a material of a given thickness under a variety of stress conditions to determine whether the material survived for at least a specified time. For example, FIG. 2E, presented in the example above, shows an example of a Weibull statistical model 215 computed as a survivor function. The function relates a structural performance metric of failure stress measured in MPa to the probability that a manufactured component will survive longer than a specified time (with values from 0 to 1).

Figure 2H:
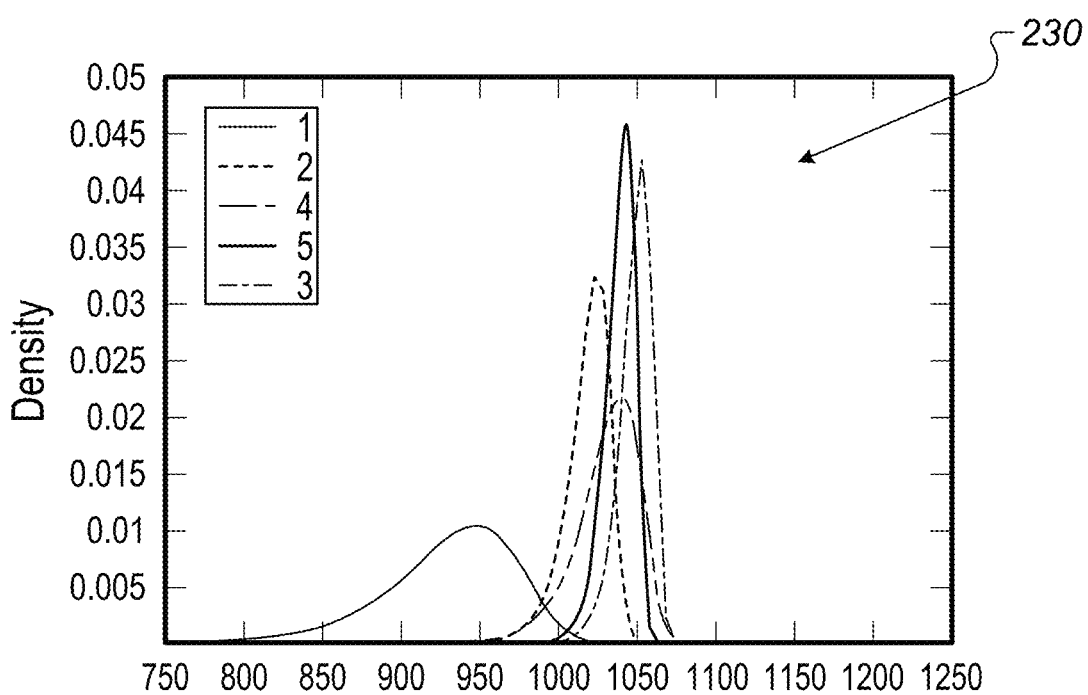
FIG. 2H shows a probability density as a function of failure stress for five thicknesses of the material.

In addition, the statistical model can include a survivor function that relates values of the performance metric to specific likelihoods of failure for a material (or for two or more materials) across different thicknesses, e.g., a reliability function that represents the probability that, for each of two or more thicknesses, a manufactured component will survive longer than a specified time. For example, FIG. 2G show a statistical model (in the form of survivor functions) that relates values of a structural performance metric (such as failure stress measured in MPa) to specific likelihoods of failure 220, 222, 224, 226, 228 for a material across five different thicknesses of the material. In this example, the material at thickness 1 220 has the lowest survivor rate across the values of the structural performance metric, while the material at thickness 3 228 has the highest survivor rate across the values of the structural performance metric. FIG. 2H shows similar data plotted as probability density 230 as a function of failure stress (measured in MPa) for five thicknesses of the material.

Figure 2I:
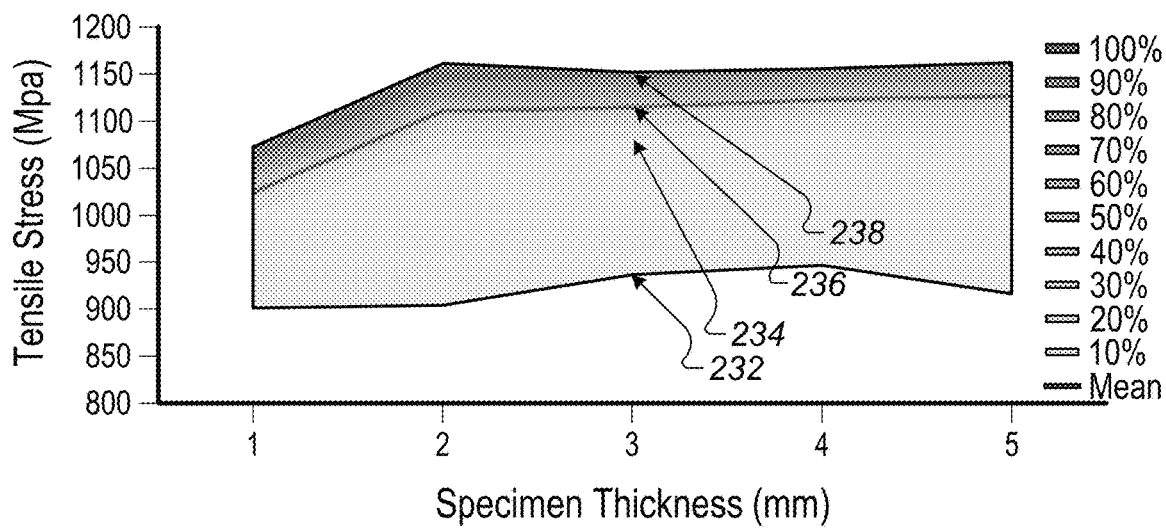
FIG. 2I shows a failure probability distribution for a material of different thicknesses as a function of tensile strength.

Further, the statistical model can include a function that relates material thickness and a performance metric, such as tensile stress measured in MPa, to the likelihood of failure of the material (with values from 0 to 1). Such an example is shown in FIG. 2I which shows a failure probability distribution for a material of different thicknesses (in this example 1 mm to 5 mm) as a function of tensile strength (measured in MPa). Looking at the specific case of a 3 mm material thickness, the plot shows 232 that at approximately 940 MPa of tensile stress, the normalized failure rate is approximately 10% and remains in a failure rate range of 10% to 20% until the tensile stress reaches approximately 1080 MPa 234. The mean failure rate 236 is reached at approximately 1110 MPa. Finally, 100% failure rate is reached 238 at approximately 1150 MPa.

Figure 2M:
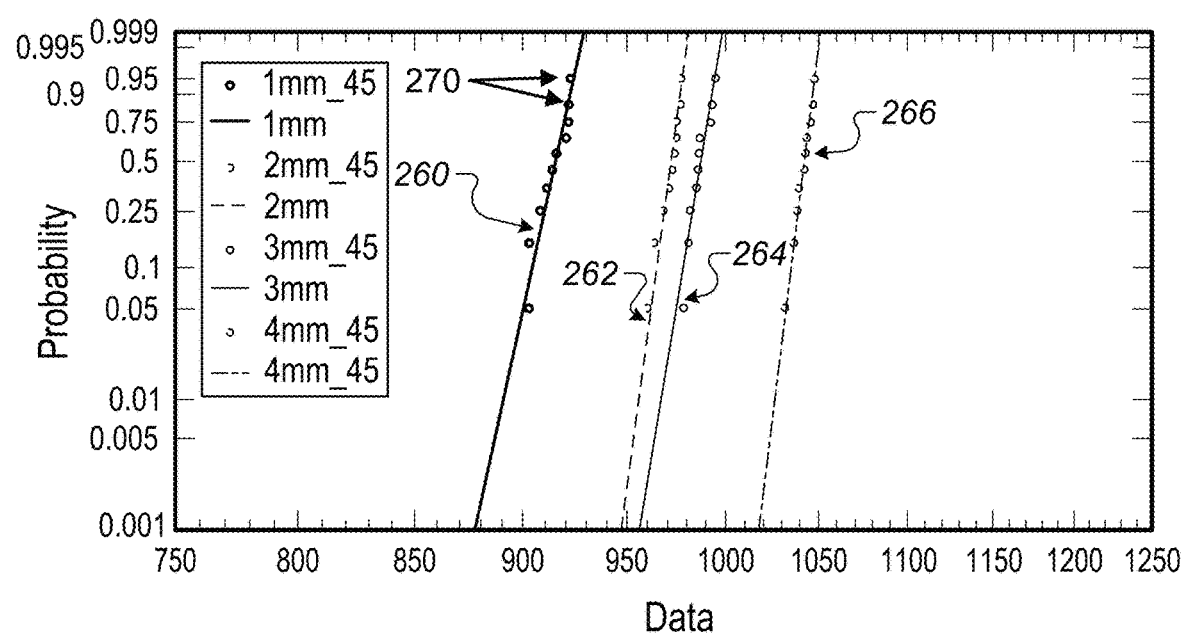
FIG. 2M shows an example function that relates the failure probability as a function of tensile strength.
Figure 2J:
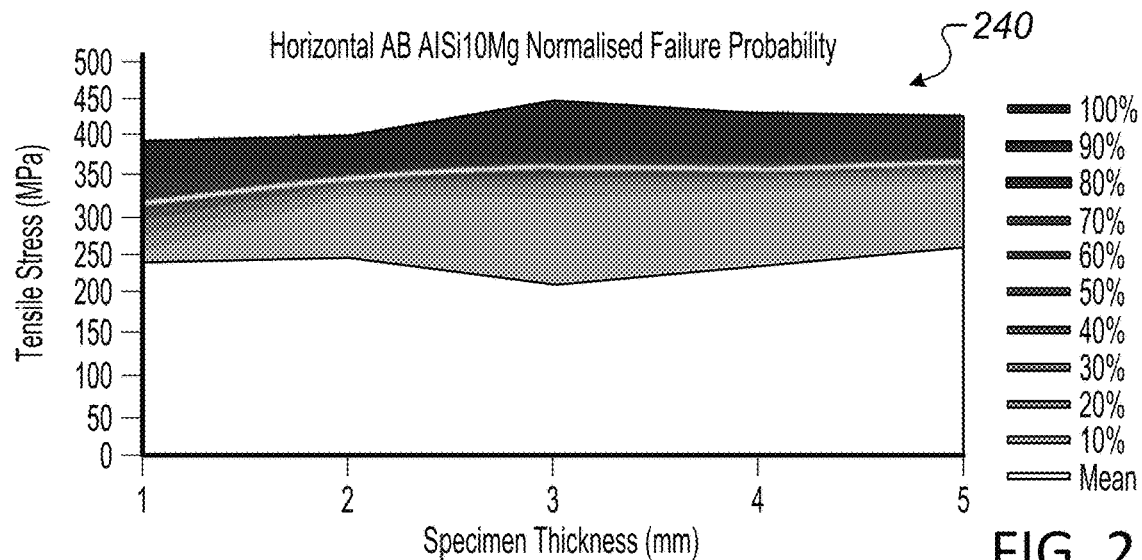
FIGS. 2J-2L show failure probability distributions.
Figure 2K:
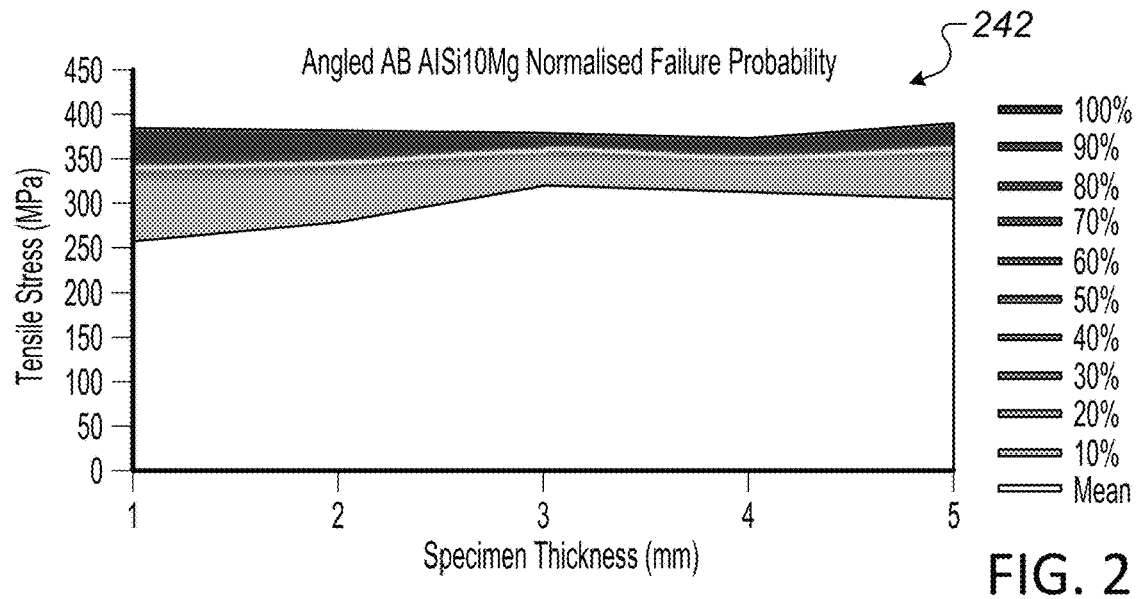
Figure 2L:
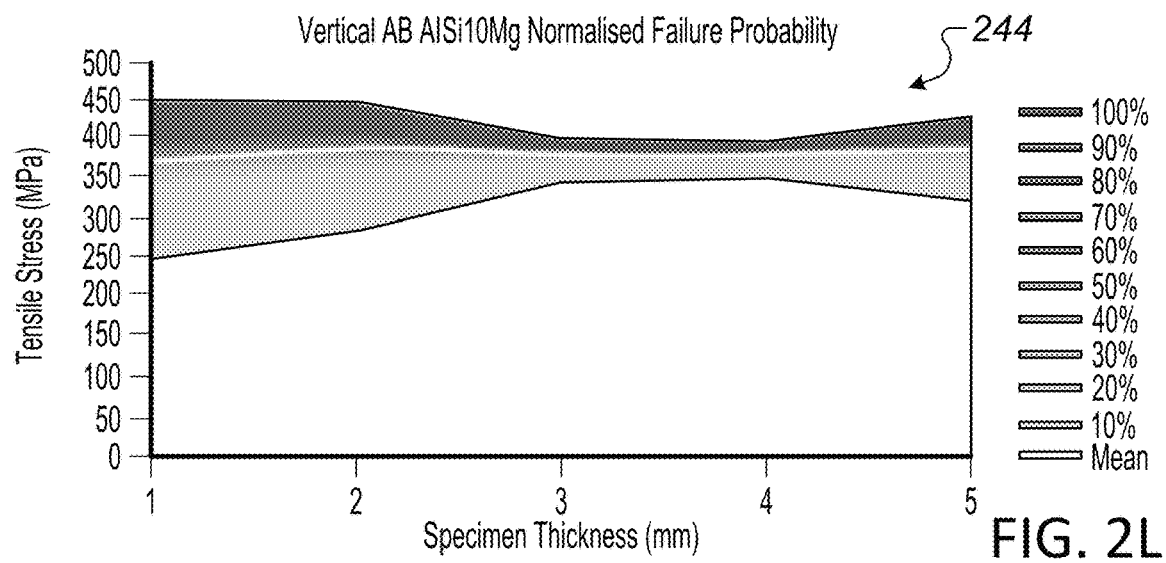

Importantly, the failure probability distribution for a material of different thicknesses can vary based not only on the type and thickness of the material, but also on a particular batch of a material and the build angle. For example, FIGS. 2J, 2K and 2L show the failure probability distribution for three build angles. FIG. 2J shows a horizontal build angle 240, FIG. 2K shows an angled build angle 242, and FIG. 2L shows a vertical build angle 244.

FIG. 2B shows a function that relates failure probability as a function of tensile stress for a single example. Similar functions can also be computed for materials at various thicknesses. For example, FIG. 2M shows an example of such a function that relates, for materials of 1 mm 260, 2 mm 262, 3 mm 264, and 4 mm 266 thickness, the failure probability as a function of tensile strength as measured in MPa. Data points 270 obtained by testing the material under varying stress conditions are plotted and the curves 260, 262, 264, 266 are fitted to those points.

While different examples of statistical models have been described, it should be noted that additional variations are also possible. In general, any suitable smooth function that accommodates a notion of probability of failure based on statistical data for one or more materials can be used, regardless of the specific form of the function, e.g., a reliability function, probability of failure function, a probability density function, or other, and regardless of whether or not a specific time frame is specified.

Returning to FIG. 1B, in some implementations, a macro-structure (or geometrical) type of generative model (e.g., a level-set representation of the 3D model) is initiated 182, e.g., by the CAD program(s) 116, using the obtained 180 design space and design criteria. In some implementations, the generative design process uses level-set method(s), where s, from Equations 1, 2 & 3, represents a boundary of a solid region that is implicitly represented using one or more level-sets, which are signed distance values computed on a Cartesian background grid; an initial level-set $\psi_0$ can be created by converting the starting shape to a signed distance field (SDF). This conversion can be done using an implementation of an OpenVDB toolkit. Other methods are also possible.

In a level-set-based topology optimization method, the outer shape of a structure is represented by a one-dimensional high-level level set function, and a change in shape and configuration is replaced by a change in the level set function value, so as to obtain an optimum structure. The level set function refers to a function that indicates whether each part of the design domain where the initial structure is set corresponds to a material domain (material phase) that forms the structure and is occupied by a material, a void domain (void phase) where a void is formed, or a boundary between these two domains, wherein a predetermined value between a value representing the material domain and a value representing the void domain represents the boundary between the material domain and the void domain.

In some implementations that use level-set based topology optimization methods, one or more octree data structures are used for resolving geometry accurately. Level-set based topology optimization generally involves optimizing the shape of a design domain using a shape derivative, which is the derivative of a constrained minimization problem with respect to the shape. The shape changes are applied on the level-set, which allows topology changes during shape modifications. The outcome of this type of generative design process is the partitioning of the design space into solid and void regions, resulting in an optimized shape, often with topology changes. For this type of level-set-based topology optimization, as well as the variations on this type of level-set-based topology optimization described in this document, one or more of the following approaches can be used.

Linear Elastic Topology Optimization

Consider the linear elastic boundary value problem for a solid body with the domain $\Omega$:

$$-\nabla \cdot D\epsilon(u) = f \text{ in } \Omega \qquad (4)$$

$$u = 0 \text{ on } \Gamma_D \qquad (5)$$

$$D\epsilon(u)n = \bar{t} \text{ on } \Gamma_N \qquad (6)$$

where $\epsilon(u)$ is the linear strain tensor, D is the fourth order constitutive tensor, u is the displacement vector, f is the external load vector and $\bar{t}$ is the prescribed traction on the Neumann boundary $\Gamma_N$ with the outward normal n. For simplicity, homogeneous Dirichlet boundary conditions can be assumed on $\Gamma_D$. The constrained topology optimization problem can then be $$\text{minimize } J(\Omega, u) \qquad (7)$$

$$\text{subject to } -\nabla \cdot D\epsilon(u) = f \text{ in } \Omega \qquad (8)$$

$$u = 0 \text{ on } \Gamma_N \qquad (9)$$

$$D\epsilon(u)n = t \text{ on } \Gamma_N \qquad (10)$$

where compliance minimization can be used as the objective function $$J(\Omega, u) = \int_\Omega f \cdot u \, d\Omega + \int_{\Gamma_N} \bar{t} \cdot u \, d\Gamma = \frac{1}{2} \int_\Omega D \in (u){:} \in (u) \, d\Omega \quad (11)$$

A linear mapping can be defined to map a given domain $\Omega$ into a perturbed domain $\Omega t$. With this mapping, a material point with the coordinate $x \in \Omega$ can be mapped onto $$x_t = x + t\delta v, t \geq 0 \quad (12)$$

where $\delta v$ is a prescribed constant vector field, and t is a scalar parameter. Note that solving equations using gradient based mathematical programming methods involves using the directional derivative of the objective function in the direction of the velocity field $\delta v$ $$\frac{dJ}{d\Omega}(\Omega, u(x))\delta v = \lim_{t \to 0} \frac{J(\Omega_t, u(x_t)) - J(\Omega, , u(x))}{t} \quad (13)$$

More than one approach can be used to obtain the directional derivative of the objective function for use in gradient based optimization methods. Approaches that are suitable for use with gradient based optimization methods include direct differentiation, semi-analytical derivatives, adjoint method, and finite difference. Moreover, further approaches to obtaining values for a directional derivative of an objective function, including approximation techniques, are described in detail below in connection with FIGS. 4A-5.

Adjoint Method

Evaluating the shape derivative (Equation 13) can require the directional derivative of the state variable u in the direction of the velocity vector $\delta v$. This is can be seen by using the chain rule $$\frac{dJ}{d\Omega}\delta v = \frac{\partial J}{\partial \Omega}\delta v + \frac{\partial J}{\partial u}\frac{\partial u}{\partial \Omega}\delta v \quad (14)$$

But in some implementations, an adjoint method can be used which involves the formation of a Lagrangian $L(\Omega, u, \lambda)$ which depends on domain shape $\Omega$, displacement field u, and Lagrange parameters $\lambda$ $$L(\Omega,u,\lambda) = J(\Omega,u) + \lambda [\int_\Omega f + \nabla \cdot D \in (u) d\Omega - \int_{\Gamma_N} \bar{t} \, ud\Gamma + \int_{\Gamma_D} \bar{t} - D \in (u) n d\Gamma] \quad (15)$$

The stationary condition for the Lagrangian, i.e., $\delta L(\Omega, u, \lambda) = 0$, can yield a complete set of shape optimization equations. For example, the adjoint problem for compliance minimization (Equation 11) can be given by considering the variation of the Lagrangian with respect to the displacements u. After introducing the cost function (Equation 11) and reformulating the domain term with the divergence theorem $$\int_\Omega f \cdot \delta u d\Omega + \int_{\Gamma_N} \bar{t} \delta u d\Gamma - \int_\Omega \delta u \cdot (\nabla \cdot \sigma(\lambda)) d\Omega - \int_{\Gamma_D} \lambda \cdot (D{:}\nabla(\delta u)) n d\Gamma + \int_{\Gamma_N} \delta u \cdot \sigma(\lambda) n d\Gamma = 0 \quad (16)$$

the corresponding boundary value problem, referred to as the adjoint problem, can become $$-\nabla \cdot \sigma(\lambda) = -f \text{ in } \Omega \quad (17)$$

$$\lambda = 0 \text{ in } \Gamma_D \quad (18)$$

$$\sigma(\lambda) \cdot n = \bar{t} \text{ in } \Gamma_N \quad (19)$$

This can lead to determining that $\lambda = -u$ is the solution of the adjoint problem. This means that the adjoint problem (Equations 17-19) does not need to be solved explicitly for the compliance minimization problem (Equation 11). Such problems are called self-adjoint, where the solution of the direct problem also yields the adjoint solution. However, this is not often the case and different adjoint problems may have to be solved depending on the nature of the direct problem and the objective function. An advantage of the use of the Lagrangian as is includes the identity:

$$\frac{dJ}{d\Omega}(\Omega, u(x))\delta v = \frac{\partial L}{\partial \Omega}(\Omega, u(x), \lambda)\delta v \quad (20)$$

This equation can enable the shape derivative (Equation 13) to be expressed as a boundary integral of the following form:

$$DJ(x, u(x))[\delta v] = \int_\Omega f(u, \lambda)(\nabla \cdot \delta v) d\Omega \quad (21)$$
$$= \int f(u, \lambda)(\delta v \cdot n) d\Gamma$$

Without loss of generality, it can be assumed that some boundary variations are not relevant in practical shape optimization. In solid mechanics, the boundary variations can usually be of the form:

$$\delta v = 0 \text{ on } \Gamma_D \quad (22)$$

$$\delta v = 0 \text{ on } \Gamma_N \text{ with } \sigma n = \bar{t},$$

$$\delta v \neq 0 \text{ on } \Gamma_N \text{ with } \sigma n = 0.$$

This means that only parts of the boundary $\Gamma_N$ with no traction are free to move during the shape optimization. In this context, the variation of the Lagrangian (Equation 15) in the direction $\delta \hat{v}$ with structural compliance (Equation 11) as the cost function can become:

$$\frac{\partial L}{\partial \Omega}\delta v = \int_{\Gamma_v}(2u \cdot f - \nabla u{:}\sigma(u))(\delta v \cdot n) d\Gamma \quad (23)$$

Without restricting $\delta v$ as stated in Equation 22, the variation of the Lagrangian can contain several more terms. During iterative optimization of the shape, the shape derivative (Equation 23) can be used as gradient information. In order to achieve maximum decrease in the objective function, the boundary perturbation can be chosen as follows $$\delta v = -(2u \cdot f - D \in (u){:} \in (u)). \quad (24)$$

This boundary perturbation can be applied along the direction of the normal $\delta \hat{v} = vn$, where v is the shape change velocity and is given by $$v = \frac{dJ}{d\Omega}(\Omega, u(x))\delta v = \int_\Gamma (2u \cdot f - D \in (u){:} \in (u))(\delta v \cdot n) d\Gamma \quad (25)$$

Volume Control

Topology optimization using only a compliance minimization objective (Equation 11) can result in the optimum topology covering the full design space. Thus, some form of volume constraint is often required. Moreover, in some implementations, control over volume changes during topology optimization can be important for several reasons: 1) to enforce volume constraints; 2) to provide user control of topology optimization progress, e.g., more volume changes during initial iterations and fewer volume changes during later iterations; and 3) to ensure that arbitrary constraints not having shape derivatives are satisfied.

Note that the presence of shape derivatives for constraints can require modifying the shape change velocity in Equation 25. A modified objective function can be considered where the volume is penalized by a penalty parameter $\mu$ in:

$$J(\Omega, u) = \frac{1}{2}\int_{\Gamma}(D \in (u): \in (u)d\Omega + \mu V(\Omega))d\Gamma \quad (26)$$

The corresponding shape derivative (Equation 25) can then be given by:

$$\frac{dJ}{d\Omega}(\Omega, u(x))\delta v = \int_{\Gamma}(2u \cdot f - D \in (u) + \mu)(\delta v \cdot n)d\Gamma \quad (27)$$

where $\mu$ is constant along the boundary. The velocity term in the shape derivative (Equation 25) can now have an additional term as follows:

$$v = -(2u \cdot f - D \in (u): \in (u) + \mu) \quad (28)$$

Augmented Lagrangian Method

In some implementations, an Augmented Lagrangian method is used. Some approaches (e.g., Volume Control above) can have limitations such as creating difficulty in meeting prescribed volume targets. Essentially, the final volume of the design can depend on the value of $\mu$ prescribed in Equation 26. In such cases, meeting prescribed design constraint targets can be achieved by using the Augmented Lagrangian method. Consider the following Lagrangian for compliance minimization with a final volume target of $V_f(\Omega)$:

$$L(\Omega, u) = \frac{1}{2}\int_\Omega D \in (u): \in (u)d\Omega + \mu(V(\Omega) - V_f(\Omega)) + \frac{\lambda}{2}(V(\Omega) - V_f(\Omega))^2 \quad (29)$$

The shape derivative can then be given by:

$$\frac{dJ}{d\Omega}(\Omega, u(x))\delta v = \int_\Gamma\left(2u \cdot f - D \in (u): \in (u) + \mu + \frac{\lambda}{2}(V(\Omega) - V_f(\Omega))\right)(\delta v \cdot n)d\Gamma \quad (30)$$

where the penalty parameters $\lambda$, $\mu$ can be updated in an increasing sequence such that they converge to the optimal Lagrange multipliers. In some implementations, one or more heuristic methods are used for updating penalty parameters.

Body-Fitted Solvers

In some implementations, one or more body-fitted mesh based solvers are used. Using such body-fitted mesh based solvers with the level-set method involves mapping data from the solid mesh to a Cartesian grid (note that the inverse mapping is trivial due to the structured nature of the Cartesian grid). This involves two mappings, which include a data mapping from solid mesh to level-set grid.

Data in solid mesh elements (e.g., strain energy, Von Mises stress) can first be mapped to solid mesh nodes. This mapping can be achieved by data averaging. For example, by averaging, at solid node, the solid mesh element data from the edges and/or faces in the solid mesh adjacent to that solid node. Further, data in the solid mesh nodes can be mapped to voxel grid points using linear shape functions. Data at solid mesh nodes can be linearly interpolated to a level-set grid point in the level-set grid. Having such a mapping can allow the level-set method to be used with complex FEA models solved with body-fitted solvers.

When the generative design process to be used employs a level-set method for topology optimization, the level-set is initiated 182 for the design space. Also, in the detailed examples of a macrostructure topology optimization described in this document, the compliance minimization problem is used with a penalized volume (Equation 26) for simplicity of presentation, and it is presumed that FEA is used for numerical simulation for ease of presentation, but the other numerical simulation types noted above can also be used. Further, while the following description focuses on macrostructure-based generative design, it will be appreciated that microstructure-based techniques, such as SIMP, can be used in some implementations.

The setup for numerical simulation can include one or more physical properties to be simulated and one or more types of simulation to be performed, as discussed above, as well as potentially surrogate modelling or other methods of approximation. In some implementations, the type of numerical simulation is predefined, either for all uses of the program or given a particular context in the program from which the generative design process has been launched. Further, the setup for numerical simulation includes at least one set of loading conditions and/or other physical environment information associated with the type of numerical simulation to be performed.

In some implementations, the portion of the design space to be used as starting geometry can be automatically set by a genetic algorithm or other process. For example, bubble-like holes (e.g., holes 132B in FIG. 1A) can be put in the domain, and a genetic algorithm can be used to vary the bubble size and spacing. The design space can be initialized using a seeding process, in which the design space is defined by a Boolean intersection between the design space $\Omega$ and a seed geometry $\Omega_s$, shown as follows:

$$\Omega\_0 = \Omega \cap \Omega\_s \quad (31)$$

where $\Omega_0$ is the resulting initialized domain after the seeding geometry $\Omega_s$ is applied to the initial design space $\Omega$. The seed geometry can be of a variety of different shapes, e.g., an array of bubbles or a mesh, with parametrized characteristics, e.g., bubble diameter and spacing. The parameters can be user-defined or defined automatically by some seeding process, e.g., bubble seeding, described below.

Initial seeding can result in more efficient optimization and flexibility in design variations. For example, initial seeding can be defined so as to avoid local minima and the need to restart optimizations. Further, initial seeding can aide in creating design variations. In some implementations, a seed geometry is user-defined, e.g., according to a final geometry generated from a previous execution of a design process, a random process to randomly initialize the seeding geometry, according to other factors of interest to the user, or some combination of the preceding.

In any case, an iterative process of modifying a generative model is performed in order to satisfy the design criteria for the physical structure, e.g., one or more design constraints to be met and one or more design objectives to be satisfied. Specifically, the generatively designed three dimensional shape of the modeled object is iteratively modified 184, 186, 192, e.g., by CAD program(s) 116, in the design space in accordance with the design criteria including the one or more loading cases for the numerical simulation of the physical structure and the at least one design constraint to stay under the acceptable likelihood of failure for the physical structure.

Numerical simulation of the physical response of the current model (e.g., a level-set representation of the implicit surface of the 3D shape) is performed 184 using the one or more defined loads. The numerical simulation can include computing the structural performance metric, which is evaluated against the at least one design constraint for the acceptable likelihood of failure for the physical structure. In some implementations, this design constraint is a target value for the structural performance metric, and the evaluation of this design constraint is done in the iterative loop 184, 186, 192 by comparing data in the numerical assessment of the structural performance metric at various locations within the current 3D model with this target value, i.e., without using the statistical model inside the iterative loop 184, 186, 192. Further details regarding such implementations are provided below in connection with FIG. 3A-3B.

In some implementations, this design constraint specifies a maximum likelihood of failure for the physical structure, and the evaluation of this design constraint is done inside the iterative loop 184, 186, 192 using the statistical model to translate values for the structural performance metric (at various locations within the current 3D model as indicated by data in the numerical assessment) into values for the likelihood of failure. Note that since the statistical model is used inside the iterative loop, more detailed data in the numerical assessment from the numerical simulation can be used to determine the likelihood of failure. For example, a likelihood of failure at each of multiple different locations on or in the modeled object can be calculated in accordance with one or more specific geometric parameters of the modeled object at each location, such as a thickness of the 3D model and a build orientation at each respective location. Further details regarding such implementations are provided below in connection with FIG. 3C-3D.

The FEA model used for the numerical simulation can include solid elements throughout the solid region(s) of the generative design space being optimized. In each iteration, the constitutive model D of each element e in the FEA model can be updated by changing the modulus of elasticity according to the relative location of the element with respect to the current level-set. For example, elements outside the level-set (called void elements) are given very low stiffness $D_v$, while the constitutive model of those inside are set to that of the original solid material $D_s$. This can be achieved by checking the average level-set of the element nodes:

$$\psi(e) = \frac{1}{n_e} \sum_{j}^{n_e} \psi(n_j) \tag{32}$$

where $n_j$ denotes the coordinates of element nodes.

Further, while the numerical simulation 184 can treat each solid region in the current model as a homogenous solid material, and each void region in the current model as having no material therein, in some implementations, this treatment can be altered. For example, in hybrid topology optimization, the numerical simulation of the modelled object is performed 184 with at least a portion of the solid region being treated as having at least one void in it (e.g., what the macrostructure generative modeling technique treats as a solid, the numerical simulation treats as partially containing a void in the form of a lattice) or at least a portion of the void region being treated as having at least one solid in it (e.g., what the macrostructure generative modeling technique treats as a void, the numerical simulation treats as partially containing a solid material in the form of a lattice).

As another example, in the case of hollow topology optimization, the numerical simulation of the modelled object is performed 184 with at least a portion of the solid region being treated as having a void in it (i.e., what the macrostructure generative modeling technique treats as a solid, the numerical simulation treats as containing a hollow region). Finally, in a combination of these two, in hybrid hollow topology optimization, the numerical simulation of the modelled object is performed 184 with at least a portion of the solid region being treated as having both a partial void region and a complete void in it (i.e., what the macrostructure generative modeling technique treats as a solid, the numerical simulation treats as partially containing a lattice structure around a hollow region). For further details regarding hybrid, hollow and hybrid-hollow topology optimization, see U.S. Pat. No. 10,635,088, which is hereby incorporated by reference.

Results from the simulation are used to update 186 the current model (e.g., the level-set representation) in accordance with a current numerical assessment of the simulated physical response of the current model. For example, shape change velocities can be calculated for the implicit surface in the level-set representation of the 3D shape of the object being modeled, and this level-set representation can be updated 186 using the calculated shape change velocities to produce an updated version of the 3D shape of the modeled object. In the case of level-set implementations, once the FEA model is up-to-date with the current geometry represented by the level-set, the boundary value problem (Equations 4-6) can be solved in order to compute an advection velocity. Shape changes can be applied by advecting the level-set using, for example, the Hamilton-Jacobi equation:

$$\frac{\partial \psi}{\partial t} - v|\nabla \psi| = 0 \tag{33}$$

where v is the shape derivative (Equation 28). Note that one or more heuristic shape update methods can be used, and one or more methods to move the $0^{th}$ iso-contour of a level-set can be used given a movement direction specified by the shape derivative. A linear mapping between the FEA nodes and the level-set grid points (see Body-fitted Solvers above) can allow the FEA results, e.g., $D\epsilon(u):\epsilon(u)$, to be transferred to the level-set where the advection velocity v is computed.

Once the objective function has converged, the surface of the final level-set can be extracted using a contouring method which extracts the $0^{th}$ iso-contour of $\psi$. An example of the algorithm is as follows:

---
Level-Set Algorithm for Level-set Based Topology Optimization
---

Input: $(\Omega, D_v, D_s, \mu)$
Output: $(\Omega_s)$
// initiate level-set $\psi$ from design space
1: $\psi_0 = f_{SDF}(\Omega)$
// iterate until convergence tolerance c is met
2: $i = 0$
3: while $i = 0$ or $|J_i - J_{i-1}| > c$ do
// set constitutive model of FEA elements as void $D_v$ or solid $D_s$ 4: $K_e \begin{cases} B^T D_s B & \text{if } \psi_i(e) \leq 0 \\ B^T D_v B & \text{if } \psi_i(e) > 0 \end{cases}$ // formulate and solve FEA problem 5: $K = \sum_e^n K_e$ 6: $u - K^{-1}f$
// compute advection velocity 7: $v = \frac{1}{2} D \in (u): \in (u) + \mu$ // solve Hamilton-Jacobi and obtain new level-set $\psi_{i+1}$ 8: $\frac{\partial \psi_i}{\partial t} - v|\nabla \psi_i| = 0$ 9: $\psi_{i+1} \leftarrow \psi_i$
// compute objective 10: $J_{i+1} = \frac{1}{2} \int_\Omega D \in (u): \in (u) \, d\Omega$ // increment iteration
11: $i \leftarrow i + 1$
12: end while
// obtain final level-set as solid region 13: $\Omega_s \leftarrow \int_{SDF}^T (\psi_{i+1})$

---

Note that generalizing this algorithm for arbitrary objectives and constraints can require modifications, such as the following. In line 6, any adjoint problems (see Adjoint Method above) needed for computing shape derivatives of each objective and constraint should be addressed. In line 7, the augmented Lagrangian method (see Augmented Lagrangian Method above) should be used for combining the different shape derivatives to yield a single advection velocity. For further details regarding implementing these modifications to generative design processes generally, see Augmented Lagrangian Algorithm for Constrained Shape Optimization below.

Geometry

Let $\Sigma$ be a smooth, watertight, oriented surface in Euclidean space, with normal vector field $N_\Sigma$ pointing in the direction of "free space" outside of $\Sigma$. A solid object can be created out of $\Sigma$ by "thickening" it in the negative normal direction. That is: a small $h \in \mathbb{R}_+$ can be chosen to define $$\Omega_h := \{x - sN_\Sigma(x): \text{ for all } x \in [0,h]\} \tag{34}$$

In plain English, $\Omega_h$ consists of all points sandwiched between $\Sigma$ and an offset of $\Sigma$ by a distance h in the negative normal direction, which is denoted $$\Sigma_h := \{x - hN_\Sigma(x): \text{ for all } x \in \Sigma\} \tag{35}$$

The boundary $\partial \Omega_h$ of $\Omega_h$ consists of two disjoint surfaces: $\Sigma$ itself and the offset surface $\Sigma_h$.

Note that what is commonly referred to as the "outward" unit normal vector field of $\partial \Omega_h$ (which points from inside the solid material defined by $\Omega_h$ to outside the solid material) is equal to $N_\Sigma$ on $\Sigma$ but points in the opposite direction to $N_\Sigma$ on $\Sigma_h$. Its exact formula at $y \in \Sigma_h$ is $-N_\Sigma(\text{proj}_\Sigma(y))$ where $\text{proj}_\Sigma$ is the mapping that takes a point y to its closest point on $\Sigma$—so for example, if it is known that $y = x - hN_\Sigma(x)$ and h is sufficiently small, then $\text{proj}_\Sigma(y) = x$.

Deformations of the Geometry $\Sigma$ can be allowed to deform. The deformation can be generated by a surface normal speed function which can be denoted as $\theta^\perp: \Sigma \to \mathbb{R}$. Such a deformation can be achieved in a number of ways: for example, representing $\Sigma$ as the zero level set of a function on the background Euclidean space and using advection with respect to (an extension of) $\theta^\perp$.

The methods can be equivalent to first order in the deformation. What matters is the infinitesimal variation of $\Sigma$ itself, which is precisely the surface normal speed function. Any deformation of $\Sigma$ will have a notion of the "magnitude" of the deformation, which is a positive scalar $\epsilon$. For example, if the deformation is generated by advection, then the magnitude of the deformation corresponds to the advection time. The deformed surface can be denoted by $\Sigma_\epsilon$.

Once $\Sigma$ deforms, then $\Sigma_h$ deforms as well. It is simply "dragged along" in such a way that the offset distance h is maintained between $\Sigma_\epsilon$ and the deformed version of $\Sigma_h$. Consequently the deformation of the thickened object $\Omega_h$ is completely determined by the deformation of $\Sigma$. Note that it can be shown that the infinitesimal variation of $\Sigma_h$ at a point $y \in \Sigma_h$ is just $-\theta^\perp (\text{proj}_\Sigma(y))$ where $\text{proj}_\Sigma$ is the mapping that takes a point y to its closest point on $\Sigma$.

Optimization by Steepest Descent

An optimal $\Sigma$ can be found for some objective function: Surfaces$\to \mathbb{R}$ using a Steepest Descent method. This is based on the shape Taylor formula which says that the variation of $\Sigma$ by a magnitude $\epsilon$ with respect to variations generated by some $\theta^\perp: \Sigma \to \mathbb{R}$ as above satisfies $$\Phi(\Sigma_\epsilon) \approx \Phi(\Sigma) + \epsilon D\Phi_\Sigma(\theta^\perp) \tag{36}$$

for sufficiently small $\epsilon$, where $D\Phi_\Sigma(\Phi^\perp)$ symbolizes the shape derivative of $\Phi$ at $\Sigma$.

Using a formula for the shape derivative in terms of $\theta^\perp$, a particular $\theta^\perp$ can be chosen such that the shape derivative term in the shape Taylor formula is guaranteed to be negative. As a result, the objective function will decrease if $\Sigma$ is varied with respect to this chosen $\theta^\perp$, at least for a sufficiently small $\epsilon$. After $\Sigma$ is updated by performing the variation (e.g., by advection of the level set function representing $\Sigma$), the updated shape represents an improvement with respect to the objective function. For further improvement, the procedure can be iteratively repeated until convergence occurs.

Shape Derivative for a Class of Objective Functions

Consider objective functions of the following form. Let $\Phi_0$: Domains$\to \mathbb{R}$ be some "volumetric" shape function (e.g., one which can be evaluated on a volumetric domain) such as a convex linear combination of the averaged structural compliance with respect to a set of load cases and the total mass. This allows definition of a "surface" shape function by $$\Phi(\Sigma) = \Phi_0(\Omega_h) \tag{37}$$

It can be assumed that it is known how to calculate the shape derivative of $\Phi_0$ at an arbitrary domain $\Omega$ and with respect to an arbitrary variation $\Omega_\epsilon$ of $\Omega$ generated by a boundary normal speed function $V^\perp: \partial\Omega \leftarrow \mathbb{R}$ with respect to the outward unit normal vector field of $\Omega$. That is, $\Phi_0$ can be standard, meaning that the shape derivative satisfies the Hadamard-Zolésio structure theorem, and providing the formula $$\Phi_0(\Omega_\varepsilon) \approx \Phi_0(\Omega) + \varepsilon D\Phi_{0,\Omega}(\theta^\perp) \text{ where } D\Phi_{0,\Omega}(\theta^\perp) := \int_{\partial\Omega} G_\Omega(x) V^\perp(x) d\sigma(x) \quad (38)$$

for sufficiently small $\varepsilon$. The function $G_\Omega$ of $\Omega$ is known as the shape gradient of $\Phi_0$ at the shape $\Omega$. The precise form of $G_\Omega$ depends on $\Phi_0$ and can be worked out by calculating the derivative $$\frac{d}{d\varepsilon}\Phi_0(\Omega_\varepsilon),$$

e.g., for averaged structural compliance and volume.

The shape derivative of $\Phi$ can be expressed in terms of the shape derivative of $\Phi_0$. This can be done by leveraging the above formula for the shape derivative of $\Phi_0$, applied to $\Omega_h$, almost exactly, and taking into account the nature of the boundary normal speed on the two disjoint surfaces making up $\partial\Omega_h$. That is: $\Sigma$ can have the boundary normal speed $V^\perp := \theta^\perp$, whereas $\Sigma_h$ can have the boundary normal speed $V^\perp := -\theta^\perp \circ \text{proj}_\Sigma$. Then, the first-order change in $\Phi$ under a variation $\Sigma_\varepsilon$ of $\Sigma$ generated by the normal speed function $\theta^\perp$ is given by $$\Phi(\Sigma'_\varepsilon) \approx \Phi(\Sigma) + \varepsilon(\int_\Sigma G_{\Omega_h}(x)\theta^\perp(x)d\sigma(x) - \int_{\Sigma_h} G_{\Omega_h}(y)\theta^\perp(\text{proj}_\Sigma(y))d\sigma(y)) \quad (39)$$

Thus, the desired shape derivative formula is $$D\Phi_\Sigma(\theta^\perp) := \int_\Sigma G_{\Omega_h}(x)\theta^\perp(x)d\sigma(x) - \int_{\Sigma_h} G_{\Omega_h}(y)\theta^\perp(\text{proj}_\Sigma(y))d\sigma(y) \quad (40)$$

Note that y can be used as the dummy integration variable on $\Sigma_h$ simply to emphasize that the two integrals are over different spaces and cannot a priori be combined in any simple way.

Extracting a Descent Direction

Recall that the utility of the exact formula for the shape derivative is that it should allow $\theta^\perp$ to be chosen in such a way that the shape derivative becomes negative, resulting in a decrease of the objective function to first order according to the shape Taylor formula. It is, however, not immediately clear how to do this for the shape derivative of $\Phi$ calculated above. This is due to the fact that there are two competing terms (e.g., the integral over $\Sigma$ and the integral over $\Sigma_h$) and it is not clear how these balance out given $\theta^\perp$.

There are two ways to proceed. The first way is to apply the Hilbert space method of extracting a descent direction. The second way is to apply a change of variables to the integral over $\Sigma_h$, allowing it to be expressed as an integral over $\Sigma$. This is simple: recall that any point y $\Sigma_h$ can be written in the form $y = x - hN_\Sigma(x)$; for our purpose now, this should be viewed as a mapping from $\Sigma$ to $\Sigma_h$. Call this mapping n: $\Sigma \rightarrow \Sigma_h$, with $n(x) := x - hN_\Sigma(x)$. So by the change of variables formula for surface integrals $$\int_{\Sigma_h} G_{\Omega_h}(y)\theta^\perp(\text{proj}_\Sigma(y))d\sigma(y) = \int_{n(\Sigma)} G_{\Omega_h}(y)\theta^\perp(\text{proj}_\Sigma(y))d\sigma(y) \quad (41)$$

$$= \int_\Sigma G_{\Omega_h}(x - hN_\Sigma(x))\theta^\perp(\text{proj}_\Sigma(x - hN_\Sigma(x)))\text{Jac}(x)d\sigma(x) \quad (42)$$

$$= \int_\Sigma G_{\Omega_h}(x - hN_\Sigma(x))\theta^\perp(x)\text{Jac}(x)d\sigma(x) \quad (43)$$

where Jac is the Jacobian of n and is based on the fact that $\text{proj}_\Sigma(x - hN_\Sigma(x)) = x$ for all $x \in \Sigma$.

It turns out that the Jacobian of n can be determined. With some help from differential geometry, it can be shown that $\text{Jac}(x) = 1 + hH_\Sigma(x) + h^2 K_\Sigma(x)$ where $H_\Sigma$ is the mean curvature of $\Sigma$ and $K_\Sigma$ is the Gauss curvature of $\Sigma$, providing $$D\Phi_\Sigma(\theta^\perp) = \quad (44)$$
$$\int_\Sigma (G_{\Omega_h}(x) - G_{\Omega_h}(x - hN_\Sigma(x))(1 + hH_\Sigma(x) + h^2 K_\Sigma(x)))\theta^\perp(x)d\sigma(x)$$

This manipulation of $D\Phi_\Sigma(\theta^\perp)$ provides a nice formula for the shape gradient of $\Phi$ at $\Sigma$, denoted as $$G_\Sigma(x) := G_{\Omega_h}(x) - G_{\Omega_h}(x - hN_\Sigma(x))(1 + hH_\Sigma(x) + h^2 K_\Sigma(x)). \quad (45)$$

Consequently, the choice of $\theta^\perp = -G_\Sigma$ makes $D\Phi_\Sigma(\theta^\perp)$ negative, as required for our steepest descent procedure updating $\Sigma$ towards optimality of $\Phi$.

Augmented Lagrangian Algorithm for Constrained Shape Optimization

Introduction

An algorithm can be developed that solves constrained shape optimization problems where a shape function is to be minimized (e.g., volume or compliance) subject to a mix of equality and inequality constraints. These constraints can use shape functions (e.g., a target volume, an aggregated stress measure, or an aggregated displacement measure). A different algorithm can be used for dealing with non-aggregated (a.k.a. pointwise) constraints, such as the norm of the stress at each point of the shape. Generically, the optimization problems can be of the form $$\min_{\Omega \in Adm} F(\Omega, u_\Omega) \quad (46)$$

$$\text{s.t. } G_E(\Omega, u_\Omega) = 0 \quad (47)$$

$$G_I(\Omega, u_\Omega) = 0 \quad (48)$$

for $u_\Omega$ satisfying a linear elastic PDE in $\Omega$ where Adm is a set of admissible shapes, F is a scalar-valued shape-differentiable shape function, and $G_E$ and $G_I$ are vector-valued shape-differentiable shape functions that can depend explicitly on the shape, or implicitly on the shape through its elastic response under loads.

The Classical Augmented Lagrangian Algorithm

Equality Constraints

The augmented Lagrangian method in the classical setting of optimizing a scalar function of a vector variable can apply most simply to equality-constrained optimization problems of the form $$\min_{x \in \mathbb{R}^n} f(x) \quad (49)$$

$$\text{s.t. } g_i(x) = 0 \text{ for } i = 1, \ldots, k$$

The augmented Lagrangian method is an enhancement of a so-called penalty method. The penalty method considers a penalized objective function $$L_c(x) := f(x) + \frac{c}{2}\sum_i [g_i(x)]^2$$

and a sequence $c:=c_k$ tending to infinity. Then, one can define $x_k:=\arg\min_x L_{c_k}(x)$. It is by no means the case that $g_i(x_k)=0$ for any i. But since the increasing sequence of c-values penalizes the constraints more and more heavily, it can be expected that $x_k$ eventually satisfies the constraints, in the sense that if $x_k$ converges to $x_*$ then $g_i(x_*)=0$ for all i. Additionally, it can be expected that $x_*$ is a solution of Equation 49.

A problem with the penalty method is that the increasing sequence of c-values can make it harder and harder to minimize $L_c(x)$ numerically due to poor conditioning. The augmented Lagrangian method can remedy this problem. This algorithm minimizes an "augmented Lagrangian"

$$L_c(x, \mu) := f(x) \sum_i \mu_k^i g_i(x) + \frac{c}{2} \sum_i [g_i(x)]^2 \tag{50}$$

and also maintains a sequence of Lagrange multipliers $\mu_k$ and increasing penalty parameters $c_k$. Again, one can define $x_k:=\arg\min_x L_{c_k}(x, \mu_k)$. These sequences are updated in such a way that $c_k$ stabilizes on some large but finite value (hence avoiding the ill-conditioning inherent to general penalty methods). This occurs while $x_k$ converges to a solution of Equation 49 (it is thus optimal and feasible) and $\mu_k$ converges to the Lagrange multiplier $\mu_*$ associated to $x_*$ in the KKT conditions. Since the augmented Lagrangian method iterates on both the primal variable x and the "dual" variable $\mu$, this algorithm is an example of a primal-dual optimization method.

The general framework for the augmented Lagrangian algorithm can require a method to increase the penalty parameters and a method for tightening tolerances 1. Choose a final tolerance $T_{final}$.
2. Set k=0. Start with an initial tolerance $c_0$, $\mu_0$. Start with an initial tolerance $T_0$ less restrained than $T_{final}$.
3. While not converged to within tolerance $T_{final}$:
   a. Apply an unconstrained optimization algorithm to the problem $\min_x L_{c_k}(x, \mu_k)$. Stop the algorithm when a convergence to within tolerance $T_k$ is reached. Output $x_{k+1}$ to be the x-value at this level of convergence.
   b. Check constraint satisfaction
      (i) If the constraints are not satisfied to within tolerance $T_k$, let $c_{k+1}:=$Increase $(c_k)$ and $\mu_{k+1}:=\mu_k$.
      (ii) If the constraints are satisfied to within tolerance $T_k$, update the Lagrange multipliers by $\mu_{k+1}^i:=\mu_k^i+c_k g_i(x_{k+1})$.
   c. Set the tolerance $T_{k+i}:=$Tighten $(T_k)$.
   d. Increment k.

Note the feature of the above algorithm that is the update of the Lagrange multiplier. It can be understood as follows. The unconstrained minimum of the augmented Lagrangian at iteration k satisfies $\nabla L_{c_k}(x_k, \mu_k)=0$ or $$\nabla f(x_k) + \Sigma_i (\mu_k^i + c_k g_i(x_k)) \nabla g_i(x_k) = 0 \tag{51}$$

Of course, the solution $x^*$ and the Lagrange multipliers $\mu_*^i$ for the equality-constrained optimization Equation 49 satisfy $$\nabla f(x_*) + \Sigma_i \mu_*^i \nabla g_i(x_*) = 0 \tag{52}$$

$$g_i(x_*) = 0 \text{ for } i=1, \ldots, k \tag{53}$$

In the augmented Lagrangian algorithm, since it is desirable to ensure that the iterates $x_k$ converge to $x_*$, it is desirable to have $\mu_k^i \to \mu_*$ and $g_i(x_k) \to 0$ are consistent with this aim. Therefore, the Lagrange multiplier update can be construed as a fixed-point iteration scheme in the form $\mu_{k+1}^i:=\mu_k^i+c_k g_i(x_{k+1})$ to achieve this.

Inequality Constraints

An elegant extension of the classical equality-constrained augmented Lagrangian algorithm to the classical inequality-constrained case can hinge on two facts. For fact 1, the problem $$\min_{x \in \mathbb{R}^n} f(x) \tag{54}$$

s.t. $g_i(x) \leq 0$ for $i = 1, \ldots, k$.

is equivalent to the problem $$\min_{(x, z) \in \mathbb{R}^n \times \mathbb{R}^k} f(x) \tag{55}$$

s.t. $g_i(x) + z_i^2 = 0$ for $i = 1, \ldots, k$

The new z-variables in Equation 55 are known as slack variables and satisfy $z_i = \sqrt{-g_i(x_*)}$ at the feasible optimum, where $x_*$ is the feasible optimum for Equation 54.

For fact 2, the augmented Lagrangian for Equation 55 is $$L_c(x, z, \mu) := f(x) + \sum_i \mu^i [g_i(x) + z_i^2] + \frac{c}{2} \sum_i [g_i(x) + z_i^2]^2 \tag{56}$$

and the unconstrained optimization arising in the augmented Lagrangian algorithm can be decomposed and partially solved as follows:

$$\min_{(x, z) \in \mathbb{R}^n \times \mathbb{R}^k} L_c(x, z, \mu) = \min_{x \in \mathbb{R}^n} \min_{z \in \mathbb{R}^k} L_c(x, z, \mu) \tag{57}$$

$$= \min_{x \in \mathbb{R}^n} f(x) + \min_{x \in \mathbb{R}^k} \sum_i \mu^i [g_i(x) + z_i^2] + \frac{c}{2} \sum_i [g_i(x) + z_i^2]^2$$

$$= \min_{x \in \mathbb{R}^n} f(x) + \sum_i \mu^i g_i^+(x, \mu^i, c) + \frac{c}{2} \sum_i [g_i^+(x, \mu^i, c)]^2 \tag{58}$$

which has introduced $$g_i^+(x, \mu, c) := \max\left\{g_i(x), -\frac{\mu^i}{c}\right\}.$$

This is because the minimization can be performed over $z \in \mathbb{R}^n$ explicitly using elementary calculus techniques and phrase the result in terms of the $g_i^+$ function.

The upshot is that one can solve the inequality constrained Equation 54 by applying the augmented Lagrangian algorithm (see Equality Constraints above) to the modified Lagrangian function $$\tilde{L}_c(x, \mu) := f(x) + \sum_i \mu^i g_i^+(x, \mu^i, c) + \frac{c}{2} \sum_i [g_i^+(x, \mu^i, c)]^2 \quad (59)$$

whose gradient (after some manipulation) is $$\nabla \tilde{L}_c(x,\mu) = \nabla f(x) + \Sigma_i \max\{0, \mu^i + c g_i(x)\} \nabla g_i(x). \quad (60)$$

Note that for completeness, the solution of the minimization over the z-variables appears in Equation 57. Substituting for this solution yields Equation 58. For simplicity, the minimization over the z-variables is rephrased in the form $$\min_{z \in \mathbb{R}} a(s + z^2) + b(s + z^2)^2 \quad (61)$$

where a, b, s are fixed parameters, which can be solved as follows.

The first step is to substitute $y := z^2$ and replace the above minimization problem by $\min_{y \in \mathbb{R}_+} a(s+y) + b(s+y)^2$. This new problem is now quite simple, since the function $\Phi(y) := a(s+y) + b(s+y)^2$ is a simple parabola, and the problem $\min_{y \in \mathbb{R}_+} \Phi(y)$ finds the minimum of this parabola constrained to the region $y \geq 0$. Therefore the global constrained minimum is either at the global unconstrained minimum of $\Phi$ or else at the y=0 boundary of the constrained region, whichever is smaller. This results in either $y_* = -a/2b - s$, or $y_* = 0$; from which is selected the result for which $\Phi_* := \Phi(y_*)$ is least. Consequently $$\Phi_* = \min\{\Phi(0), \Phi(-a/2b - s)\} \quad (62)$$
$$= \min\{as + bs^2, -a^2/4b\}$$
$$= a\max\{s, -a/2b\} + b[\max\{s, -a/2b\}]^2$$

after algebraic re-arrangement. With $s = g_i(x)$ and $a = \mu^i$ and $=c/2$, Equation 58 is obtained.

Application to Constrained Shape Optimization Problems

The augmented Lagrangian algorithm can be applied to solve the Equations 46-48 with one scalar equality constraint and one scalar inequality constraint for simplicity. Then, $\Omega \in$ Adm can be interpreted to mean that $\Omega$ satisfies admissibility constraints of the following form. The surface of every $\Omega \in$ Adm contains pre-defined ports; every $\Omega \in$ Adm contains pre-defined keep-in regions; and every $\Omega \in$ Adm avoids pre-defined keep-out regions.

The classical augmented Lagrangian algorithm (see Equality Constraints above) can be mimicked for both equality and inequality constraints but can be adapted for shapes satisfying admissibility constraints. The augmented Lagrangian is defined as $$L_c(\Omega, \mu^E, \mu^I) := F(\Omega) + \mu^E G_E(\Omega) + \frac{c}{2}[G_E(\Omega)]^2 + \mu^I G_I^+(\Omega, \mu, c)]^2 + \quad (63)$$
$$\frac{c}{2}[G_I^+(\Omega, \mu, c)]^2$$

with $G_I^+(\Omega, \mu, c) := \max\{G_I(\Omega), -\mu^I/c\}$. The dependence of F, $G_E$, $G_I$ on the solution of the linear elastic PDE has not been indicated for simplicity. To consider only shape functions that are surface or volume integrals of shape-dependent quantities, it is known from general principles that the shape gradient of a function L of this type, evaluated at a given shape $\Omega$, is a scalar-valued function of $\partial\Omega$ that is denoted as $dL(\Omega): \partial\Omega \rightarrow \mathbb{R}$. The shape gradient of the augmented Lagrangian at the shape $\Omega$ is $$dL_c(\Omega, \mu^E, \mu^I) = dF(\Omega) + (\mu^E + c G_E(\Omega)) dG_E(\Omega) + \max\{0, \mu^I + c G_I(\Omega)\} dG_I(\Omega) \quad (64)$$

where $dF(\Omega)$, $dG_E(\Omega)$, $dG_I(\Omega)$ are the shape gradients of the objective and constraint function, respectively, at the shape $\Omega$.

It is also known from general principles that updating the shape $\Omega$ to reduce the value of $L_c$ while maintaining the admissibility constraint can be achieved by advecting the level set function representing $\Omega$ for a certain time (determined via a line-search or related procedure) with respect to a speed function constructed from an extension of a projection of the shape gradient of $L_c$ (e.g., the shape gradient of $L_c$ can be zeroed out appropriately when a violation of admissibility is detected and use the Adalsteinsson-Sethian velocity extension algorithm to extend the values of $dL_c(\Omega)$ from $\partial\Omega$ to a narrow band of $\partial\Omega$). This is the basis for an unconstrained, gradient-based shape optimization algorithm for solving the problem $\min_{\Omega \in Adm} L_c(\Omega, \mu^E, \mu^I)$ at any fixed values of c, $\mu^E$, $\mu^I$.

The augmented Lagrangian algorithm for solving Equations 46-48 can now be given as follows. It requires a method to increase the penalty parameters and a method for tightening tolerances.

1. Choose a final tolerance $T_{final}$
2. Set k=0. Start with initial $c_0$, $\mu_0^E$, $\mu_0^I$. Start with an initial tolerance $T_0$ less restrictive than $T_{final}$.
3. Initialize the shape $\Omega_0$.
4. While not converged to within tolerance $T_{final}$:
   a. Apply an unconstrained, gradient-based shape optimization algorithm to the problem $$\min_{\Omega \in Adm} L_{c_k}(\Omega, \mu_k^E, \mu_k^I)$$

until convergence occurs to within tolerance $T_k$. Output the shape $\Omega_{k+1}$ at this level of convergence
   b. Check constraint satisfaction.
      (i) If the constraints are not satisfied to within tolerance $T_k$, let $c_{k+1} :=$ Increase $(c_k)$ multipliers by $\mu_{k+1}^E := \mu_k^E$ and $\mu_{k+1}^I := \mu_k^I$.
      (ii) If the constraints are satisfied to within tolerance $T_k$, update the Lagrange multipliers by $\mu_{k+1}^E := \mu_k^E + c_k G_E(\Omega_k)$ and $\mu_{k+1}^I := \max\{0, \mu_k^I + c_k G_I(\Omega_{k+1})\}$.
   c. Set the tolerance $T_{k+1} :=$ Tighten $(T_k)$.
   d. Increment k.

Pre-Advection Operations

In some implementations, one or more operations are performed on the velocity field before the shape is advected, including (1) narrow-band velocity restriction, (2) advection prevention using an advection mask, and/or (3) velocity extension. For the first of these, narrow-band velocity restriction involves restricting the velocity to a narrow-band around the $0^{th}$ iso-contour of the level-set. For the second, the advection mask has values of 0 inside the ports (geometric interfaces containing Neumann and Dirichlet boundary conditions) and values of 1 elsewhere in the domain. Shape derivatives and advection velocity is multiplied by the advection mask to prevent any advection inside the ports. With regard to the third of these, the velocity field should be continuous on both negative and positive sides of the $0^{th}$ iso-contour of the level-set. However, the objective function (typically strain energy) is often only available inside the negative narrow-band. Velocity extension projects all velocities inside the domain to the positive narrow-band. This can be done by sampling the velocity at a point inside the domain found by moving along the negative the normal a distance equal to the level-set:

$$v(x)=v(x-\psi(x)n(x))x \notin \Omega.$$

The above approaches can be used with various types of level-set-based shape (and optionally topology) optimizations, which are described further below in connection with FIGS. 3A-8C. However, regardless of whether or not a level-set representation is used, the updating 186 is done to improve performance of the current 3D model with respect to the design criteria, including the at least one design constraint on an acceptable likelihood of failure for the physical structure. Thus, as the shape (and optionally topology) of the 3D model is changed in the generative design process, the acceptable likelihood of failure for the physical structure is taken into consideration inside the optimization loop 184, 186, 192, such that the final generatively designed 3D shape should already satisfy the desired maximum likelihood of failure for the physical structure being designed.

In addition, it should be noted that in various implementations, other operations can be performed before, during or after the updating 186, as part of the iterative modification of the 3D shape of the modeled object, such as described below in connection with FIGS. 3A-8C. Further, to produce topology changes in the current model of the object, one or more voids can be inserted 190 into the current model at each or selected ones of the iterative modifications of the current model. For example, one or more bubbles having positions, sizes and shapes determined from the current model can be inserted 190. Moreover, in some implementations, the insertion 190 of void(s) is done only during an earlier portion of the iterative modification and/or only periodically (e.g., at a regular void insertion interval) during the iterative modification. In the optional example shown in FIG. 1B, the insertion of void(s) is done only when it is determined 188 that the current iteration is less than a predefined void insertion cutoff and the current iteration is equal to the void insertion interval.

In general, the optional determining 188 and inserting 190 can be performed as part of a bubble method. A bubble method allows for the topology of the design space to be changed from the inside, as default level-set methods only allow for changes from the boundary. A location for the bubble can be identified using the topology derivative, for example computed using a topology-shape sensitivity method, which relates the shape derivative to the topology derivative. In some implementations, the shape derivative of the Lagrangian is used as a proxy for the topology derivative. In some implementations, a bubble method is applied with the following features:

1. Position: The shape derivative of the Lagrangian is used as a proxy for the topology derivative. The shape derivative is described in more detail below, with respect to Equation 105.

2. Frequency: Bubbles are not inserted at every iteration. Instead, bubbles are inserted according to user-defined or automatically determined intervals Bubbles are not inserted after the volume reduction iterations have been completed.

3. Size: The size of an inserted bubble at a given iteration is computed according to a user-defined or automatically determined ratio $\beta_b$ of the current model volume:

$$V(B_t)=\beta_b V(\Omega_t) \tag{65}$$

where $V(B_t)$ is the volume of the bubble inserted at an iteration t, and $V(\Omega_t)$ is the volume of the model at the iteration t.

4. Shape: The shape of the inserted bubble is determined based on the distribution of the topology derivative for elements of the current model, as shown below:

$$\frac{d\mathcal{L}}{d\Omega}(e_1) < \frac{d\mathcal{L}}{d\Omega}(e_2) < \ldots \frac{d\mathcal{L}}{d\Omega}(e_k) \ldots < \frac{d\mathcal{L}}{d\Omega}(e_n) \tag{66}$$

Where $e_k$ is the k-th element of the current model at a given iteration t. In some implementations, the shape of the inserted bubble is optimized while the overall size of the inserted bubbles increases over multiple iterations.

Then, the volume of elements with the lowest shape derivative are added up, until the necessary bubble volume, i.e., according to Equation 31, is reached. The resultant shape, position, and volume of the bubble $B_t$ generated at iteration t therefore satisfies the following:

$$B_t=e_1 \cup e_2 \cup \ldots \cup e_k \text{ s.t. } V(B_t)=V(e_1)+V(e_2)+ \ldots + V(e_k) \tag{67}$$

In any case, after any optional determining 188 that the current iteration is less than a void insertion cutoff and is equal to a void insertion interval, one or more voids can be inserted 190 into the current model. The void insertion cutoff and the void insertion interval can be predetermined, e.g., by user input or automatically determined, prior to performing 184 the numerical simulation, or prior to initiating 182 the model.

But regardless of whether or not the optional determining 188 and inserting 190 are done, a check 192 can be made for convergence during each iteration. To determine whether the generative design has converged to a stable solution, the check 192 can identify the condition in which all the design constraints are met and no design objectives have improved significantly since the last one or more iterations. This includes checking 192 that the at least one design constraint (on an acceptable likelihood of failure for the physical structure) stays under the acceptable likelihood of failure for the physical structure.

The numerical simulation 184, update 186, and check 192 process iterates until convergence. Further, in some implementations, the iterative process ends once a check 194 shows that a predetermined number of shape modification iterations have been completed. Note that the predetermined number of shape modification iterations can be set high enough that it is essentially guaranteed that all design constraints will be met, and using the controlled convergence techniques described below with reference to FIGS. 4A-7, it can also be essentially guaranteed that convergence to generally optimal values for any design objectives will be achieved within the predefined number of iterations, if not before.

Once the generative design process is completed, the generatively designed three dimensional shape of the modeled object can be provided 196, e.g., by CAD program(s) 116, for use in manufacturing the physical structure. The 3D model can be provided 196 for use in manufacturing a physical structure corresponding to the object using one or more computer-controlled manufacturing systems, e.g., AM machine 170, SM machine 174, and/or other manufacturing machines/systems. The providing 196 can involve sending or saving the 3D model to a permanent storage device for use in manufacturing the physical structure corresponding to the object using the one or more computer-controlled manufacturing systems. In some implementations, the providing 196 involves generating 196A, e.g., by CAD program(s) 116, toolpath specifications for the computer-controlled manufacturing system(s) using the 3D model, and manufacturing 196B, e.g., by CAD program(s) 116, at least a portion of the physical structure corresponding to the object with the computer-controlled manufacturing system(s) using the toolpath specifications generated for the additive manufacturing machine.

Note that the 3D model that is provided 196 can be the 3D model produced by the generative design synthesis method or a post-processed version of the generative design output. For example, in some implementations, a 3D mesh model produced by a generative design synthesis method can be converted into a watertight B-Rep 3D model, and optionally edited by the user, before being provided 196. Moreover, the generative design processes described below in connection with FIGS. 3A-8C can be implemented to use the systems and techniques described above. Finally, while described in the context of a CAD program providing multiple options for generative design, each of the generative design processes described in this document can be implemented as a standalone generative design process in a CAD program. Thus, not all of the generative design processes described below in connection with FIGS. 3A-8C need be implemented together in any given implementation.

Figure 3A:
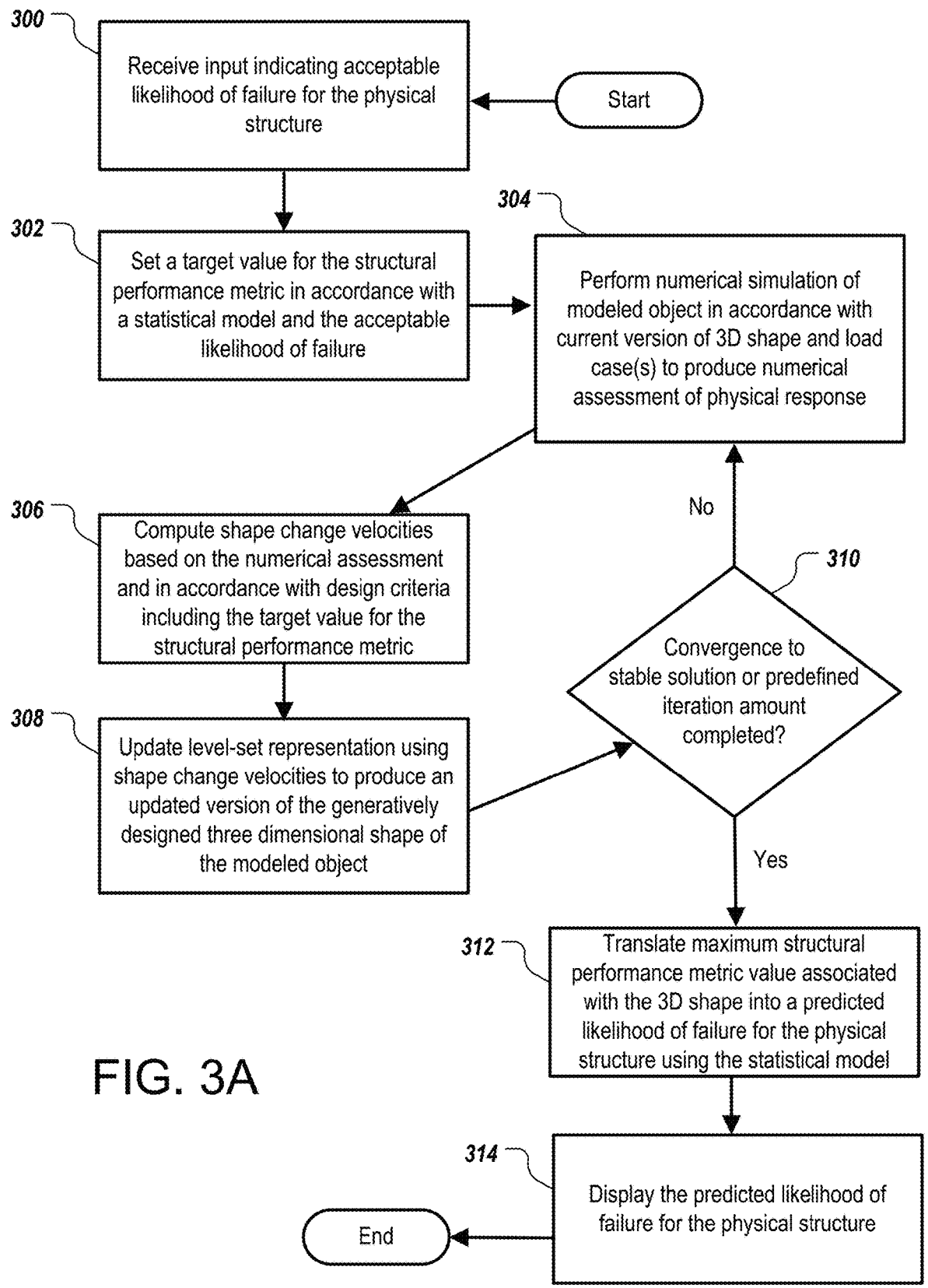
FIG. 3A shows an example of a process that generates one or more portions of a 3D model of an object to be manufactured using a target part reliability in an iterative generative design process.

FIG. 3A shows an example of a process that generates one or more portions of a 3D model of an object to be manufactured using a target part reliability in an iterative generative design process. In this example, the at least one design constraint on an acceptable likelihood of failure for the physical structure is a target value for the structural performance metric, e.g., stress, strain, displacement, rotation, fatigue safety factor, yield strength safety factor, Young's modulus, etc. Input is received 300 (e.g., from a user or from another process) indicating an acceptable likelihood of failure for the physical structure being designed. The input can be provided in various forms, such as a percentage value (e.g., 0.01% of the manufactured structures can fail), a mean time between failures (MTBF) value, an acceptable rate of failure (e.g., 1 in 1 million parts), etc., and the input can be converted into a suitable form for use with the statistical model. The target value for the structural performance metric is then set 302 in accordance with the statistical model and the received acceptable likelihood of failure. This involves using the statistical model, such as described above, to translate 302 from a specific likelihood of failure to the value for the structural performance metric. In addition, this can involve an adjustment to the input value, to the converted value for the specific likelihood of failure, or to the value for the structural performance metric. For example, a safety factor can be incorporated by the setting 302 to ensure that the acceptable likelihood of failure for the physical structure will be satisfied in all cases.

Figure 3B:
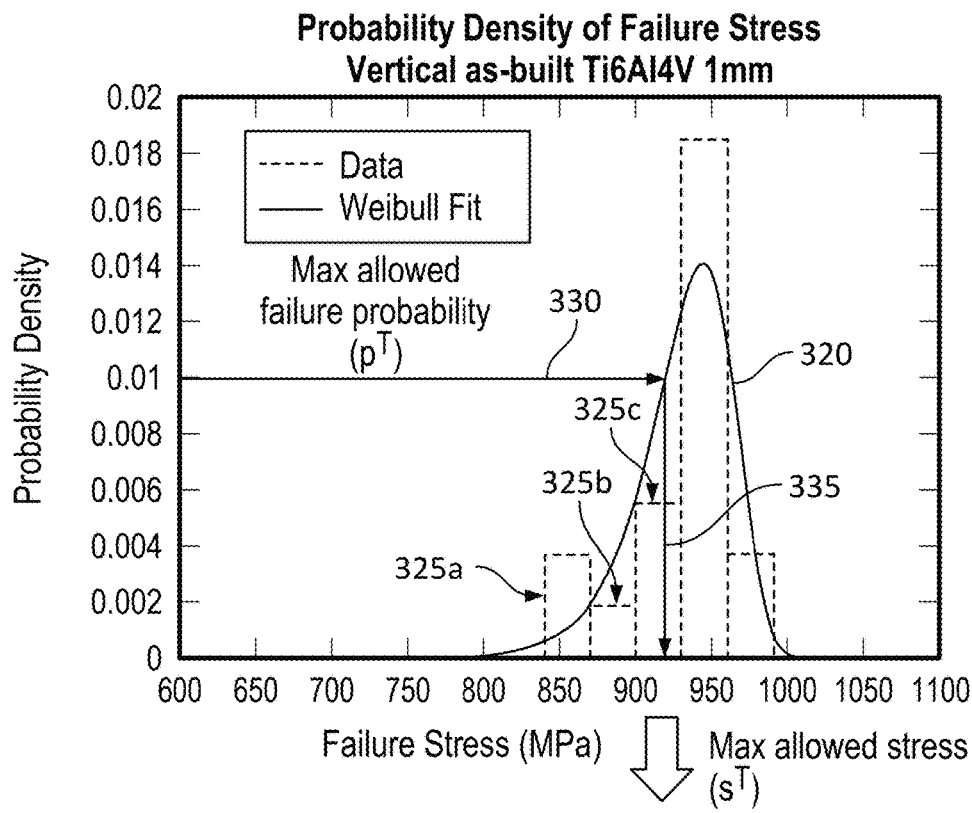
FIG. 3B shows an example of using a statistical model to translate a maximum allowed probability of failure into a maximum allowed stress value.

FIG. 3B shows an example of using a statistical model to translate a maximum allowed probability of failure into a maximum allowed stress value. The statistical model can include a failure probability density function that relates failure stress to specific likelihoods of failure for a material or for two or more materials. In some cases, these likelihoods of failure are for material(s) of a given thickness and at a given build angle. In some cases, the statistical model does not depend on material thickness, build angle, or both, and in such cases, one failure probability density function can be used for one or more thicknesses or one or more build angles. The failure probability density function can be computed using a data set obtained by physical testing of a specific material, for example, by fitting a curve to data obtained by testing of one or more materials, e.g., of a given thickness and a given build angle, under a variety of stress conditions to determine the level of stress at which the material(s) failed.

For example, FIG. 3B shows an example of a Weibull statistical model 320 computed as a failure probability distribution function. The function relates failure stress measured in MPa to the probability (with values from 0 to 1) that a manufactured component will fail at the given level of stress. The Weibull statistical model can be computed using measured failure values 325a, 325b, 325c obtained by physical testing of a specific material of a particular thickness at a particular build angle for ranges of stress values. For example, one bar 325a of the probability distribution function can represent the probability of failure in a stress range from approximately 840 to 870 MPa, a second bar 325b can represent the probability of failure in a stress range from approximately 870 to 900 MPa, a third bar 325c can represent the probability of failure in a stress range from approximately 900 to 930 MPa. The Weibull statistical model 320 can be computed from these data using the technique described previously in this specification or using other techniques for fitting a curve through probability distribution values, such as 325a-325c.

Having determined a statistical model that relates maximum allowable stress to failure probability, the maximum allowable stress corresponding to a maximum allowable failure probability can be determined by computing the inverse of the statistical model, and using the inverted model—that is, a model that determines a maximum allowable stress from a maximum allowed failure probability—to compute the maximum allowable stress from the maximum allowable failure probability. For example, in FIG. 3B, the maximum allowed failure probability 330 is used to determine the maximum allowed stress 335.

In cases where an inverse of the statistical model cannot be computed, statistical techniques for approximating a function can be used. For example, beginning with a first candidate stress level, set at a low value, a failure probability can be computed for the candidate stress level using the statistical model. The result can be compared to the maximum failure probability to determine whether the computed failure probability is within a configured threshold of the maximum failure probability. If the computed failure probability is within the configured threshold, the candidate stress level can be determined to be the maximum allowed stress. If the computed failure probability is not within the configured threshold, and the computed probability of failure does not exceed the maximum allowed failure probability, the candidate stress level can be increased and the process repeated; if the computed failure probability is not within the configured threshold, and the computed probability of failure exceeds the maximum allowed failure probability, the candidate stress level can be decreased and the process repeated.

Returning to FIG. 3A, note that the receiving 300 and translating 302 can be part of the obtaining 180 described above in connection with FIG. 1B, after which, the iterative shape (and optionally topology) optimization loop begins.

Thus, numerical simulation of the modeled object is performed 304 in accordance with a current version of the three dimensional shape and the one or more load cases to produce a current numerical assessment of a physical response of the modeled object. The physical response can be a structural (or other physical) response of the modeled object under one or more in-use load cases. The numerical simulation can be performed 304, for example, as described above in connection with FIG. 1B.

Shape change velocities for an implicit surface in a level-set representation of the three dimensional shape are computed 306 based on the numerical assessment and in accordance with design criteria including the target value for the structural performance metric. The level-set representation is updated 308 using the shape change velocities to produce an updated version of the three dimensional shape of the modeled object. The performing 304, the computing 306 and the updating 308 are repeated until a check 310 determines that a predefined number of shape modification iterations have been performed or that the generatively designed three dimensional shape of the modeled object in the design space has converged to a stable solution for the design criteria and the one or more in-use load cases, such as described above with reference to FIG. 1B.

Once the iterative loop ends, a maximum structural performance metric value output from the iterative loop is translated 312 into a predicted likelihood of failure for the physical structure using the statistical model. This is essentially the reverse process as that described above for translating 302 from the acceptable likelihood of failure to the target value for the structural performance metric. Further, the predicted likelihood of failure for the physical structure can be displayed 314 as part of the output from the generative design process.

In some implementations, the maximum probability of failure can be constrained directly, i.e., in every iteration, current maximum stress can be used to compute the current maximum probability of failure, such as described in detail in connection with FIG. 3C. Moreover, in some implementations, Proportional-Integral-Derivative (PID) controlled constraint handling is used to constrain the maximum probability of failure directly during controlled convergence, as described in detail in connection with FIGS. 4A-7. Thus, a PID controller (e.g., an adaptive PID controller) can be used to ensure that the value is constrained to be below a configured target value.

The translating 312 and the displaying 314 can be part of the providing 196 described above in connection with FIG. 1B. Further, in some implementations, the translating 312 and the displaying 314 are done one or more times within the iterative loop 304, 306, 308, 310 to let the user know how the predicted likelihood of failure for the physical structure changes in the course of the shape (and optionally topology) optimization process. Finally, the process of FIG. 3A can also employ the controlled converged and/or disconnection prevention techniques described below in connection with FIGS. 4A-8C.

Figure 3D:
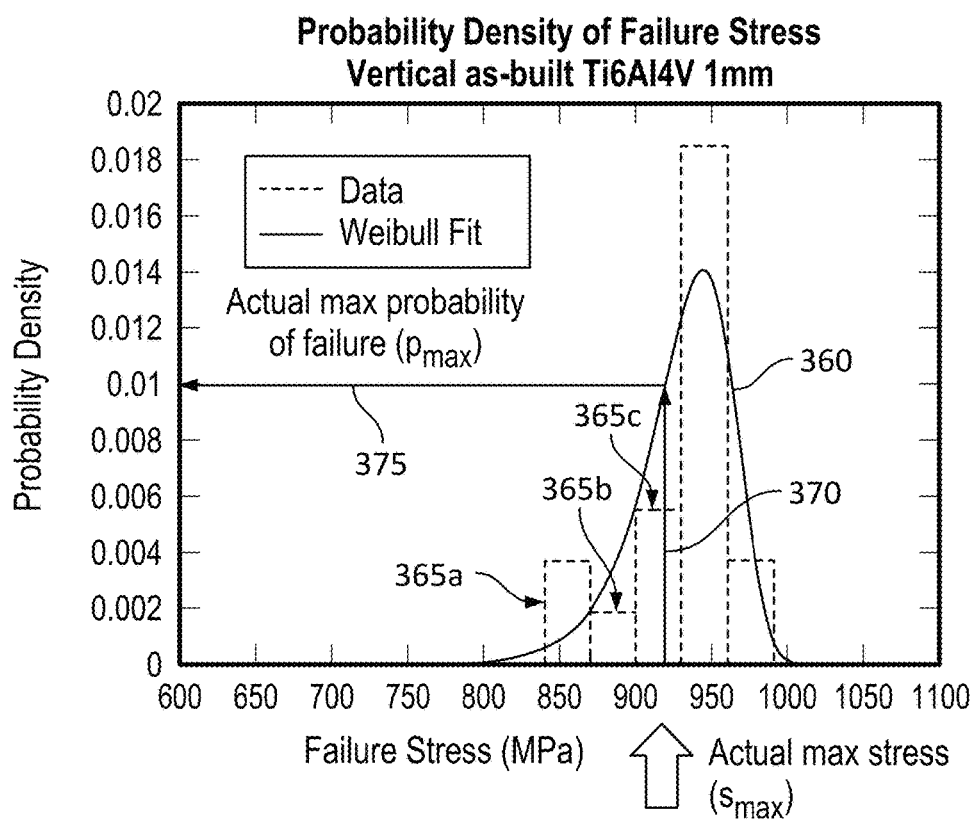
FIG. 3D shows an example of using a statistical model to translate an actual stress value into a probability of failure.
Figure 3C:
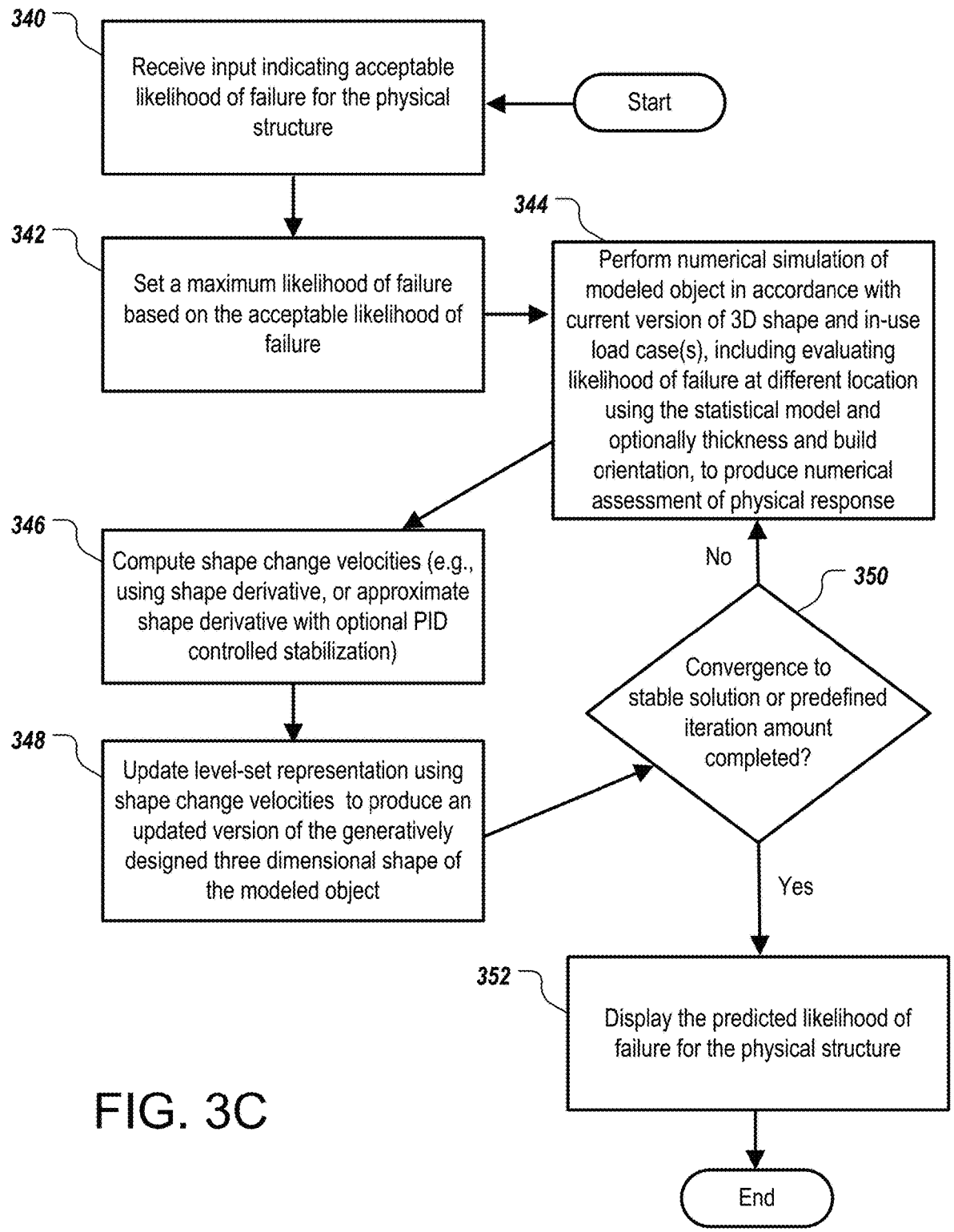
FIG. 3C shows another example of a process that generates one or more portions of a 3D model of an object to be manufactured using a target part reliability in an iterative generative design process.

FIG. 3C shows another example of a process that generates one or more portions of a 3D model of an object to be manufactured using a target part reliability in an iterative generative design process. In this example, the at least one design constraint on an acceptable likelihood of failure for the physical structure is a maximum likelihood of failure for structure.

Input is received 340 (e.g., from a user or from another process) indicating an acceptable likelihood of failure for the physical structure being designed. The input can be provided in various forms, such as a percentage value (e.g., 0.01% of the manufactured structures can fail), a MTBF value, an acceptable rate of failure (e.g., 1 in 1 million parts), etc., and the input can be converted into a suitable form for use with the statistical model. The maximum likelihood of failure is set 342 based on the acceptable likelihood of failure for the physical structure. This can involve the noted conversion and/or an adjustment to the input value. For example, a safety factor can be incorporated by the setting 342 to ensure that the acceptable likelihood of failure for the physical structure will be satisfied in all cases. But in some implementations, the setting 342 involves simply setting 342 the maximum likelihood of failure equal to the received 340 acceptable likelihood of failure for the physical structure being designed.

Note that the receiving 340 and setting 342 can be part of the obtaining 180 described above in connection with FIG. 1B, after which, the iterative shape (and optionally topology) optimization loop begins. Thus, numerical simulation of the modeled object is performed 344 in accordance with a current version of the three dimensional shape and the one or more load cases to produce a current numerical assessment of a physical response of the modeled object. The physical response can be a structural (or other physical) response of the modeled object under one or more in-use load cases. The numerical simulation can be performed 304, for example, as described above in connection with FIG. 1B.

In addition, the numerical simulation 344 can include evaluating 344 the maximum likelihood of failure at each of multiple different locations on or in the modeled object by calculating a likelihood of failure at the location using the statistical model and a value for the structural performance metric (e.g., stress, strain, displacement, rotation, fatigue safety factor, yield strength safety factor, Young's modulus, etc.) indicated for the location by the numerical simulation 344 in accordance with one or more specific geometric parameters of the modeled object at the location. In general, the statistical model, such as described above, is used in the iterative loop 344, 346, 348, 350 to translate values for the structural performance metric into likelihoods of failure, which are then referenced against the reliability constraint during the shape (and optionally topology) loop. Note that the use of a likelihood of failure constraint that is always in the range of 0 to 1 can result in improved numerical stability as compared to using a failure stress constraint, which can have a larger range of values. Nonetheless, in some implementations, the failure stress constraint (as well as one or more other constraints, or all constraints, used in a topology and/or shape optimization process) can be normalized dynamically (using a moving reference) to be in the range 0-1 for better convergence, such as described in connection with FIG. 6.

FIG. 3D shows an example of using a statistical model to translate an actual stress value into a probability of failure. As described in reference to FIG. 3B, the statistical model can include a failure probability density function that relates failure stress to specific likelihoods of failure for a material (or for two or more materials) of a given thickness at a given build angle. As above, in some cases, the statistical model does not depend on material thickness, build angle, or both, and one failure probability density function can be used for one or more thicknesses or one or more build angles. The failure probability density function can be computed using a data set obtained by physical testing of a specific material, for example, by fitting a curve to data obtained by testing of one or more materials, e.g., of a given thickness and a given build angle, under a variety of stress conditions to determine the level of stress at which the material(s) failed.

For example, FIG. 3D shows an example of a Weibull statistical model 360 computed as a failure probability distribution function. The function relates failure stress measured in MPa to the probability (with values from 0 to 1) that a manufactured component will fail at the given level of stress. The Weibull statistical model can be computed using measured failure values 365a, 365b, 365c obtained by physical testing of a specific material for ranges of stress values. For example, one bar 365a of the probability distribution function can represent the probability of failure in a stress range from approximately 840 to 870 MPa, a second bar 365b can represent the probability of failure in a stress range from approximately 870 to 900 MPa, a third bar 365c can represent the probability of failure in a stress range from approximately 900 to 930 MPa. The Weibull statistical model 360 can be computed using techniques for fitting a curve through the probability distribution values, such as 365a-365c, as described previously in this specification.

Having determined a statistical model that relates maximum allowable stress to failure probability, the maximum allowable stress corresponding to a maximum allowable failure probability can be determined directly from the model by computing, for an actual maximum stress value, the actual maximum probability of failure. For example, in FIG. 3D, the actual maximum stress value 370 is used to determine the actual maximum probability of failure 375.

In addition, the example shown in FIG. 3D is a single translation between the maximum stress value output from the numerical simulation into maximum probability of failure for one iteration of the loop. However, in some implementations, the translation from the structural performance metric into the probability of failure is done per element in the numerical simulation, and the maximum of these calculated probabilities of failure is then used to drive the shape modification for that iteration of the loop in accordance with the maximum likelihood of failure constraint. Thus, the translation of values for the structural performance metric into likelihoods of failure can be at specific locations in the 3D model. Note that, in some implementations, probability-based outlier elimination can be used to prevent extreme values from stress singularities affecting the convergence, as is described further in reference to FIGS. 8A-8C.

Moreover, the calculation of the likelihood of failure at each location using the statistical model and a value for the structural performance metric indicated can take into account the geometric parameters of the modeled object at the location. These geometric parameters of the modeled object can include thickness at the location and/or build orientation at the location. Additively manufactured components (e.g., metal components) have varying strength for different build angle and component thickness values, and so the structural performance metric (and with it, the probability of failure) can vary with the local thickness and build orientation of the physical structure. For example, the Von Mises stress target at a point x can be modified as a function of the thickness $h(x)$ and build angle $\beta(x)$ which is measured with respect to some constant build direction. Thickness can be measured by any suitable technique or combination of techniques, including the techniques described in International Patent Application PCT/US21/36976, filed Jun. 11, 2021, which is hereby incorporated by reference. In some implementations, thickness and/or build-angle-specific yield-stress constraints, such as described in PCT/US21/36976, can be used in addition to a reliability constraint.

Returning to FIG. 3C, shape change velocities for an implicit surface in a level-set representation of the three dimensional shape are computed 346 based on the numerical assessment and in accordance with design criteria including the maximum likelihood of failure. In some implementations, the computing 346 involves using a gradient determined from a shape derivative evaluated for the maximum likelihood of failure design constraint at each of the different locations. The shape derivative can be an analytical expression of stress, which can be computed using the adjoint method. With the stress shape derivative in hand, the chain rule can be used to derive the derivative of the objective function with respect to reliability. In essence, the gradient of the survivor function is computed for use in the iterative loop of the shape (and optionally topology) optimization process. For further details regarding deriving a stress shape derivative, see Allaire, et al., "Minimum stress optimal design with the level set method", Engineering Analysis with Boundary Elements, Volume 32, Issue 11, 2008, Pages 909-918, ISSN 0955-7997.

In some implementations, the computing 346 involves computing shape changes velocities using amounts determined from a shape derivative formula that approximates a shape derivative evaluated for the maximum likelihood of failure design constraint, at each of the different locations, using adaptive control. In other words, as with the process of FIG. 3A, the process of FIG. 3C can employ the controlled converged and/or disconnection prevention techniques described below in connection with FIGS. 4A-8C. Thus, in some implementations, the shape derivative formula used is a volume fraction based inequality constraint that is modified using a Proportional-Integral-Derivative controlled stabilization factor and an importance factor, which is adjusted based on whether or not one or more other constraints were violated in a prior iteration of the iterative loop 344, 346, 348, 350.

But regardless of how the shape changes velocities are computed 346, the level-set representation is updated 348 using the shape change velocities to produce an updated version of the three dimensional shape of the modeled object, and the performing 344, the computing 346 and the updating 348 are repeated until a check 350 determines that a predefined number of shape modification iterations have been performed or that the generatively designed three dimensional shape of the modeled object in the design space has converged to a stable solution for the design criteria and the one or more in-use load cases, such as described above with reference to FIG. 1B. Moreover, once the iterative loop ends, the maximum likelihood of failure value from the last loop iteration constitutes the predicted likelihood of failure for the physical structure, and this predicted likelihood of failure for the physical structure can be displayed 352 as part of the output from the generative design process, e.g., as part of the providing 196 described above in connection with FIG. 1B.

Controlled Convergence

In a controlled convergence technique, a pre-determined time period or number of iterations is defined as the shape and topology optimization begins. For each design constraint, a target much closer to the current value for the constraint is specified for each iteration.

This can result in at least two improvements. First, a user may specify the time period or number of iterations. The convergence rates are then controlled to solve a given problem within the user-specified time period or number of iterations. Therefore, a design process using controlled convergence can arrive at a suitable solution given resource restrictions imposed by the user in how much time is allotted to generating a solution. Second, in specifying a target value for each constraint closer to the current value for the constraint, the likelihood of oscillations and radical changes can be reduced.

Figure 4A:
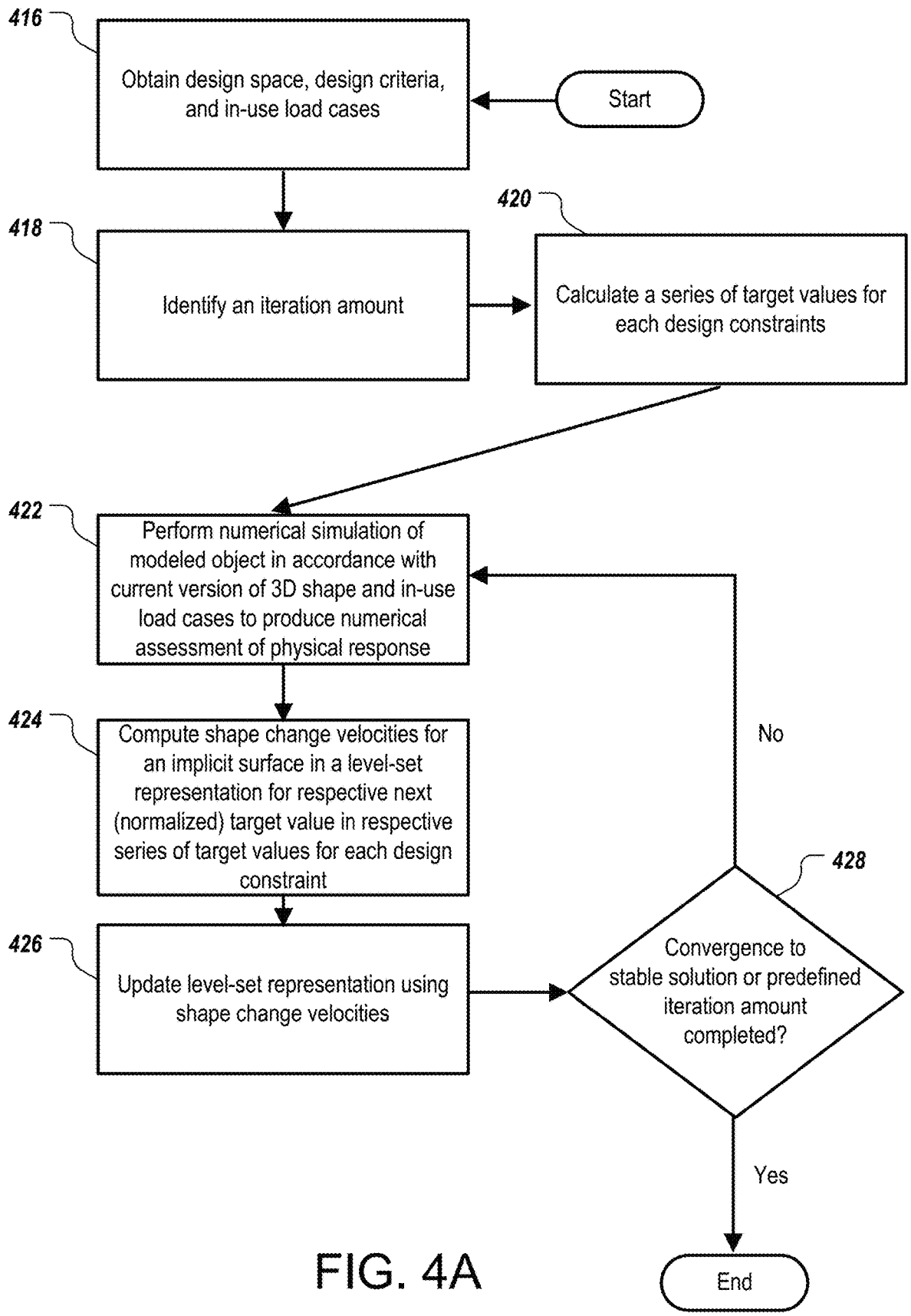
FIG. 4A shows an example of a process that generates one or more portions of a 3D model of an object to be manufactured, using one or more generative design processes implementing arbitrary constraint handling with controlled convergence.

FIG. 4A shows an example of a process that generates one or more portions of a 3D model of an object to be manufactured, using one or more generative design processes implementing arbitrary constraint handling with controlled convergence. Controlled convergence is described first, and then arbitrary constraint handling is introduced. A computer-aided design program obtains 416 a design space for a modeled object, for which a corresponding physical structure will be manufactured, one or more design criteria for the modeled object, and one or more in-use load cases for the physical structure, wherein the one or more design criteria include at least one design constraint. For example, the obtaining 416 can be done as part of the initiating 182, as described above with reference to FIG. 1B. As described above with reference to FIGS. 3B-3C, seeding techniques can be applied to the design space which can further improve the generative design process.

An iteration amount is identified 418. The iteration amount can be a time or a count of iterations from a user or calculated otherwise. A series of target values for the at least one design constraint is calculated 420 from an initial target value to a final target value, in accordance with the iteration amount and a function.

Let $g^j(s,u(s))-g_{T,n}=0$ $j=1, \ldots, n_g$ denote a sequence of constraints where $g_{T,n}{}^j$ is the final target value at iteration n. Define a target value for each constraint to meet in iteration t as $$g_{T,t}^j = g_{T,n}^j + \frac{N^d(\xi)}{n^d(0)}(g_0^j - g_{T,n}^j) \quad (68)$$

where $$\xi = \frac{t}{n}$$

and $N^d(\xi)$ is a B-spline of degree d computed using the recurring relationship $$Nd(\xi) = \frac{1}{d}(1-\xi)N^{d-1}(\xi) \quad (69)$$

where $N^0(\xi)=0$.

Although this description assumes the use of B-splines as the function for the calculating 420, any suitable smooth function can be used to achieve the same result.

Different smooth functions include different orders of functions of the same class, e.g., B-Splines of different orders. The choice in smooth function and order of the function changes how quickly an ending design constraint target value is achieved over the identified 418 iteration amount. Other examples of smooth functions that can be used include polynomials of any order, Lagrange polynomials, and subdivision curves. In some implementations, a system implementing the described techniques can prompt a user for a plurality of reference points, and in response to receiving user-selected reference points, the system can generate a curve, e.g., using interpolation or any appropriate technique, that passes through the points.

Figure 4B:
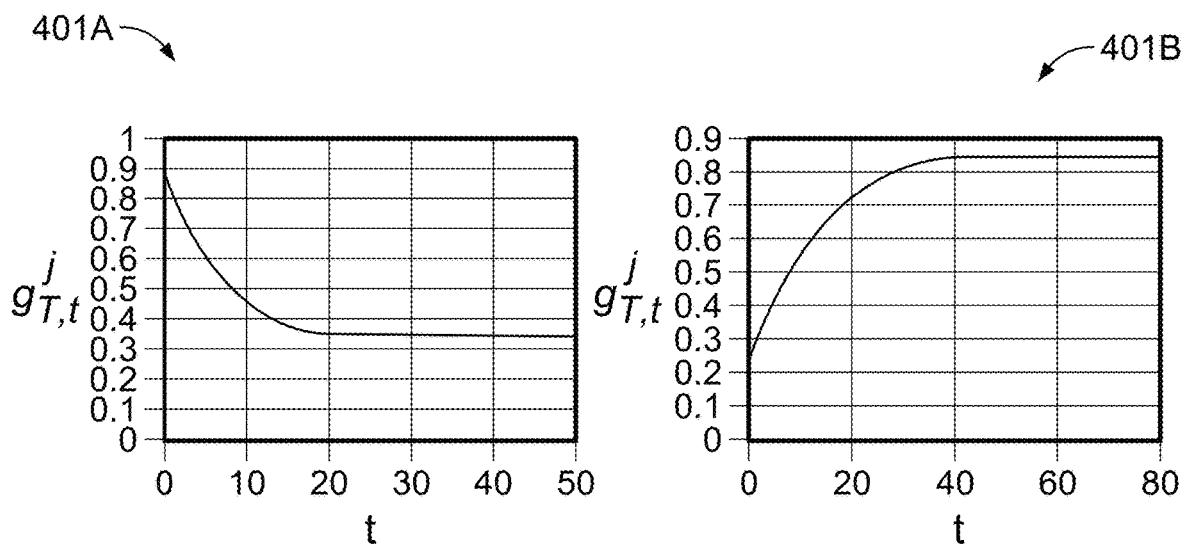
FIG. 4B shows examples of graphs tracking progressive reduction and increase of a target constraint value using B-splines, respectively.

FIG. 4B shows examples of graphs 401A, 401B tracking progressive reduction and increase of a target constraint value using B-splines, respectively. B-spline based transition from a starting value of constraint $g_0{}^j$ to final target $g_{T,t}{}^j$ is done during $t \leq n_v$ iterations. The final target value is maintained during iterations $n_v < t \leq n$. In the graphs 401A, 401B, the target value of the constraint is given by:

$$g_{T,t}^j = \begin{cases} g_{T,n}^j + \dfrac{N^d(\xi)}{N^d(0)}(g_0^j - g_{T,n}^j) & \text{if } t \leq n_v \\ g_{T,n}^j & \text{otherwise} \end{cases} \quad (70)$$

Note particularly that iterations are divided into two parts according to Equation 70. A first part, while the iterations are less than or equal to $n_v$, includes different target values for different iterations in that first part. In the second part, i.e., after $n_v$, the target value of the constraint at each iteration is the final target value $g_{T,n}{}^j$.

Graph 401A shows a constraint target $g_{T,n}{}^j=0.35$ from a starting constraint value of 0.9, $n_v=30$, n=50, and B-Splines of order d=4. Graph 401B shows a constraint target $g_{T,n}{}^j=0.85$ from a starting constraint value of 0.25, $n_v=80$, n=80, and B-Splines of order d=3. Therefore, optimization methods can be implemented with a variety of different starting and ending constraint values, as well as with different smooth functions and iteration amounts.

Approximate Volume Control

In some implementations, calculating 420 the series of target values for a design constraint includes calculating target changes in a volume fraction of the generatively designed three dimensional shape. Some constraints may have a shape gradient or shape derivative that is not well defined, approximate, or not defined at all. In these cases, a proxy shape derivative can be calculated to improve accuracy and exert more control.

Using a constant value μ for all optimization iterations would result in converging to a final volume which depends on the relative magnitude μ to velocity v, the latter of which depends on the boundary value problem, given by:

$$-\nabla \cdot D\epsilon(u)=f \text{ in } \Omega \quad (71)$$

$$u=0 \text{ on } \Gamma_D \quad (72)$$

$$D\epsilon(u)=\bar{t} \text{ on } \Gamma_N \quad (73)$$

where Ω is the domain for a solid body, D is the fourth order constitutive tensor of the solid body, u is the displacement vector, f is the external load vector, t̄ is the prescribed traction on the Neumann boundary $\Gamma_N$ with the outward normal n. For simplicity, only homogeneous Dirichlet boundary conditions are assumed on $\Gamma_D$. Instead, a variable value $\mu_t$ can be used such that a volume target $V_{T,t}$ is achieved during iteration t of the topology optimization. Let $V_{t-1}$ denote the volume after the (t−1)th iteration. The desired volume change during iteration t reads:

$$\Delta V_t = V_{T,t} - V_{t-1}. \quad (74)$$

This volume change can be approximated by $$\Delta V_t \approx T \int_\Gamma a(v_{se}+\mu)d\Gamma \quad (75)$$

where a∈ {0,1} is the advection mask and T is the time step used in solving the Hamilton-Jacobi equation. Note that the approximation error reduces to zero when smaller time steps are used:

$$\lim_{T \to 0} \Delta V_t - T \int_\Gamma a(v_{se} + \mu) d\Gamma = 0. \quad (76)$$

The maximum time step is bounded by the Courant-Friedrichs-Lewy (CFL) condition $$T \leq \frac{C\Delta s}{|v|\max} \quad (77)$$

$$T = \frac{m_t C\Delta s}{|v|\max} \text{ with } 0 \leq m_t \leq 1$$

where C is a constant, $\Delta s$ is the voxel size and $|v|_{max}$ is the maximum magnitude of advection velocity, given by $$v = -(2u \cdot f - D\epsilon(u):\epsilon(u) + \mu \quad (78)$$

where variables are defined as they are in Equations 71-73.

Let $v_u$, $v_l$ denote the bounds of $V_{se}$ such that $v_l \leq v_{se} \leq v_u$. The maximum velocity magnitude is now given by $$|v|_{max} = v_u + \mu \geq |u_l + \mu| \quad (79)$$

$$|v|_{max} = -(v_l + \mu) \geq |u_u + \mu| \quad (80)$$

$$|v|_{max} = -(v_u + \mu) \geq |u_l + \mu| \quad (81)$$

$$|v|_{max} = v_l + \mu \geq |u_u + \mu| \quad (82)$$

Substituting the values for $|v|_{max}$ and T in Equation 76 yields:

$$\mu \approx \frac{\int \Gamma_{av_{se}} d\Gamma - A v_u}{A - \int \Gamma a d\Gamma} \text{ if } v_u + \mu \geq |u_l + \mu| \quad (83)$$

$$\mu \approx \frac{\int \Gamma_{av_{se}} d\Gamma + A v_l}{A + \int \Gamma a d\Gamma} \text{ if } -(v_l + \mu) \geq |u_u + \mu| \quad (84)$$

$$\mu \approx \frac{\int \Gamma_{av_{se}} d\Gamma + A v_u}{A + \int \Gamma a d\Gamma} \text{ if } -(v_u + \mu) \geq |u_l + \mu| \quad (85)$$

$$\mu \approx \frac{\int \Gamma_{av_{se}} d\Gamma - A v_l}{A - \int \Gamma a d\Gamma} \text{ if } v_l + \mu \geq |u_u + \mu| \quad (86)$$

$$A = \frac{\Delta V_t}{m_t C \Delta s}.$$

Note that the number of different cases for $\mu$ simplifies to Equations 83 and 84 when the body force term is zero in Equation 78 (f=0). This results in the strain energy component of the velocity being positive, i.e., $v_w$, $v_l \in R^+$, resulting in the maximum velocity magnitude being confined to either Equation 83 or Equation 84. The upper bound on $m_t$ in Equation 77 implies that a value cannot be found for an arbitrary high volume change $\Delta V_t$.

Figure 4C:
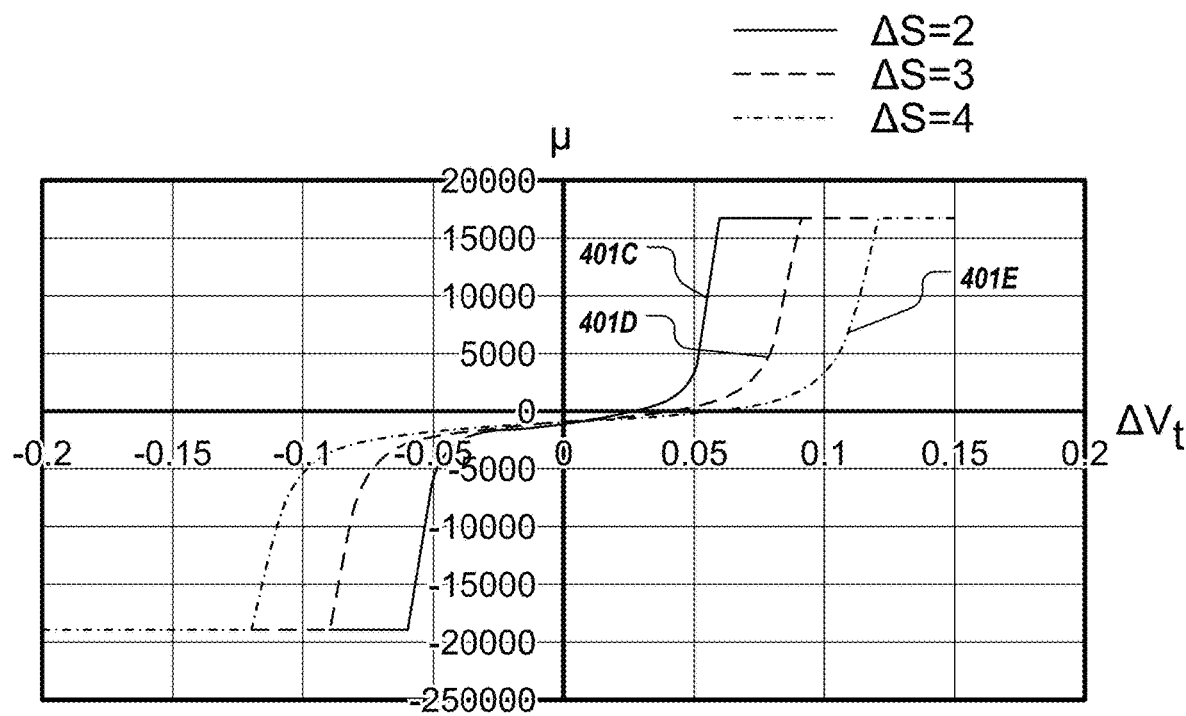
FIG. 4C shows a graphical representation of example variations of a value μ with a target volume change given different voxel sizes.

FIG. 4C shows a graphical representation of example variations of a value $\mu$ with a target volume change $\Delta V_t$ given different voxel sizes $\Delta s$. Curve 401C corresponds to a voxel size of 2, curve 401D corresponds to a voxel size of 3, and curve 401E corresponds to a voxel size of 4. In these example variations, the upper/lower bounds of $\mu$ are found using a bisection algorithm. Essentially, the upper/lower bound is initiated at $(0+\Delta V_t)/2$ and successively iterated until a valid $\mu$ is found from Equations 83-86 that satisfies the corresponding assumption in Equations 79-82. Alternatively, an advection time that violates the CFL condition may be used while using multiple advection steps, i.e., set $T = 1/|v|_{max}$ and compute $\mu$ from $$\mu = \frac{\frac{\Delta V_t}{T} - \int \Gamma a v_{se} d\Gamma}{\int \Gamma a d\Gamma} \quad (87)$$

In this way, the volume derivative can be used as a proxy shape derivative for many optimization constraints, such as stress, fatigue safety factor, buckling safety factor, and displacement. As described below, accurate volume control can be achieved using adaptive controllers, including PID controllers.

Returning to FIG. 4A, the computer-aided design program iteratively modifies a generatively designed three-dimensional shape of the modeled object in the design space in accordance with the one or more design criteria and the one or more in-use load cases for the physical structure. The iteratively modifying includes performing 422 numerical simulation, computing 424 shape change velocities, and updating 426 level-set representation(s) using the shape change velocities. The modification of the three-dimensional shape can include modification of both a geometry of the 3D shape, as well as a topology of the 3D shape. The numerical simulation is performed 422, for example, as described above with reference to FIG. 1B. The performing 422 includes performing numerical simulation of the modeled object in accordance with a current version of the three dimensional shape and the one or more in-use load cases to produce a current numerical assessment of a physical response, e.g., a structural response, of the modeled object.

The computing 424 includes computing shape change velocities for an implicit surface in a level-set representation of the three dimensional shape in accordance with the respective next (e.g., normalized) target value in a respective series of target values calculated 420 for each design constraint. In some implementations, the techniques described can be applied to density-based methods, like SIMP. The target values can be normalized, the techniques for which are described below. The series of target values begins with the initial target value and ends with a final target value for the design constraint. As described above with reference to FIG. 4B and Equation 70, during a first part of the iterations (up to $n_v$), the target values are calculated 420 from a smooth function, e.g., a B-Spline. When the iteratively modifying passes $n_v$, the next target value used in the computing 424 is the final target value for the respective design constraint.

Volume Control Using Adaptive Controllers, Including Proportional-Integral-Derivative (PID) Controllers Next, accurate volume control using adaptive controllers is discussed. In general, an adaptive controller is a technique for providing feedback to continuously compute an error value between a desired value and a measured value, and then applying a correction to some control parameter. A Proportional-Integral-Derivative Controller (PID) controller is a type of adaptive controller that continuously computes an error value between a desired value and a measured value, based on proportional, integral, and derivative terms of the value to some control parameter. Different parameters that effect shape changes (e.g., the relative contribution of a particular constraint gradient) can be controlled using PID controllers. During the iteratively modifying, the proportional, integral and derivative components of the PID controller are adjusted to slow or speedup shape changes implicitly by applying varying amount of control on the controlled parameters in response to an oscillation in the generatively designed three dimensional shape.

The PID components of the PID controller are also adjusted to effect a first level of increase in the measured value in response to repetition of success or failure to satisfy the normalized next target value of the measured value. Increases and reductions to the components can be made using a multiplier value that is based on the average deviation of the measured value of the component from the target value. For example, the multiplier can be 1+abs(deviation). As described below, a PID controller can be used to accurately correct for the target volume of the model for each iteration of an optimization process, including a process implementing controlled convergence.

For convenience, the description below will reference volume fractions denoted by $V_{T,t}^f$, $V_t^f$ to indicate target volume fraction and actual volume fraction at the end of iteration t, respectively.

$$V_{T,t}^f = \frac{V_{T,t}}{V_0} \tag{88}$$

$$V_t^f = \frac{V_t}{V_0}.$$

where $V_0$ denotes the volume of the design space.

Given a maximum number of iterations n and a target final volume fraction $V_{T,t}^f$, the target volume fraction for each iteration can be computed using a controlled convergence process described above with reference to Equation 68:

$$V_{T,t}^f = V_{T,n}^f + \frac{N^d(\xi)}{N^d(0)}(V_{T,0}^f - V_{T,n}^f) \tag{89}$$

Next, the value for μ is computed (Equations 83-86) to achieve this volume target for every iteration. Notice that an error between the desired and actual volume fractions $V_{T,t}^f - V_t^f$ remains at the end of each process. This is caused by the approximation in Equation 75 which leads to an error of magnitude $V_{T,t} - V_t$ after iteration t. Note that this error is already accounted for in Equation 74 when computing the volume change for iteration t+1 which is the sum of volume change for the next iteration and the error from the previous iteration $$\Delta V_{t+1} = (V_{T,t+1} - V_{T,t}) + (V_{T,t} - V_t) \tag{90}$$
$$= V_{T,t+1} - V_t.$$

However, in some cases, this is not sufficient to achieve a prescribed volume target. Therefore, PID controllers are used.

Figure 4D:
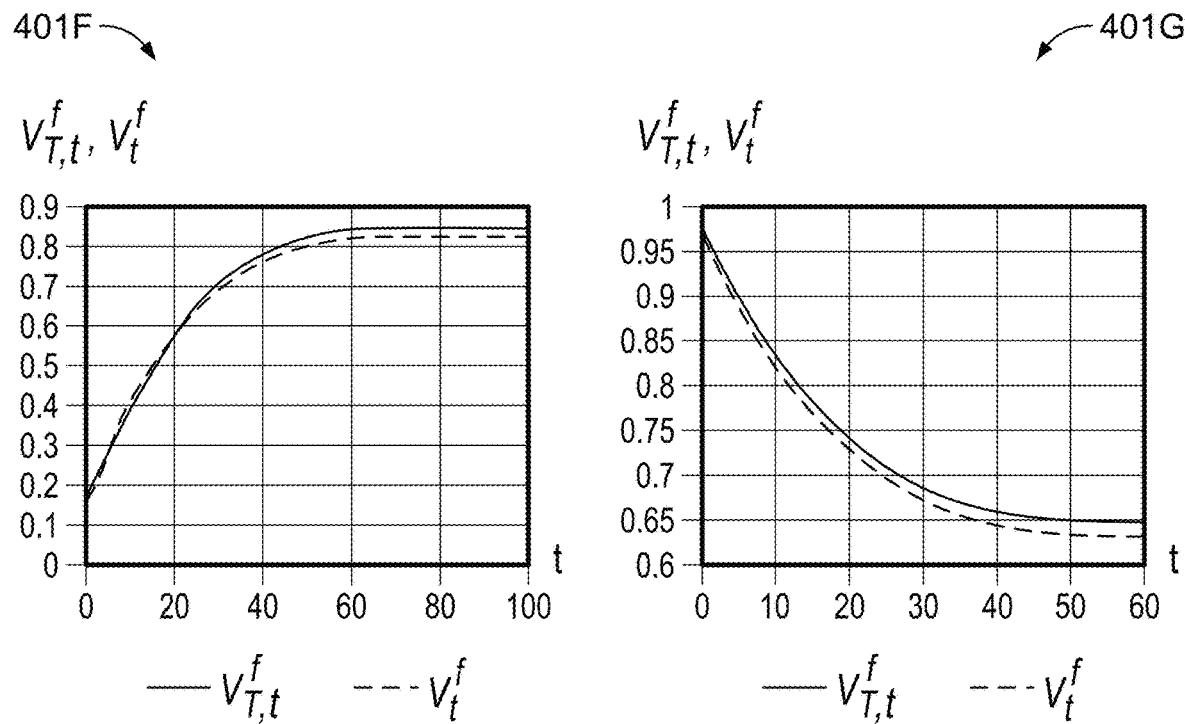
FIG. 4D shows examples of graphs tracking target volume versus actual volume fraction during an iterative optimization process with approximate volume control and without adaptive control.

FIG. 4D shows examples of graphs 401F, 401G tracking target volume versus actual volume fraction during an iterative optimization process with approximate volume control and without adaptive control. Graph 401F shows discrepancies between a target and actual volume for a modeled object as the volume is increased over a number of iterations. Graph 401G shows discrepancies between a target and actual volume for a modeled object as the volume is reduced over a number of iterations. In both cases, the target volume and the actual volume do not coincide, and the error can grow larger over longer iterations, with potentially disastrous results.

To address this issue, an adaptive, e.g., PID, controller can be used to adjust the volume target for each iteration, to maintain better control over volume changes. Define the error in volume fraction (between actual and target volume) at iteration t as follows:

$$e_t^V = V_{T,t}^f - V_{t-1}^f. \tag{91}$$

The target volume for iteration t is now computed by $$\Delta V_t = V_0 \left( K_p e_t^V + K_i \int_0^t e_\tau^V d\tau + K_d \frac{de_t^V}{dt} \right) \tag{92}$$
$$= V_0 \left( K_p e_t^V + K_i \int_0^t e_\tau^V d\tau + K_d (e_t^V - e_{t-1}^V) \right).$$

where $K_p$, $K_i$, $K_d \in R^+$ are the PID parameters. Note that the PID controller is applied on target volume fraction change instead of target volume, to ensure the PID parameters are not dependent on initial domain volume. Unless otherwise stated, $K_p=1$, $K_i=0.1$, $K_d=0.1$ are used hereafter. For simplicity, such PID controllers will be denoted as follows hereafter where the subscript t is dropped for clarity:

$$\Delta V_t = \text{PID}(e_t^V) \tag{93}$$

Figure 4E:
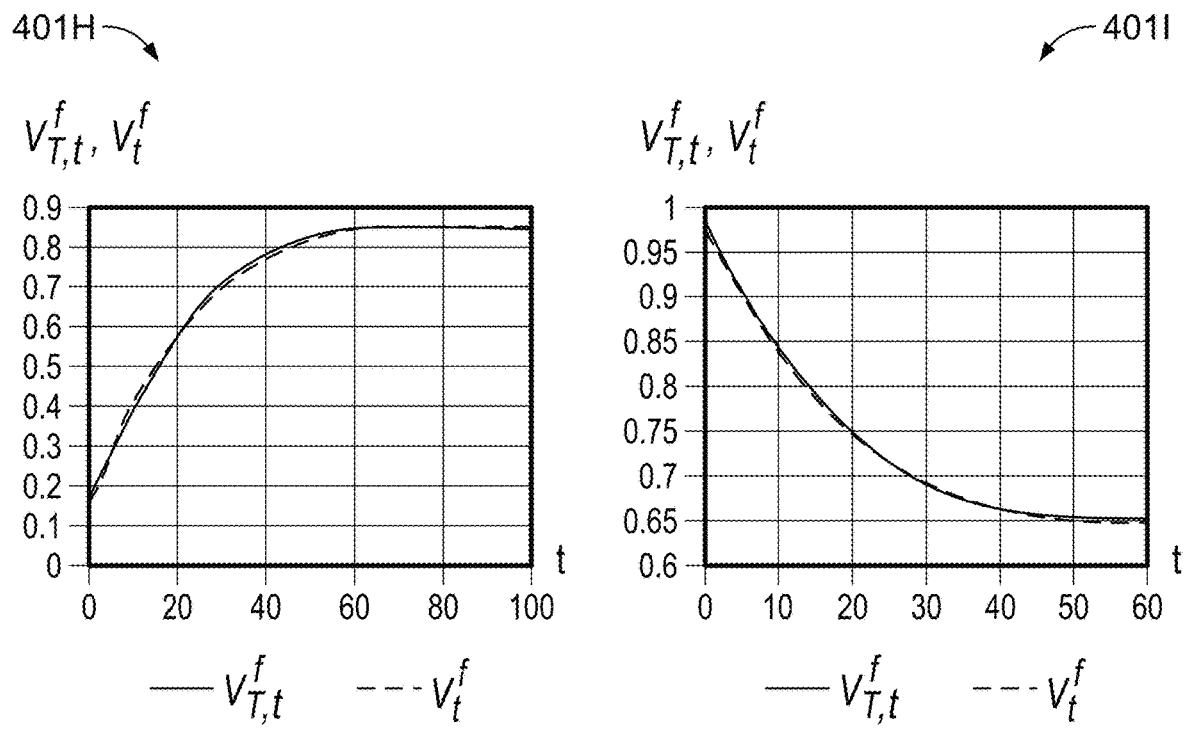
FIG. 4E shows examples of graphs tracking target volume versus actual volume fraction during an iterative optimization process with PID control (but without adaptive PID control).

FIG. 4E shows examples of graphs 401H, 401I tracking target volume versus actual volume fraction during an iterative optimization process with PID control (but without adaptive PID control, as described below). Graph 401H shows the positive volume case (in which volume is added to the model with subsequent iterations), while graph 401I shows the negative volume case (in which volume is subtracted from the model with subsequent iterations). In both cases, the target volume and the actual volume track closely, with the error being smaller than the same optimization performed without a PID controller, as described above with reference to FIG. 4D.

The end result of this process is applying control over a response parameter $e_t^V$, based on variations of a control parameter $\Delta V_t$. In addition, volume control using PID controllers, and adaptive controller techniques in general, can be applied in combination with all of the other systems and techniques described in this document, including for handling arbitrary equality and inequality constraints, described below, and in combination with the various other shape and topology optimization techniques described in connection with FIGS. 5A-8C.

Adaptive PID Tuning

In some implementations, to provide good control for a broad range of design problems, the $K_p$, $K_i$, $K_d$ parameters in an adaptive, e.g., a PID controller are modified in response to controller behavior, by applying a multiplier equal to the average deviation of the iteration result from target. Three key controller statuses monitored for can be:

Oscillations: Oscillations are defined as occurring when, during the observed time period, there exist more than 2 pairs of consecutive success and failure.

Repeat failure or success: A success or failure is considered repeated if it occurs over a number of iterations equal to some predetermined threshold, e.g., 10%, of the specified maximum iterations.

Repeat excessive failure or success: A success or failure is deemed excessive if the relative error between it and the target exceeds the predetermined threshold, e.g., 10%.

PID control theory indicates that the integral term should be used to reduce systematic error, while the derivative term should be used to dampen oscillations. The proportional term guides the speed of convergence. In practice, it is often found the derivative term can be hard to adjust and in fact contribute to oscillatory behavior (a phenomenon known as "derivative kick").

Figure 5:
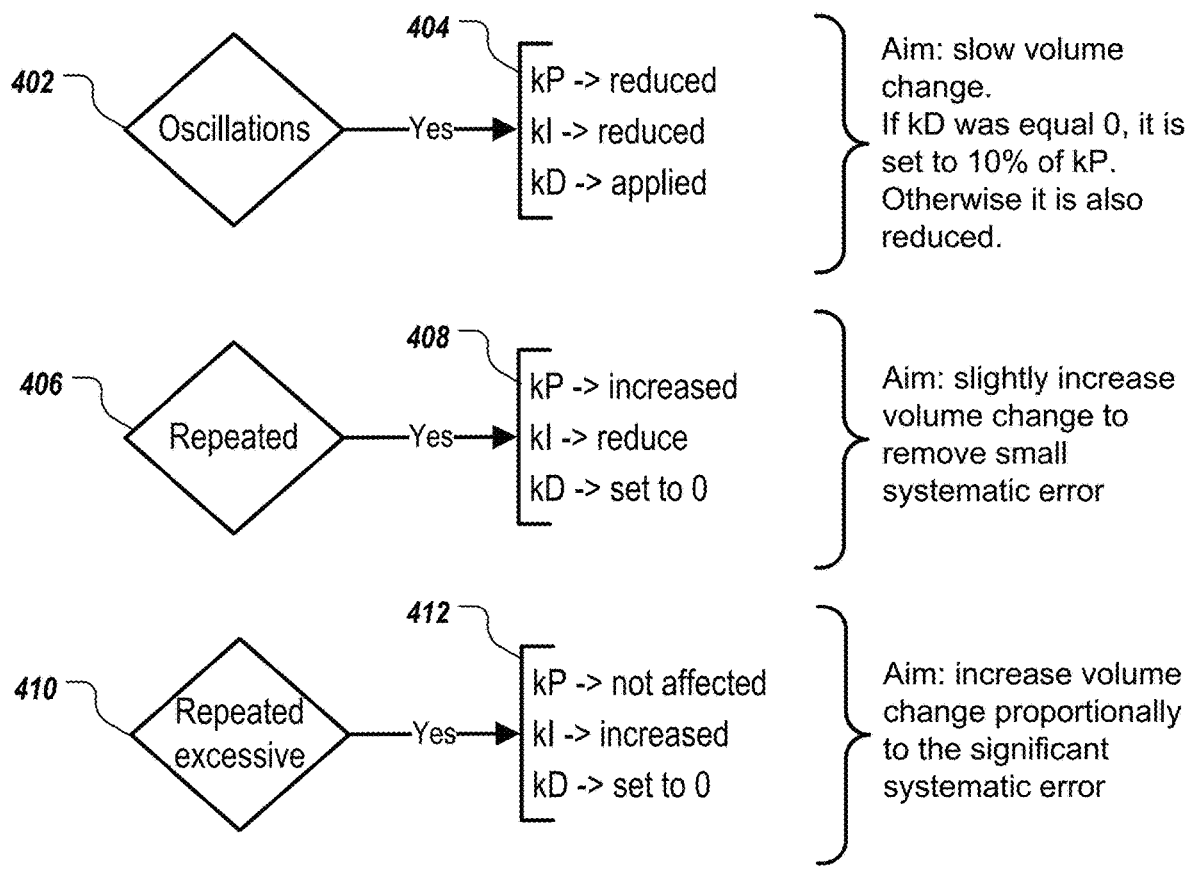
FIG. 5 shows an example of a process of adaptively modifying parameter values for a PID controller.

FIG. 5 shows an example of a process of adaptively modifying parameter values for a PID controller. If oscillations are determined 402, then the proportional and integral terms are reduced. The derivative term is set to a percentage of the proportional term if it is currently at zero, otherwise it is also reduced 404. An aim of these changes is to slow volume change. If repeated success or failure is determined 406, then the proportional term is increased, the integral term is reduced, and the derivative term is set to zero 408. An aim of these changes is to slightly increase volume change to remove small systematic error. If repeated excessive failure or success is determined 410, then the proportional term is not affected, the integral term is increased, and the derivative term is set to zero 412. The aim in this situation is to increase volume change proportionally to the significant systematic error.

For the newly adjusted parameters to take effect, a normal status can be applied for a set number of iterations after the adjustment. Similarly, periods accounted for in the determination of controller statuses can be modified to avoid overcompensation. In some implementations, the design problem is allowed to converge rapidly in the initial optimization stages. Hence, during that interval, only the oscillatory status is adapted for and all others are effectively ignored by the adaptive process.

Therefore, returning to FIG. 4A, as part of the computing 424, the proportional, integral and derivative components of an adaptive controller, e.g., a PID controller can also be adjusted to effect a second level of increase in shape changes in response to the repetition of success or failure having a relative error with respect to the next (e.g., normalized) target value that exceeds a threshold. In this example, the second level of increase in shape changes is greater than the first level of increase in shape changes.

An adaptive controller can also be implemented using any appropriate machine learning technique for predicting changes to a control parameter in response to one or more inputs. For example, a controller can be implemented as a neural network having a plurality of neural network layers. The neural network can include an input layer that receives one or more inputs, and an output layer that outputs a change to a control parameter in response to the inputs. The neural network can include one or more hidden layers between the input and output layer, each hidden layer applying one or more non-linear functions to a received input at the layer, where the functions are weighted according to learned parameter values.

An adaptive controller implemented as a neural network can be trained according to any appropriate supervised learning technique. In the case of supervised learning, a controller can be trained on a training data set that includes inputs to a PID controller paired with output changes to the Proportional, Integral, and Derivative changes of the constraint value in response to the input. The training data can include a subset of all input-output pairs generated from a PID controller, e.g., the previous N iterations where N is some pre-defined value. The training data can be further modified, e.g., with random oscillations or other variations added.

As described below with reference to Arbitrary Equality and Inequality Constraints, a separate adaptive controller can be implemented for each constraint. In some implementations, the adaptive controller can be implemented as a neural network or other machine learning model that receives, as input, the generated constraint change from each PID controller, and generates, as output, a final volume change considering all constraints. In implementations in which a single machine learning model is used, the training data for training the model can include a subset of input-output pairs, as described above, over a number of iterations, with or without random perturbations.

The adaptive controller can be trained to generate constraint values or a final volume change according to additional inputs besides the proportional, integral, and derivative terms. For example, the additional inputs can be from the topology optimization process, such as features extracted from the current shape of the part being designed for, or features of current stress, strain, and displacement results for the part. An adaptive controller can receive these additional inputs to learn parameter values to generate more accurate controlled values or final shape changes and further stabilize the optimization process.

The adaptive controller can be further trained in response to new test cases and design requirements. Additional training can be done offline, in real-time, or a combination of the two. For example, if a specific optimization task does not converge or is not stable, multiple instances of the optimization process can be run for all test cases but for different controller settings, e.g., different model parameter values weighting the machine learning model, different hyperparameter values, e.g., learning rate, batch size, etc., or both. The settings of the instance with the best performance, e.g., according to some performance metric, can be used in an adaptive controller and corresponding optimization process for producing the final design. The multiple instances can be run offline, e.g., when the number of test cases is small, or adapted online during the optimization process.

Although neural networks are given as an example machine learning technique for implementing adaptive controllers, any suitable technique can be used, e.g., fuzzy logic or any appropriate type of regression model. Moreover, adaptive controllers, as described in this document, can also have one or more extra inputs (other than just a measure of error) that provide more information about the trend and current state of the optimization process Constraint Normalization During Topology Optimization.

Controlled convergence can be combined with normalization of the constraint values, as described above in reference to the computing 424 of FIG. 4A. The constraint values can have different orders of magnitude, resulting in ill-conditioned optimization problems and gradients that do not exist or are very difficult to implement for complex constraints. For example, the starting value of the fatigue safety factor may be about 10,000, while the target value may be 1. In such situations, the sensitivity of the gradient diminishes as the solution nears the target and a final value of 10 (which has an error of 9/10000 with respect to the starting value) may be deemed acceptable due to the relatively small error. A moving reference value, as described below in the Normalization Algorithm, ameliorates the problem.

Normalization Algorithm

---

Input: $t_i$, t, n, $g_{T,n}$, $T_k$, $T_i$, $K_{th}$, $K_{cur}$, $K_g$
Output: $g_{ref,t}$
// initiate or update reference in every iteration t
1: if t = 0 then
    // initiate reference value
2:     $g_{ref,0} = \begin{cases} |g_0 - g_{T,n}| & \text{if } |g_0 - g_{T,n}| \neq 0 \\ 1 & \text{otherwise} \end{cases}$
3: else
    // check if end of inner loop iteration
4:     if $t_i \leq T_i$ and $n - t \leq T_i$ then
        // compute moving average for some fixed history length $T_k$
5:         $g_{avg,t} = \sum_{k=1}^{T_k} \frac{g_{t-k}}{T_k}$
        // define threshold from moving average
6:         $\Delta g_{th} = K_{th}|g_{avg,t} - g_{T,n}|$
        // define the threshold from current difference
7:         $\Delta g_{cur} = K_{cur}|g_i - g_{T,n}|$
        // define the min/max allowable change in the reference value
8:         $\Delta g_{ref} = K_g g_{ref,t-1}$
        // count the number of oscillations ($n_0$) during the past $t_i$ iterations
9:         if $n_O > 0$ then
            // increase reference value
10:             $g_{ref,t} = \max\{g_{ref,t-1}, \min\{\Delta g_{th}, g_{ref,t-1} + \Delta g_{ref}\}\}$
            // reset inner loop
11:             $t_i = 0$
12:         else if $g_{ref,t-1} > \Delta g_{th}$ then
            // check if converged and decrease reference value
13:             $g_{ref,t} = \min\{g_{refmt-1}, \max\{\Delta g_{th}, \Delta g_{cur}, g_{ref,t-1} - \Delta g_{ref}\}\}$
            // reset inner loop
14:             $t_i = 0$
15:         else if $\Delta g_{cur} > g_{ref,t-1}$ then
            // check if excessive violation and increase reference value
16:             $g_{ref,t} = \max\{g_{ref,t-1}, \min\{\Delta g_{th}, \Delta g_{cur}\}\}$
            // reset inner loop
17:             $t_i = 0$
18:         else
            // increment inner loop iteration
19:             $t_i \leftarrow t_i + 1$
20:         end if
21:     else
        // increment inner loop iteration
22:         $t_i \leftarrow t_i + 1$
23:     end if
24: end if

---

Some features of the Normalization Algorithm are noted, as follows.

The reference value $g_{ref,t}$ should not be updated in every iteration. Sufficient time should be allowed for the constraint to stabilize after setting a new reference. This is achieved using the notion of an inner loop iteration (lines 3-22 of the Normalization Algorithm). The maximum length of inner loop iterations is given by $T_i \in \mathbb{Z}^+$ which can be dynamically adjusted for every design problem, for example, adjusted such that there are at least 6 inner loop iterations with a lower bound of 5 on the inner loop length.

The threshold $\Delta g_{th}$ used to determine if the existing reference is too far from the current value is computed using a multiplier $K_{th} \in \mathbb{R}^+$, e.g., 20, of the moving average of the constraint value. The length of the moving average computation is given by $T_k \in \mathbb{R}^+$, e.g., 10. The threshold is increased if oscillations are detected during the last inner loop, otherwise it is reduced when the current reference value is above the threshold.

Any change to the reference value is bounded by a maximum change $\Delta g_{th} = K_g g_{ref,t-1}$ computed using a ratio $0 < K_g \leq 1$ of the existing value, e.g., 0.6. Any reduced reference value should also be larger than a multiplier of the current violation $|g_i - g_{T,n}|$. An example of the multiplier is given by $K_{cur} = 1.2$.

Figure 6:
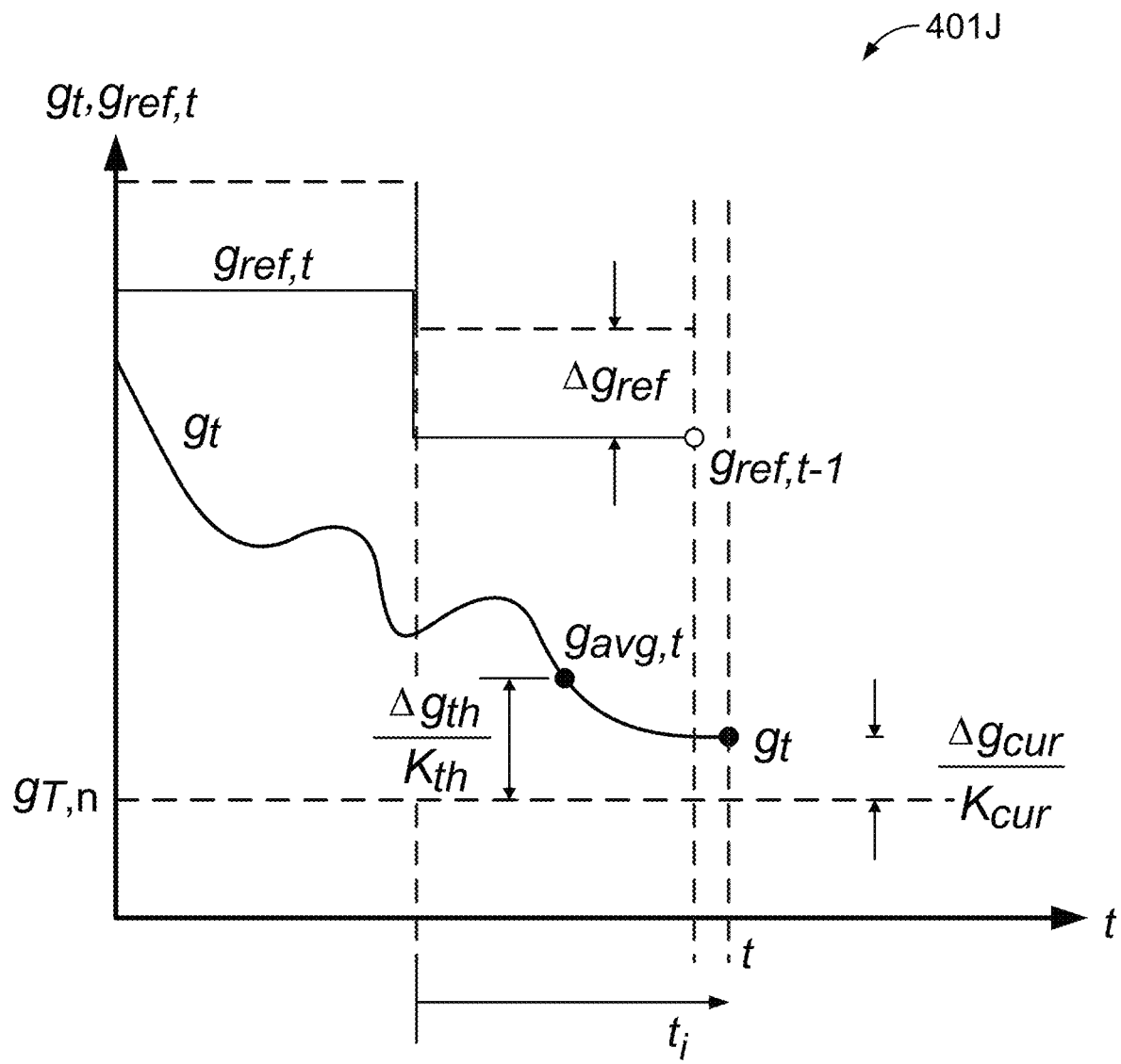
FIG. 6 shows an example of a graph that tracks different measures used in constraint normalization.

FIG. 6 shows an example of a graph 401J that tracks different measures used in constraint normalization, as detailed in the Normalization Algorithm and as described immediately above. Specifically, the graph 401J shows how the reference value $g_{ref,t}$ is updated over time as the constraint value approaches the next target value. The final target value is $g_{T,n}$, while $g_t$ represents the current value of the constraint as it approaches the final target value $g_{T,n}$ oscillating over time. The reference value $g_{ref,t}$ is larger than both the current and final value for the constraint, and does not change with each iteration. The reference value is adjusted over time, approaching the final target value without crossing the current target value.

In some implementations, a value computed from the Normalization Algorithm can be assigned to a target reference value $\tilde{g}_{ref,t}$ and an adaptive controller (e.g., a PID controller as described above with reference to FIGS. 4D-5) can be used to enable a smooth transition of the applied reference $g_{ref,t}$, in situations in which sudden changes of the reference value might otherwise occur at the start of each inner loop iteration of the Normalization Algorithm. One example application is as follows, for a given iteration t:

$$\Delta \tilde{g}_{ref,t} = \tilde{g}_{ref,t} - g_{ref,t-1}.  \qquad (94)$$

$$g_{ref,t} \leftarrow g_{ref,t} + f_{PID}(\Delta \tilde{g}_{ref,t}).$$

Arbitrary Constraint Handling

Arbitrary Constraint Handling is a general method that can be applied to any type of optimization constraint, even when exact shape derivatives are not available. Whether proxy or actual shape derivatives are implemented, more accuracy and control can be achieved over the generative design process.

Arbitrary Equality Constraints

Consider an equality constraint of type $g(\Omega, u(\Omega))=0$ in an optimization problem where compliance minimization is used as the objective function. In the absence of a shape derivative $dg/d\Omega$, the conventional practice in industry is to optimize while monitoring g and to terminate optimization when $g \approx 0$. This implies that the end result is an un-converged solution with a lack of control as the solution approaches zero as $g \to 0$.

However, adaptive controllers can be used to enforce equality constraints, without shape derivatives. Let $g^i(\Omega, u(\Omega))j=1, \ldots, n_g$, denote a sequence of equality constraints that have been normalized as described above (e.g., using the Normalization Algorithm, above) such that $g^j(t) \in [0,1]$ $\forall t$. Consider the normalized error of each constraint, which can be used to define the error in the constraint for each iteration in a manner similar to Equation 91:

$$e_t^j = \frac{g_{t-1}^j - g_{T,t}^j}{g_{ref}^j}. \qquad (95)$$

This can be substituted in Equation 93 to approximate the volume change needed to satisfy constraint $g_j$ in iteration t:

$$\Delta V_t^j \approx I^j f_{PID}(e_t^j). \qquad (96)$$

where $I^j = -1$ when the constraint is inversely related to the volume change and $I_{g,t} = 1$ otherwise. Control is effectively applied over $\Delta_t^j$ to achieve a desirable outcome of the response parameter $e_t^j$. When multiple constraints are present, each constraint would recommend a different volume change needed to satisfy the constraint. The constraints are grouped into positive and negative values:

$$V_t^+ := \{x | x = i_t^j f_{PID}(e_t^j), x > 0, j = 1, \ldots, n_g\}.$$

$$V_t^- := \{x | x = i_t^j f_{PID}(e_t^j), x > 0, j = 1, \ldots, n_g\}. \quad (97)$$

Then, the single volume change applied in this iteration can be computed with $$\Delta V_t = \begin{cases} \max(V_t^+) & \text{if } V_t^- = \emptyset \\ \min(V_t^-) & \text{if } V_t^+ = \emptyset \\ \dfrac{\text{avg}(V_t^+ \cup V_t^-)}{2} & \text{if } V_t^- \neq \emptyset \text{ and } V_t^+ \neq \emptyset \\ 0 & \text{otherwise.} \end{cases} \quad (98)$$

The μ value in the shape derivative for volume control for any non-zero $\Delta V_t$ can be applied following the method described above for approximate volume control, with reference to Equations 71-87.

Arbitrary Inequality Constraints

The techniques described above with reference to arbitrary equality constraints and Equations 95-98 result in the volume change converging to zero as the constraint becomes satisfied, i.e., $\Delta V_t^j \to 0$ as $e_t^j \to 0$. When inequality constraints are used, this causes a potential problem as inequality constraints can be satisfied with $\Delta V_t^j \neq 0$. Therefore, when inequality constraints are used, a slack variable called an importance factor can be used to manage relative contribution of each violated constraint. An importance factor can mitigate uncontrolled changes in convergence and constraints interfering with the minimization objective when all constraints are given equal importance. The importance factor regulates the relative importance of different constraints during different iterations of the generative design process.

Let $p_t^1, \ldots, p_t^{n_g} \in \mathbb{R}^+$ denote the importance factor of each constraint, Equation 96 can be modified as follows:

$$\Delta V_t^j \approx p_t^j i_t^j f_{pid}(e_t^j) \quad (99)$$

where the applied importance factor is computed using predetermined, e.g., user-provided, importance factors $\tilde{p}^j$ as follows:

$$p_t^j = \frac{\tilde{p}^j}{\max_{k=0}^{n_g} s_t^k \tilde{p}^k} \quad (100)$$

where $s_t^k = 1$ if the inequality constraint $g^k$ is violated at iteration t, otherwise $s_t^k = 0$. At each iteration, the applied importance factor is updated according to the sign of $s_t^k$ of all constraints. This allows constraint violations to impact the applied importance factor and hence, the volume change $\Delta V_t$.

To prevent sudden changes to $i_t^j$ due to the change of status of constraint from violated to non-violated, and vice versa, a PID controller can be used, e.g., as described above with reference to Equations 96 and 97 and FIGS. 4D-5, to stabilize the change in importance factor, as follows:

$$\Delta p_t^j = p_t^j - p_{t-1}^j$$

$$p_t^j \leftarrow p_t^j + f_{PID}(\Delta p_t^j). \quad (101)$$

Complex generative design problems can be solved according to a combination of the techniques described above, e.g., with controlled convergence, a combination of inequality and equality constraints, and using PID controllers.

Modified Augmented Lagrangian Method for Constraint Handling

The augmented Lagrangian algorithm introduced with reference to Equations 28-30 can be modified as follows to accommodate constraint handling for arbitrary equality and inequality constraints, as described above.

Controlled convergence: The classical augmented Lagrangian method computes the constraint violation term $e^j$ as the difference between the current value of the constraint and the final value, e.g., as follows:

$$e^j(\Omega, u(\Omega)) = \frac{g^j(\Omega, u(\Omega)) - g_T^j}{g_{ref}^j} \quad (102)$$

Controlled constraint convergence is applied as described above, e.g., with reference to FIGS. 4B-4C. Some constraints may converge earlier than others, therefore the amount of changes being made to the design can be gradually reduced, i.e., large changes made during the initial phase with progressively smaller changes later.

Constraints without shape derivatives: Although the shape derivatives for many objectives and constraints can be mathematically computed using the adjoint method (Equations 14-25), implementation of the adjoint method in a commercial finite element solver can be a difficult task. Additionally, sometimes optimization constraints can be assessed by black-box evaluators provided by users. Therefore, proxy shape derivatives can be used following the techniques described above, e.g., with reference to Arbitrary Constraint Handling and FIGS. 4B-4E.

Precise Volume Control: Precise control of volume is often quite important for obtaining a good design output from complex engineering examples. The μ calculation methods introduced above with reference to Approximate Volume Control, Volume Control using Adaptive Controllers, and Equations 71-93 can be integrated into the augmented Lagrangian method, while further enhancing the accuracy using a line search algorithm.

First, constraints can be placed into two groups $G_v$, $G_{nv}$ where the former contains all constraints that are affected by volume changes, and the latter contains constraints that are not, e.g., min/max thickness or centroid constraints. The shape derivative from the augmented Lagrangian method is then modified as follows:

$$\frac{d\mathcal{L}}{d\Omega} = \frac{d\mathcal{J}}{d\Omega} + \mu^* \sum_{g^j \in G_v} (\mu^j + \lambda^j e^j) \frac{dg^j}{d\Omega} + \sum_{g^j \in G_{nv}} (\mu^j + \lambda^j e^j) \frac{dg^j}{d\Omega} \quad (103)$$

where the constraint error $e^j$ is computed using a PID stabilized version of Equation 95 with the importance factor term from Arbitrary Inequality Constraints, described above with reference to Equations 99-101:

$$e_t^j = p_t^j f_{pid} \left( \frac{g_{t-1}^j - g_{T,t}^j}{g_{ref,t}^j} \right) \quad (104)$$

When the shape derivative $dg^j/d\Omega$ is unavailable, it may be approximated using a suitable proxy shape derivative.

For example, any such constraint from the set C may be approximated using the volume shape derivative as follows:

$$\frac{dg^j}{d\Omega} \approx I^j \frac{dV}{d\Omega} = I^j 1 \qquad (105)$$

where $I^j=-1$ when the constraint is inversely related to the volume change and $I_{gi}=1$ otherwise. Note that the derivative of the volume in the normal direction is unity.

Next, μ* is computed using the concepts described above with reference to Approximate Volume Control, Volume Control using Adaptive Controllers, and Equations 71-93. A target volume change $\Delta v_t$ is computed for each iteration t using Arbitrary Constraint Handling, using all constraints in $G_v$. Next, μ* is computed using the method described above with reference to Approximate Volume Control and Equations 71-87. Note that Equation 87 needs to be modified as follows to account for arbitrary constraints and objectives:

$$\mu^* = \frac{\frac{\Delta V_t}{T} - \int \Gamma^a \left[\frac{d\mathcal{J}}{d\Omega} + \sum_{g^j \in G_{nv}} (\mu^j + \lambda^j e^j)\frac{dg^j}{d\Omega}\right] d\Gamma}{\int \Gamma^a \left[\sum_{g^j \in G_{nv}} (\mu^j + \lambda^j e^j)\frac{dg^j}{d\Omega}\right] d\Gamma}. \qquad (106)$$

In some cases, a pitfall should be accounted for:

$$\mu^* \to \infty \text{ when } \sum_{g^j \in G_{nv}} (\mu^j + \lambda^j e^j)\frac{dg^j}{d\Omega} \to \infty.$$

When this is detected, μ* should be set to 1 in such cases. This usually happens as constraints converge towards the target value, i.e., $e^1 \to 0$.

Updating augmented Lagrangian parameters $\mu^j$, $\lambda^j$ for iteration t can be stabilized using Adaptive, e.g., PID controllers, as described above with respect to FIG. 5. For example, see below for the $\mu^j_i$ update rule:

$$\Delta\mu_t^j = \mu_t^j - \mu_{t-1}^j. \qquad (107)$$

$$\mu_t^j \leftarrow \mu_t^j + f_{PID}(\Delta\mu_t^j). \qquad (64).$$

As earlier mentioned, a line search algorithm, e.g., gradient descent or Newton's Method, can be applied to ensure the volume change achieved after advecting the level-set is within some acceptable tolerance with respect to the target volume change $\Delta v_t$. Line search is done to find the optimal multiplier $l_t$ such that the advection velocity is given by $l_t \, d\mathcal{L}/d\Omega$. Note that disabling line search is equivalent to setting $l_t=1$.

Figure 7:
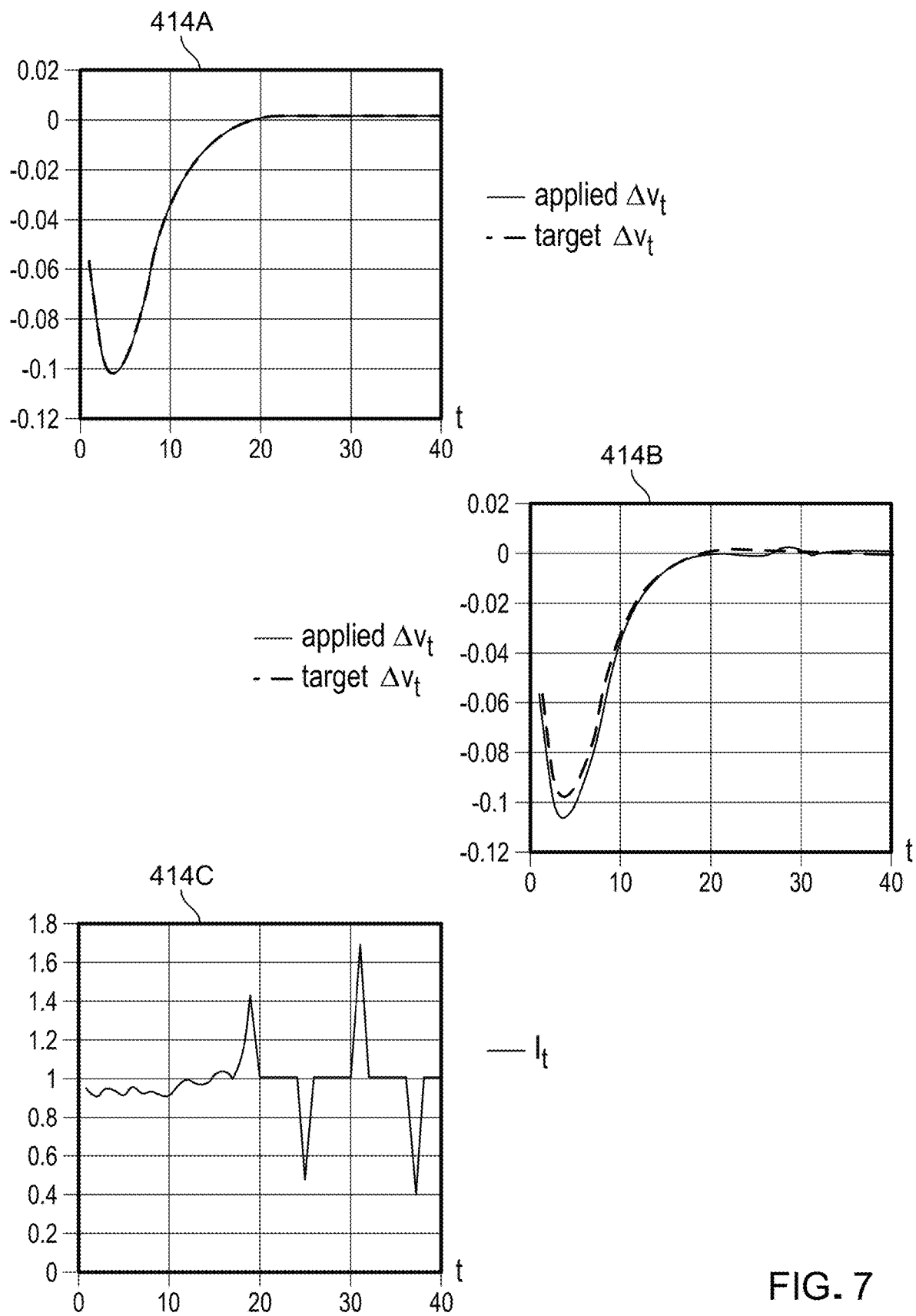
FIG. 7 shows examples of graphs tracking convergence history of constraints with and without line search.

FIG. 7 shows examples of graphs 414A-C tracking convergence history of constraints with and without line search. Graph 414A shows applied versus target volume change $\Delta v_t$ with line search. Graph 414B shows applied versus target volume change $\Delta v_t$ without line search. Graph 414C shows the history of velocity multiplier $l_t$ during convergence.

Returning to FIG. 4A, in some implementations, the one or more design criteria include multiple design constraints, which include the first inequality constraint and the second inequality constraint. In these implementations, the design constraints are grouped into a first group and a second group, the first group containing all of the multiple design constraints that are effected by volume changes, and the second group containing one or more remaining ones of the multiple design constraints that are not effected by volume changes. Computing 424 the shape change velocities includes using an augmented Lagrangian method, e.g., as described above, that applies an adjustment factor to a sum of shape change contributions from the first group but does not apply the adjustment factor to a shape change contribution from the second group.

In some implementations, the at least one design constraint without a defined shape gradient includes a first inequality constraint and a second inequality constraint. The first inequality constraint has a first input control parameter to a first proportional-integral-derivative controller and has a first importance factor that is multiplied with a shape change amount provided by the first proportional-integral-derivative controller, e.g., as described above with reference to Arbitrary Inequality Constraints and Equations 99-101. The second inequality constraint has a second input control parameter to a second proportional-integral-derivative controller and has a second importance factor that is multiplied with a shape change amount provided by the second proportional-integral-derivative controller.

Computing 424 the shape change velocities for the implicit surface in accordance with the proxy shape gradient can therefore include adjusting both the first and second importance factors based on whether or not one or more other constraints were violated in a prior iteration of the iteratively modifying. For example, the importance factor can be modified by multiplying the factor with a violation multiplier with respect to the other constraints in prior iterations of the iteratively modifying. In some implementations and as described above, e.g., generally with reference to FIGS. 4D-5 and with reference to Equations 99-101, proportional-integral-derivative control can be used to stabilize adjustments of the first and second importance factors.

Also as described above with reference to FIGS. 4A, 5, 6, the oscillation can be more than two pairs of consecutive successes or failures to satisfy the normalized next target value. Further, the repetition of success or failure to satisfy the normalized next target value can be repetition that occurs over a number of iterations equal to or greater than ten percent of the iteration amount and where the threshold is ten percent. In some implementations, the adjusting in response to the oscillation includes reducing the proportional component, reducing the integral component, and reducing or resetting the derivative component. In some implementations, the adjusting in response to the repetition of success or failure includes increasing the proportional component, reducing the integral component, and setting the derivative component to zero. In some implementations, the adjusting in response to the relative error exceeding the threshold includes increasing the integral component and setting the derivative component to zero.

As described above with reference to Adaptive Controllers and FIGS. 4D-5, the at least one design constraint may not have a defined shape gradient. Therefore, in some implementations, the computing 424 includes computing the shape change velocities for the implicit surface in accordance with a proxy shape gradient output that is adjusted by adaptive control. Specifically, an input control parameter is used that is a measure of error between a normalized current value for the at least one design constraint without the defined shape gradient and a normalized next target value from the respective ones of the target values in the series of target values. The measure of error changes with a reference value that is changed at least once during the iteratively modifying, which can allow for controlled convergence while meeting the critical constraint smoothly.

In some implementations, the at least one design constraint includes a first equality constraint and a second equality constraint, the first equality constraint having a first input control parameter to a first adaptive controller, and the second equality constraint having a second input control parameter to a second adaptive controller, e.g., as described above with reference to Arbitrary Equality Constraints and Equations 95-98. Then, the computing 424 the shape change velocities for the implicit surface in accordance with the proxy shape gradient includes using a maximum shape change amount provided by the first and second adaptive controllers when none of the first and second equality constraints are inversely proportional to shape change and using a minimum shape change amount provided by the first and second adaptive controllers when none of the first and second equality constraints are proportional to shape change. When one constraint is inversely proportional to shape change and at least one constraint is proportional to shape change, an average shape change amount is used.

After the computing 424, the level-set representation(s) are updated 426 using the shape change velocities to produce an updated version of the three dimensional shape of the modeled object. The performing 422, the computing 424, and the updating 426 are repeated until a check 428 determines that a predefined number of shape modification iterations have been performed or that the generatively designed three dimensional shape of the modeled object in the design space converges to a stable solution for the one or more design criteria and the one or more in-use load cases. The updating 426 and the check 428 can be performed, e.g., as described above with reference to FIG. 1B. Then, the computer-aided design program can provide the generatively designed three dimensional shape of the modeled object for use in manufacturing the physical structure corresponding to the modeled object using one or more computer-controlled manufacturing systems.

Singularities and Disconnections

Stress constraints, including Von Mises stress constraints, can be essential for running generative design, but they are hard to implement due to few elements in a Finite Element Analysis model showing very high stresses. A probabilistic method is provided, below, that can mitigate or outright eliminate such high stresses. Although the examples below refer to stress constraints, these techniques can be applied to avoiding singularities and preventing disconnections during generative design for any constraint. Singularities can occur, for example due to sharp re-entrant corners or bad meshing. The process described below can be implemented to be performed automatically as part of a generative design process, e.g., including the techniques described above with reference to FIGS. 1B-7.

Figure 8A:
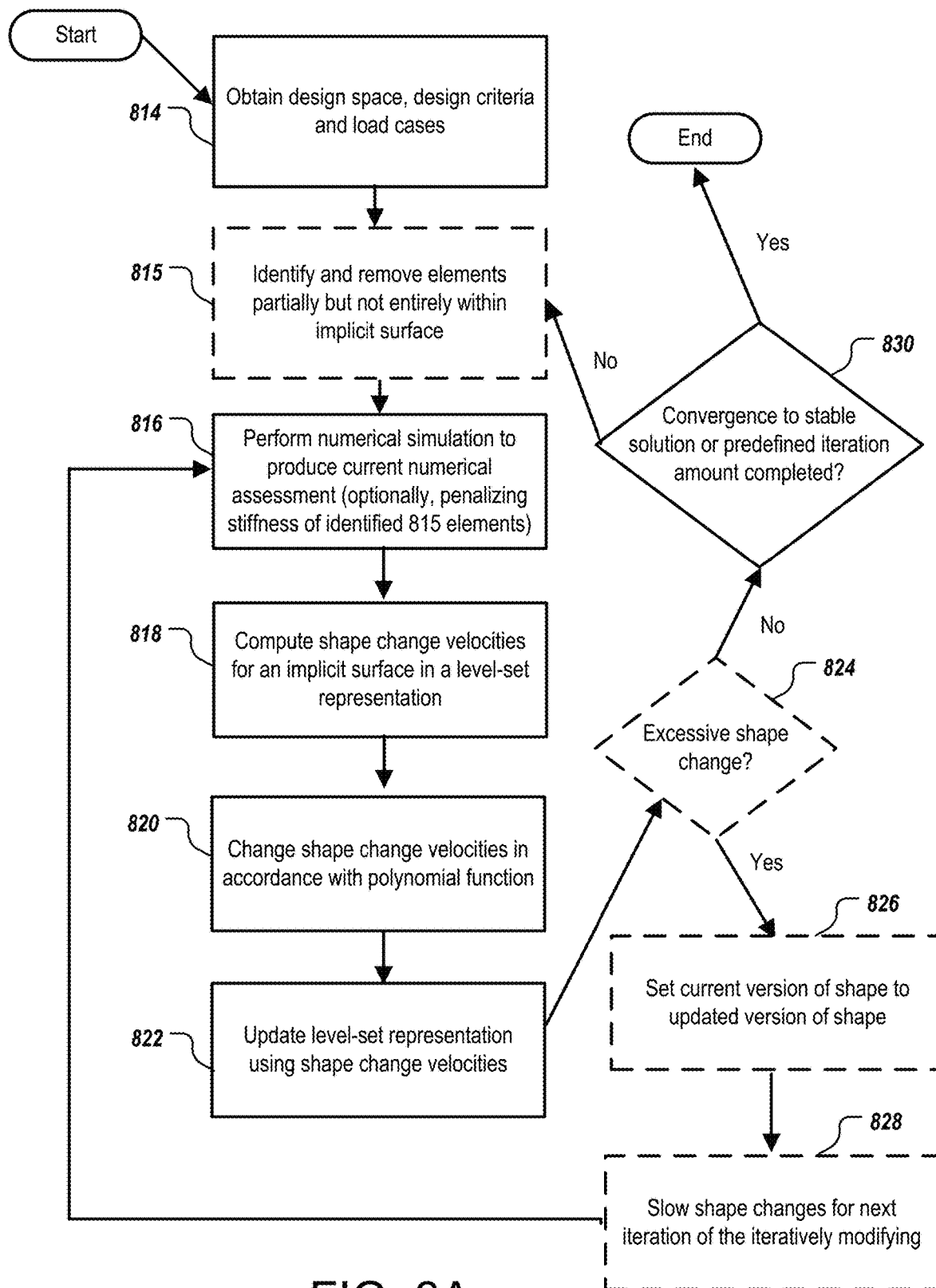
FIG. 8A shows an example of a process of iteratively modifying a generatively designed three dimensional shape of a modeled object in the design space in accordance with the one or more design criteria, while avoiding excessive sudden changes and minimizing the likelihood of disconnections.

FIG. 8A shows an example of a process of iteratively modifying a generatively designed three dimensional shape of a modeled object in the design space in accordance with the one or more design criteria, while avoiding excessive sudden changes and minimizing the likelihood of disconnections. A computer aided design program obtains 814 a design space for a modeled object, for which a corresponding physical structure will be manufactured, one or more design criteria for the modeled object, and one or more in-use load cases for the physical structure. A generatively designed three dimensional shape of the modeled object is iteratively modified in the design space in accordance with the one or more design criteria and the one or more in-use load cases for the physical structure, e.g., as described above with reference to FIGS. 1B, 3A, 3C, and 4A.

One solution for avoiding singularities is to replace the maximum stress in a Von Mises stress constraint, which takes the following form $$\max_{\Omega} \sigma(x) - \sigma_T \leq 0. \tag{108}$$

where $\sigma_T$ is a fixed stress target for each material, by a simple percentile value $\sigma^x$ in Equation 108, modified as follows:

$$\max_{\Omega} \sigma \leftarrow \sigma^x x \in \{0.9, 0.95, 0.99, 0.999 \text{ etc}\} \tag{109}$$

where $\sigma^x$ denotes the stress of the element in the $x^{th}$ percentile when elements are sorted in increasing order of $\sigma$. However, this results in the maximum stress in the domain $\max_{\Omega} \sigma$ being too sensitive to the value of x. Instead, the percentile x is converted into a standard normal deviate z using the inverse of the error function $$z = erf^{-1}(x) = \frac{1}{2}\sqrt{\pi}\left(x + \frac{\pi}{12}x^3 + \frac{7\pi^2}{480}x^5 + \frac{127\pi^3}{40320}x^7 + \ldots\right) \tag{110}$$

Next, the maximum stress is computed from $$\max_{\Omega} \sigma \leftarrow \mu(\sigma) + z\chi(\sigma) \tag{111}$$

where $\mu(\sigma)$ and $\chi(\sigma)$ denote the mean and standard deviation of the stress distribution, both of which can be computed according to any suitable technique.

TABLE 5, below, shows stress singularities for an object that are avoided based on the techniques described in this section:

TABLE 5

| Percentile x | Maximum Stress based on Percentile $\sigma^x$ | Maximum Stress Based on Standard Deviation $\mu(\sigma) + erf^{-1}(x) \chi(\sigma)$ |
| --- | --- | --- |
| .95 | 133.87 | 123.597 |
| .99 | 224.08 | 144.41 |
| .999 | 500.315 | 168.56 |
| .9999 | 815.34 | 188.84 |

The percentile based method brings stability to the oscillatory nature of global stress, by smoothing the maximum stress at a point based on the standard deviation of stress values for points on the object in the same percentile.

High Velocity Smoothing

The previous section described regulating the maximum value of constraint values in the domain, i.e., $\max_{\Omega} g^i$. The same is true for the constraint derivative $dg_i/d\Omega$, denoted by $dg_i$ for clarity.

Figure 8B:
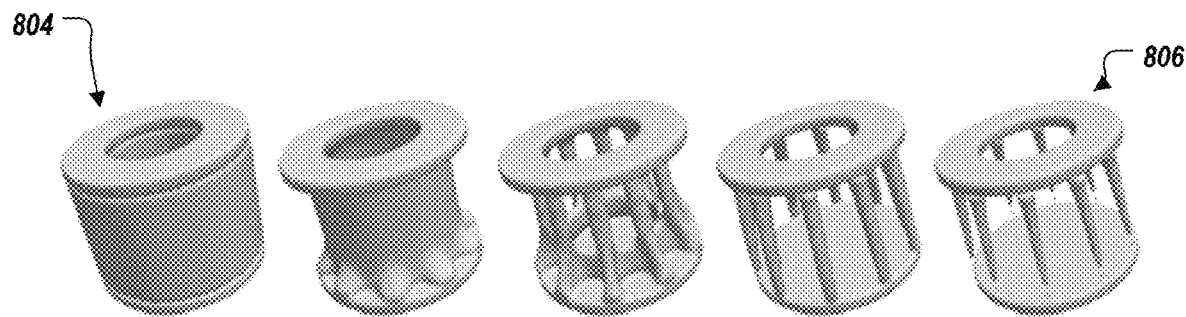
FIG. 8B is a graphical representation of an example of geometry disconnection during optimization.

FIG. 8B is a graphical representation of an example of geometry disconnection during optimization. Object 804 is shown at different stage of optimization. Typically, geometric ports can disconnect (shown at 806) from the main body of the design where the load path is taken by the Ersatz material. Having a small region with very high advection velocity causes disconnections and localized shape changes.

A combination of velocity clamping and high velocity smoothing can be used to prevent this.

Normalization: all shape derivatives can be normalized such that the magnitude of the maximum value on the surface of the current design Γ approximates the voxel size Δs $$(dg_t(x_K))_{normalised} = \Delta s \frac{dg_t(x_k)}{|max_{x_k \in \Gamma} dg_t(x_k)|} \quad (112)$$

This implies an advection time of T=1/Δs is sufficient to prevent the geometry from advecting beyond one voxel. An easy way to achieve this is through velocity clamping.

Velocity clamping: the first step in velocity clamping is computing a reference value for the shape derivative following the percentile approach described above with reference to Equations 109-111.

$$(dg_t)_{ref} = \mu(dg_t) + \text{erf}^{-1}(x)\chi(dg_t) \quad (113)$$

where μ and χ denote the mean and standard deviation of the shape derivative on the surface and x∈{0.9,0.95,0.99,0.999 etc.} is a user-given percentile. Note that the percentile value x could be much higher for well behaved shape derivatives (without excessive highs) such as strain energy and lower for widely fluctuating shape derivatives, such as stress.

Next, for all grid points $x_k$ in the inner narrow band, i.e., a narrow band width equal to $w_{nb}\Delta s$, velocity values higher than the reference value $(dg_t)_{ref}$ are clamped while preserving the sign β as follows:

$$(dg_t(x_k))_{clamped} = \beta \min\left[|dg_t(x_k)|, \left|(dg_{t_{ref}})\right|\right] - w_{nb}\Delta s \leq \psi(x_k) \leq 0 \quad (114)$$

$$\beta = \frac{dg_t(x_k)}{[dg_t(x_k)]}$$

where $\psi(x_t)$ denotes the level-set of the grid point. However, this results in a sudden change in the velocity profile. Velocity clamping should be done in such a manner that there is a smooth transition in the velocity profile.

High velocity smoothing: The objective in high velocity smoothing is to smooth all high velocities ($|dg_t|>|(dg_t)_{ref}|$) such that there is a gradual smoothing of all values above the reference velocity computed from Equation 113. A user given parameter ρ, e.g., ρ=0.85, is used to scale all velocity values less than the reference velocity $$(dg_t(x_k))_{smooth} = \rho\beta|dg_t(x_k)|\frac{|dg_t(x_n)|}{|(dg_t)_{ref}|} k < k_{ref} \quad (115)$$

where $k_{ref}$ denotes the position index of the grid point once they are sorted in order of the shape derivative.

The smoothed velocity of all grid points with velocity greater than the reference velocity are found by fitting a cubic polynomial, as follows:

$$(dg_t(x_k))_{smooth} = \alpha\xi^3 + b\xi^2 + c\xi + d k_{ref} \leq k \leq n \quad (116)$$

where ξ denotes the shifted index $\xi = k - k_{ref}$. The unknown coefficients {a, b, c, d} can be found solving the linear system of equations obtained by settings the appropriate boundary conditions at ξ=0 and $\xi = \xi_{max} = n - k_{ref}$ $$\begin{bmatrix} (0)^3 & (0)^2 & (0)^1 & 1 \\ (\xi_{max})^3 & (\xi_{max})^2 & (\xi_{max})^1 & 1 \\ 3(0)^2 & 2(0)^1 & 1 & 0 \\ 3(\xi_{max})^2 & 2(\xi_{max})^1 & 1 & 0 \end{bmatrix} \begin{bmatrix} a \\ b \\ c \\ d \end{bmatrix} = \begin{bmatrix} dg_t(x_{k_{ref}}) \\ dg_t(x_n) \\ \nabla(dg_t(x_{k_{ref}}))_{smooth} \\ 0 \end{bmatrix}. \quad (117)$$

The gradient of the smooth velocity at ξ=0 can be obtained as $$\nabla(dg_t(x_{k_{ref}}))_{smooth} = \rho\nabla(dg_t(x_{k_{ref}}))\frac{|dg_t(x_n)|}{|(dg_t)_{ref}|}. \quad (118)$$

Finally, the smoothed normalized velocity is given by $$(dg_t(x_k))_{smooth\ normalised} = \Delta s \frac{(dg_T(x_k))_{smooth}}{|max_{x_k \in \Gamma}(dg_t(x_k))_{smooth}|}. \quad (119)$$

Returning to FIG. 8A, within the iteratively modifying, a numerical simulation of the modeled object in accordance with a current version of the three dimensional shape and the one or more in-use load cases is performed 816 to produce a current numerical assessment of a physical response, e.g., a structural response, of the modeled object. Shape change velocities are computed 818 for an implicit surface in a level-set representation of the three dimensional shape, e.g., as described above with reference to FIG. 1B.

Then, the shape change velocities are changed 820 in accordance with a polynomial function that has been fit to at least a portion of the shape change velocities above a reference velocity. For example, the polynomial function can be a cubic polynomial, as described above with reference to Equation 116. Although the example given is a cubic polynomial, other different-order polynomials can be used.

The level-set representation is updated 822 using the shape change velocities to produce an updated version of the three dimensional shape of the modeled object, e.g., as described above with reference to FIG. 1B. In some implementations, the reference velocity is set based on a mean and a standard deviation of a shape derivative on the implicit surface, e.g., as described above.

The performing 816, the computing 818, the changing 820, and the updating 822 is repeated in the iteratively modifying until check 830 determines that a predefined number of shape modification iterations have been performed or that the generatively designed three dimensional shape of the modeled object in the design space has converged to a stable solution for the one or more design criteria and the one or more in-use load cases, e.g., as described above with reference to FIG. 1B. Finally, the generatively designed three dimensional shape of the modeled object can be provided for use in manufacturing the physical structure corresponding to the modeled object using one or more computer-controlled manufacturing systems.

Backup and Restore

Another technique for preventing geometric disconnections is backing up of all critical data, including the geometric level-set at each iteration, and restoring the data when the result of advection is not desirable. Thus, in some implementations, after the updating 822 but before the repeating, excessive changes can be checked 824 for that were made during the updating. In those cases, the current version of the three dimensional shape can be set 826 as the updated version of the three dimensional shape for a next iteration to undue the excessive change, i.e., the excessive change is undone. Then, shape changes for the next iteration of the iteratively modifying can be slowed 828, as described below. Slowing the changes for the next iteration can include reducing a target volume change for the generatively designed three dimensional shape of the modeled object for the next iteration of the iteratively modifying.

To prevent a repeat of the same undesirable outcome, the volume change $\Delta v_t$ computed for each iteration t, as described above with reference to FIGS. 4A-7 is modified as follows and using a multiplier $\beta$ which slows down the convergence by applying a smaller volume change:

$$\Delta v_t \leftarrow \beta \Delta v_t. \quad (120)$$

This multiplier can be initiated as $\beta=1$ at the start and updated in every iteration depending on the outcome of each advection using a fixed increment $\Delta \beta(>0)$:

$$\beta \leftarrow \max(0, \beta - \Delta \beta) \text{ if advection undesirable} \quad (121)$$

$$\beta \leftarrow \min(1, \beta + \Delta \beta) \text{ otherwise} \quad (122)$$

The next task is to classify the outcome of each advection as desirable/undesirable. One way to achieve this is to monitor the change in the Lagrangian, i.e., as described above with reference to Equations 15-25. This can be implemented in a more granular manner by imposing limits on allowable relative changes for objectives. The relative change in an objective/constraint for a given iteration t is defined as $$\Delta \mathcal{J}_t = \left| \frac{\mathcal{J}_t - \mathcal{J}_{t-1}}{\mathcal{J}_{ref,t}} \right| \quad (123)$$

$$\Delta g_t^j = p_t^j |e_t^j - e_{t-1}^j| \quad (124)$$

where the constraint error $e_t^j$ is computed using a PID stabilized version of Equation 95 with the importance factor term $p_t^j$ computed using techniques described above with reference to Arbitrary Inequality Constraints and FIGS. 4A-7. The reference value of the objective, denoted by $\mathcal{J}_{ref,t}$, is given by $$\mathcal{J}_{ref,t} = \max_{i=0}^{t} |\mathcal{J}_i|. \quad (125)$$

The maximum allowable change in objectives is limited to $\mathcal{J}_{max}^-, \mathcal{J}_{max}^+$ for objective decrease and increase, respectively. The maximum allowable change in constraints is limited to $\mathcal{G}_{max}^p, \mathcal{G}_{max}^n$ for positive (good), negative (bad) changes in constraints respectively. The sign of the constraint inequality needs to be checked to determine the appropriate limit.

Thus, in some implementations, before the performing 816 is done, elements that are generated from the current version of the three dimensional shape for the numerical simulation, but that are partially but not entirely within the implicit surface with Dirichlet boundary conditions are identified and removed 815 before performing the numerical simulation. The element and nodes refer to how the design geometry is represented during the performing 816. In finite element simulation, the domain is replaced by a collection of elements. Each element is defined by a set of nodes along the boundary of the element and, in some cases, inside the element. Generally, the more elements and nodes in the model, the higher the accuracy of the simulation. The set of techniques for creating these nodes and elements is referred to as meshing.

During optimization, the shape of the current domain repeatedly changes. The model can be re-meshed at every iteration for the finite element model to accurately represent the current domain. Since this is computationally expensive, some generative design processes deactivate the elements that lie outside the current domain at each iteration. The representation of the current design can be improved in the numerical simulation model by removing elements not entirely within the implicit surface. The overall accuracy can be improved by considering such cut elements as having partial stiffness.

Further, in some implementations, the checking 824 for the excessive change can include comparing a change in the one or more design criteria resulting from the updating with a predefined limit on an amount of change allowed for the one or more design criteria in a single iteration of the iteratively modifying.

Ersatz Materials

A common practice in the SIMP method of topology optimization is to use variable density materials or ersatz materials. Elements with density $\rho=1$ are deemed to be inside the domain whereas those with $\epsilon < \rho < 1$ are on the boundary with $\epsilon$ (typically set to a small value such as 0:001) denoting the density of materials outside the design. During finite element analysis, the stiffness of each element is multiplied by the density along with a penalty factor p to penalize intermediate densities $$K \leftarrow \rho^p K. \quad (126)$$

The level-set method often uses only two states ($\rho \in \{\epsilon, 1\}$) as the boundary and therefore is more clearly defined. The penalty factor is not required as there are no intermediate densities, i.e., $K \leftarrow \rho^p K$. However, this sometimes leads to disconnections as elements outside the domain with $\rho = \epsilon$ can support the load path.

Additionally, it has been observed that having material with $\rho = \epsilon$ severely affects the buckling safety factor predicted from the finite element model. Ersatz material can be removed completely from the finite element model where there is a significant impact on the predicted buckling factor. This is achieved by grouping all elements with $\rho = \epsilon$ at each iteration and removing all such groups that are not connected to any nodes with Dirichlet boundary conditions.

As noted above, in some implementations of the process shown in FIG. 8A, before the performing 816, elements generated from the current version of the three dimensional shape for the numerical simulation are identified 815 that are partially but not entirely within the implicit surface. Then, densities of the identified elements can be set equal to respective volume fractions of the identified elements, where a volume fraction of an identified element is a fractional amount of the identified element that falls within the implicit surface. In some implementations, the performing 816 can include penalizing stiffness of the identified elements according to the densities, as described below.

As another solution to severe disconnection problems, a tetrahedral-cutting algorithm can be applied, which reinstates the use of ersatz materials for elements on the boundary of the current domain. Essentially, the stiffness of such elements are better approximated by setting the density equal to the volume fraction of the element inside the domain. The stiffness is then penalized according to the density, as in the SIMP method, with a penalty factor of $\rho=1$:

$$\rho(e_i) = \frac{V(e_i \cap \Omega)}{V(e_i)} \quad (127)$$

$$K(e_i) \leftarrow \rho(e_i) K(e_i).$$

Computing the volume of each element inside the domain is not trivial as some elements with valid overlap with the domain may have all nodes outside the elements.

Figure 8C:
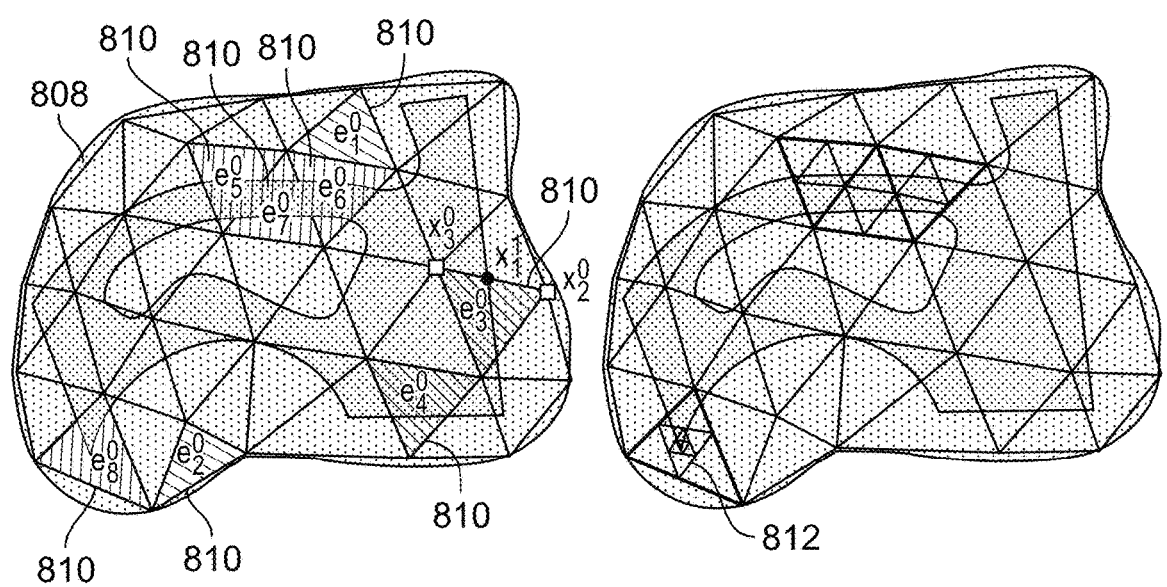
FIG. 8C is a graphical representation of an example of a geometry with simulation elements classified based on intersection of the elements with the geometry.

FIG. 8C is a graphical representation of an example of a geometry 808 with simulation elements 810 classified based on intersection of the elements 810 with the geometry 808. The problem is illustrated below with respect to elements 810 $e_5^0$, $e_6^0$, $e_7^0$. Such elements can be subdivided 812 until nodes are on either side of the $0^{th}$ iso-contour, i.e., $$\min_{x_i \in e} \psi(x_i) \max_{x_i \in e} \psi(x_i) < 0 \quad (128)$$

where $x_i$ denotes the nodal coordinates of element e. Note that certain elements (e.g., element 810 $e_8^0$) may have to be subdivided multiple times until they satisfy the condition of Equation 128. The required depth of subdivision l can be determined by recursively subdividing the element and comparing the total volume inside the domain $$V(e_i^l \cap \Omega) = \Sigma_{j \in C(e_i^l)} V(e_j^{l+1} \cap \Omega) \quad (129)$$

where $C(e_i^l)$ denotes the indices of the children of element $e_i^l$. The recursive subdivision can be stopped when the above condition is true. In some implementations, the voxel size $\Delta s$ is set to half the average edge length of solid elements. Given the smallest feature size $\approx \Delta s$, only 1 level of subdivision is typically sufficient.

The volume fraction of a tetrahedron element can be cut by the domain. When computing the intersection point of an element edge with the $0^{th}$ iso-contour, linear interpolation can be used $$x_1^1 = \frac{\psi(x_1^0) x_2^0 - \psi(x_2^0) x_1^0}{\psi(x_1^0) - \psi(x_2^0)} \quad (130)$$

Figure 9:
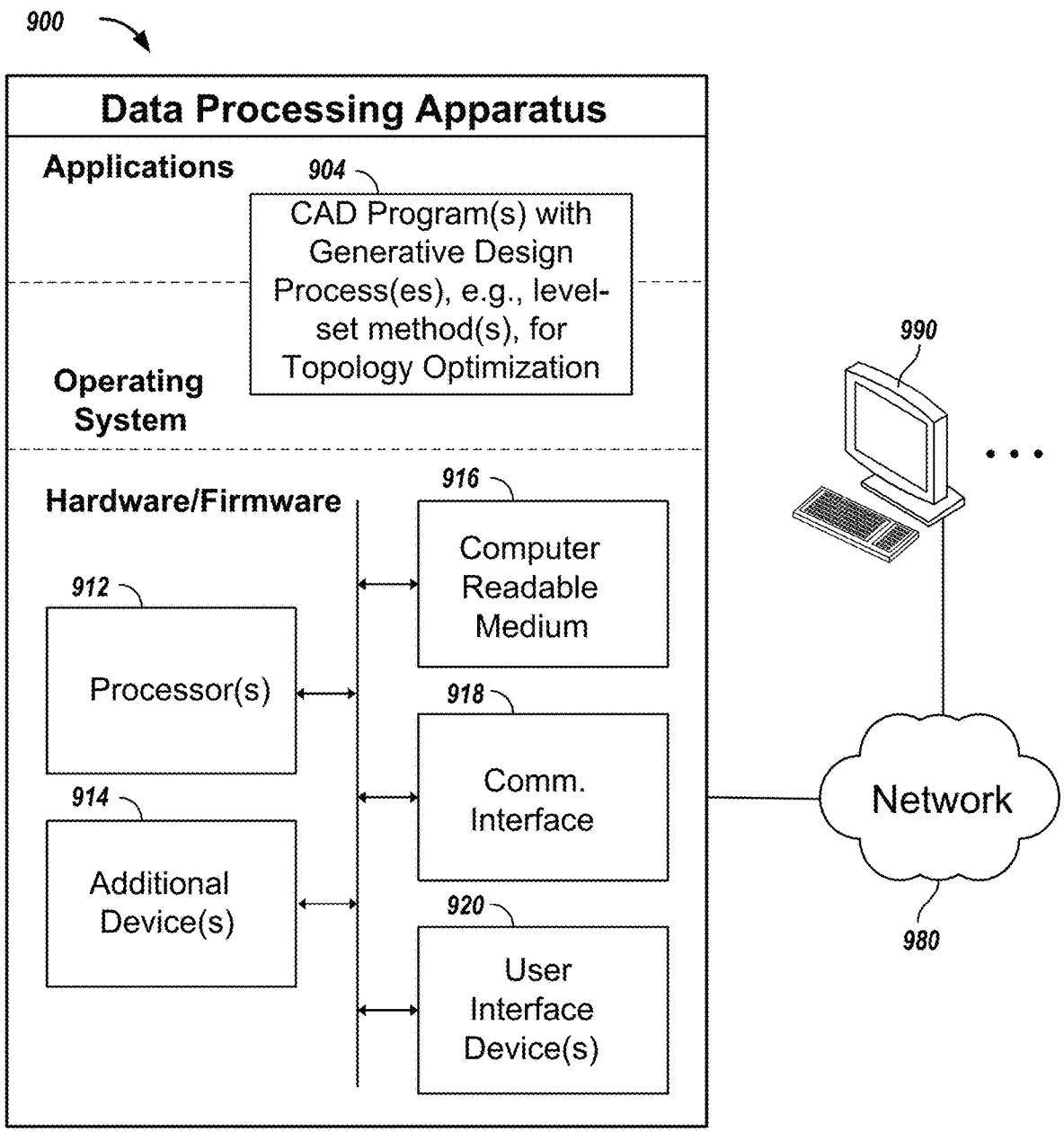
FIG. 9 shows a schematic diagram of a data processing system including a data processing apparatus, which can be programmed as a client or as a server.

FIG. 9 is a schematic diagram of a data processing system including a data processing apparatus 900, which can be programmed as a client or as a server. The data processing apparatus 900 is connected with one or more computers 990 through a network 980. While only one computer is shown in FIG. 9 as the data processing apparatus 900, multiple computers can be used. The data processing apparatus 900 includes various software modules, which can be distributed between an applications layer and an operating system. These can include executable and/or interpretable software programs or libraries, including tools and services of one or more 3D modeling programs 904 that implement the systems and techniques described above. Thus, the 3D modeling program(s) 904 can be CAD program(s) 904 and can implement one or more generative design processes (e.g., using level-set based method(s) for generative design) for topology optimization and numerical simulation operations (finite element analysis (FEA) or other). Further, the program(s) 904 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 900 also includes hardware or firmware devices including one or more processors 912, one or more additional devices 914, a computer readable medium 916, a communication interface 918, and one or more user interface devices 920. Each processor 912 is capable of processing instructions for execution within the data processing apparatus 900. In some implementations, the processor 912 is a single or multi-threaded processor. Each processor 912 is capable of processing instructions stored on the computer readable medium 916 or on a storage device such as one of the additional devices 914. The data processing apparatus 900 uses the communication interface 919 to communicate with one or more computers 990, for example, over the network 980. Examples of user interface devices 920 include a display, a camera, a speaker, a microphone, a tactile feedback device, a keyboard, a mouse, and VR and/or AR equipment. The data processing apparatus 900 can store instructions that implement operations associated with the program(s) described above, for example, on the computer readable medium 916 or one or more additional devices 914, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
  obtaining a design space for a modeled object, for which a corresponding physical structure is to be manufactured using one or more materials, and design criteria for the modeled object including one or more loading cases for numerical simulation of the physical structure and at least one design constraint on an acceptable likelihood of failure for the physical structure, wherein a statistical model that relates a structural performance metric to specific likelihoods of failure for the one or more materials is used to translate between the acceptable likelihood of failure and a value for the structural performance metric;
  iteratively modifying a generatively designed three dimensional shape of the modeled object in the design space in accordance with the design criteria including the one or more loading cases for the numerical simulation of the physical structure and the at least one design constraint to stay under the acceptable likelihood of failure for the physical structure, wherein the numerical simulation includes computing the structural performance metric, which is evaluated against the at least one design constraint; and providing the generatively designed three dimensional shape of the modeled object for use in manufacturing the physical structure;

wherein the at least one design constraint specifies a maximum likelihood of failure, obtaining the at least one design constraint comprises setting the maximum likelihood of failure based on the acceptable likelihood of failure for the physical structure, and the iteratively modifying comprises evaluating the maximum likelihood of failure at each of multiple different locations on or in the modeled object by calculating a likelihood of failure at the location using the statistical model and a value for the structural performance metric indicated for the location by the numerical simulation in accordance with one or more specific geometric parameters of the modeled object at the location.

2. The method of claim 1, wherein the statistical model is a Weibull statistical model of a probability of failure distribution function.

3. The method of claim 1, wherein the statistical model comprises a survivor function that relates values of the performance metric to specific likelihoods of failure for the one or more materials across different thicknesses of the one or more materials.

4. The method of claim 3, wherein the one or more materials comprise different versions of a same base material, the different versions corresponding to different build orientations for the same base material.

5. The method of claim 3, wherein the one or more materials comprise different base materials, different versions of a same base material, or both.

6. The method of claim 1, wherein the one or more specific geometric parameters of the modeled object at the location comprise thickness and build orientation.

7. The method of claim 1, wherein the iteratively modifying comprises:
computing shape change velocities for an implicit surface in a level-set representation of the generatively designed three dimensional shape in accordance with the at least one design constraint; and
updating the level-set representation using the shape change velocities to produce an updated version of the generatively designed three dimensional shape of the modeled object.

8. The method of claim 7, wherein computing the shape change velocities comprises computing at least one shape change velocity using a gradient determined from a shape derivative evaluated for the at least one design constraint at each of the different locations.

9. The method of claim 7, wherein computing the shape change velocities comprises computing at least one shape change velocity using an amount determined from a shape derivative formula that approximates a shape derivative evaluated for the at least one design constraint, at each of the different locations, using adaptive control.

10. The method of claim 9, wherein the shape derivative formula comprises a volume fraction based inequality constraint that is modified using a Proportional-Integral-Derivative controlled stabilization factor and an importance factor, which is adjusted based on whether or not one or more other constraints were violated in a prior iteration of the iteratively modifying.

11. The method of claim 1, wherein the iteratively modifying comprises iteratively modifying both a geometry and a topology of the generatively designed three dimensional shape.

12. The method of claim 1, wherein the one or more loading cases comprise at least a first loading case that specifies a load to be supported by the physical structure during manufacturing of the physical structure, and at least a second loading case that specifies a load to be supported by the physical structure during use of the physical structure.

13. The method of claim 1, wherein the providing comprises:
generating, from the generatively designed three dimensional shape of the modeled object, toolpath specifications for one or more computer-controlled manufacturing systems; and
manufacturing the physical structure corresponding to the modeled object with the one or more computer-controlled manufacturing systems using the toolpath specifications.

14. A system comprising:
a non-transitory storage medium having instructions of a computer aided design program stored thereon; and
one or more data processing apparatus configured to run the instructions of the computer aided design program to
obtain a design space for a modeled object, for which a corresponding physical structure is to be manufactured using one or more materials, and design criteria for the modeled object including one or more loading cases for numerical simulation of the physical structure and at least one design constraint on an acceptable likelihood of failure for the physical structure, wherein a statistical model that relates a structural performance metric to specific likelihoods of failure for the one or more materials is used to translate between the acceptable likelihood of failure and a value for the structural performance metric,
iteratively modify a generatively designed three dimensional shape of the modeled object in the design space in accordance with the design criteria including the one or more loading cases for the numerical simulation of the physical structure and the at least one design constraint to stay under the acceptable likelihood of failure for the physical structure, wherein the numerical simulation includes computing the structural performance metric, which is evaluated against the at least one design constraint, and
provide the generatively designed three dimensional shape of the modeled object for use in manufacturing the physical structure;
wherein the at least one design constraint specifies a maximum likelihood of failure, the one or more data processing apparatus are configured to run the instructions of the computer aided design program to obtain the at least one design constraint by setting the maximum likelihood of failure based on the acceptable likelihood of failure for the physical structure, and the one or more data processing apparatus are configured to run the instructions of the computer aided design program to evaluate the maximum likelihood of failure at each of multiple different locations on or in the modeled object by calculating a likelihood of failure at the location using the statistical model and a value for the structural performance metric indicated for the location by the numerical simulation in accordance with one or more specific geometric parameters of the modeled object at the location.

15. The system of claim 14, comprising one or more computer-controlled manufacturing systems, wherein the one or more data processing apparatus are configured to run the instructions of the computer aided design program to generate toolpath specifications for the one or more computer-controlled manufacturing systems from the generatively designed three dimensional shape of the modeled object, and manufacture the physical structure corresponding to the modeled object with the one or more computer-controlled manufacturing systems using the toolpath specifications.

16. The system of claim 14, wherein the statistical model is a Weibull statistical model of a probability of failure distribution function.

17. The system of claim 14, wherein the statistical model comprises a survivor function that relates values of the performance metric to specific likelihoods of failure for the one or more materials across different thicknesses of the one or more materials.

18. The system of claim 17, wherein the one or more materials comprise different versions of a same base material, the different versions corresponding to different build orientations for the same base material.

19. The system of claim 17, wherein the one or more materials comprise different base materials, different versions of a same base material, or both.

20. The system of claim 14, wherein the one or more specific geometric parameters of the modeled object at the location comprise thickness and build orientation.

21. The system of claim 14, wherein the one or more data processing apparatus are configured to run the instructions of the computer aided design program to:
compute shape change velocities for an implicit surface in a level-set representation of the generatively designed three dimensional shape in accordance with the at least one design constraint; and
update the level-set representation using the shape change velocities to produce an updated version of the generatively designed three dimensional shape of the modeled object.

22. The system of claim 21, wherein the one or more data processing apparatus are configured to run the instructions of the computer aided design program to compute at least one shape change velocity using a gradient determined from a shape derivative evaluated for the at least one design constraint at each of the different locations.

23. The system of claim 21, wherein the one or more data processing apparatus are configured to run the instructions of the computer aided design program to compute at least one shape change velocity using an amount determined from a shape derivative formula that approximates a shape derivative evaluated for the at least one design constraint, at each of the different locations, using adaptive control.

24. The system of claim 23, wherein the shape derivative formula comprises a volume fraction based inequality constraint that is modified using a Proportional-Integral-Derivative controlled stabilization factor and an importance factor, which is adjusted based on whether or not one or more other constraints were violated in a prior iteration of the iteratively modifying.

25. The system of claim 14, wherein the one or more data processing apparatus are configured to run the instructions of the computer aided design program to iteratively modify both a geometry and a topology of the generatively designed three dimensional shape.

26. The system of claim 14, wherein the one or more loading cases comprise at least a first loading case that specifies a load to be supported by the physical structure during manufacturing of the physical structure, and at least a second loading case that specifies a load to be supported by the physical structure during use of the physical structure.

27. A non-transitory computer-readable medium encoding a computer aided design program operable to cause one or more data processing apparatus to perform operations comprising:
obtaining a design space for a modeled object, for which a corresponding physical structure is to be manufactured using one or more materials, and design criteria for the modeled object including one or more loading cases for numerical simulation of the physical structure and at least one design constraint on an acceptable likelihood of failure for the physical structure, wherein a statistical model that relates a structural performance metric to specific likelihoods of failure for the one or more materials is used to translate between the acceptable likelihood of failure and a value for the structural performance metric;
iteratively modifying a generatively designed three dimensional shape of the modeled object in the design space in accordance with the design criteria including the one or more loading cases for the numerical simulation of the physical structure and the at least one design constraint to stay under the acceptable likelihood of failure for the physical structure, wherein the numerical simulation includes computing the structural performance metric, which is evaluated against the at least one design constraint; and
providing the generatively designed three dimensional shape of the modeled object for use in manufacturing the physical structure;
wherein the at least one design constraint specifies a maximum likelihood of failure, obtaining the at least one design constraint comprises setting the maximum likelihood of failure based on the acceptable likelihood of failure for the physical structure, and the iteratively modifying comprises evaluating the maximum likelihood of failure at each of multiple different locations on or in the modeled object by calculating a likelihood of failure at the location using the statistical model and a value for the structural performance metric indicated for the location by the numerical simulation in accordance with one or more specific geometric parameters of the modeled object at the location.

28. The non-transitory computer-readable medium of claim 27, wherein the statistical model comprises a survivor function that relates values of the performance metric to specific likelihoods of failure for the one or more materials across different thicknesses of the one or more materials.

29. The non-transitory computer-readable medium of claim 28, wherein the one or more materials comprise different versions of a same base material, the different versions corresponding to different build orientations for the same base material.

30. The non-transitory computer-readable medium of claim 28, wherein the one or more materials comprise different base materials, different versions of a same base material, or both.

31. The non-transitory computer-readable medium of claim 27, wherein the statistical model is a Weibull statistical model of a probability of failure distribution function.

32. The non-transitory computer-readable medium of claim 27, wherein the one or more specific geometric parameters of the modeled object at the location comprise thickness and build orientation.

33. The non-transitory computer-readable medium of claim 27, wherein the iteratively modifying comprises:
   computing shape change velocities for an implicit surface in a level-set representation of the generatively designed three dimensional shape in accordance with the at least one design constraint; and
   updating the level-set representation using the shape change velocities to produce an updated version of the generatively designed three dimensional shape of the modeled object.

34. The non-transitory computer-readable medium of claim 33, wherein computing the shape change velocities comprises computing at least one shape change velocity using a gradient determined from a shape derivative evaluated for the at least one design constraint at each of the different locations.

35. The non-transitory computer-readable medium of claim 33, wherein computing the shape change velocities comprises computing at least one shape change velocity using an amount determined from a shape derivative formula that approximates a shape derivative evaluated for the at least one design constraint, at each of the different locations, using adaptive control.

36. The non-transitory computer-readable medium of claim 35, wherein the shape derivative formula comprises a volume fraction based inequality constraint that is modified using a Proportional-Integral-Derivative controlled stabilization factor and an importance factor, which is adjusted based on whether or not one or more other constraints were violated in a prior iteration of the iteratively modifying.

37. The non-transitory computer-readable medium of claim 27, wherein the iteratively modifying comprises iteratively modifying both a geometry and a topology of the generatively designed three dimensional shape.

38. The non-transitory computer-readable medium of claim 27, wherein the one or more loading cases comprise at least a first loading case that specifies a load to be supported by the physical structure during manufacturing of the physical structure, and at least a second loading case that specifies a load to be supported by the physical structure during use of the physical structure.

39. The non-transitory computer-readable medium of claim 27, wherein the providing comprises:
   generating, from the generatively designed three dimensional shape of the modeled object, toolpath specifications for one or more computer-controlled manufacturing systems; and
   manufacturing the physical structure corresponding to the modeled object with the one or more computer-controlled manufacturing systems using the toolpath specifications.

* * * * *